(12) United States Patent
Sager et al.

(10) Patent No.: US 12,061,612 B1
(45) Date of Patent: *Aug. 13, 2024

(54) PLATFORM FOR SEMANTIC SEARCH AND DYNAMIC RECLASSIFICATION

(71) Applicant: Reveal Networks, Inc., Menlo Park, CA (US)

(72) Inventors: Brian M. Sager, Menlo Park, CA (US); William Lee Kimberlin, Menlo Park, CA (US)

(73) Assignee: REVEAL NETWORKS, INC., Menlo Park, CA (US)

( * ) Notice: Subject to any disclaimer, the term of this patent is extended or adjusted under 35 U.S.C. 154(b) by 19 days.

This patent is subject to a terminal disclaimer.

(21) Appl. No.: 18/157,431

(22) Filed: Jan. 20, 2023

Related U.S. Application Data

(63) Continuation of application No. 17/849,385, filed on Jun. 24, 2022, now Pat. No. 11,561,987, which is a continuation-in-part of application No. 15/663,460, filed on Jul. 28, 2017, now abandoned, which is a continuation-in-part of application No. 15/589,882,
(Continued)

(51) Int. Cl.
| | |
|---|---|
| *G06F 7/00* | (2006.01) |
| *G06F 16/00* | (2019.01) |
| *G06F 16/2457* | (2019.01) |
| *G06F 16/248* | (2019.01) |
| *G06F 16/906* | (2019.01) |
| *G06F 40/205* | (2020.01) |
| *G06F 40/30* | (2020.01) |

(52) U.S. Cl.
CPC ...... *G06F 16/24573* (2019.01); *G06F 16/248* (2019.01); *G06F 16/906* (2019.01); *G06F 40/205* (2020.01); *G06F 40/30* (2020.01)

(58) Field of Classification Search
None
See application file for complete search history.

(56) References Cited

U.S. PATENT DOCUMENTS

| | | | |
|---|---|---|---|
| 5,581,663 | A | 12/1996 | Zlotin et al. |
| 5,873,056 | A | 2/1999 | Liddy et al. |

(Continued)

OTHER PUBLICATIONS

Ahmed, A and S.-H. Hong. (2007). Navigation Techniques for 2. 5D Graph Layout, Hong, S.-H., Ma, K.-L. (editors), Proc. Asia-Pacific Symposium on Visualization (APVIS2007), Feb. 5-7, 2007, Sydney, Australia, IEEE Computer Society. pp. 81-84.

(Continued)

*Primary Examiner* — Tuan A Pham
(74) *Attorney, Agent, or Firm* — NEO IP

(57) ABSTRACT

A platform receives an input document from a user device and automatically determines a semantic signature for the input document based on a probabilistic distribution of rare words within the input document. The platform automatically scrapes at least one Internet database for additional documents and webpages, determining semantic signatures for each document or webpage. Based on similarity of semantic signatures, the platform automatically constructs and displays a graphical network of documents, wherein each document is represented as a node and similarity of semantic signatures is used to determine the locations of edges between nodes. The graph automatically groups nodes by communities and selects nodes in different communities to promote serendipity of results.

18 Claims, 32 Drawing Sheets

Related U.S. Application Data filed on May 8, 2017, now abandoned, and a continuation-in-part of application No. 15/589,838, filed on May 8, 2017, now abandoned, and a continuation-in-part of application No. 15/148,967, filed on May 6, 2016, now abandoned, and a continuation-in-part of application No. 14/811,718, filed on Jul. 28, 2015, now abandoned, said application No. 15/148,967 is a continuation-in-part of application No. 14/105,174, filed on Dec. 12, 2013, and a continuation-in-part of application No. 14/059,460, filed on Oct. 22, 2013, now abandoned, said application No. 14/811,718 is a continuation-in-part of application No. 13/900,676, filed on May 23, 2013.

(60) Provisional application No. 62/368,159, filed on Jul. 28, 2016, provisional application No. 62/333,078, filed on May 6, 2016, provisional application No. 62/333,092, filed on May 6, 2016.

(56) References Cited

U.S. PATENT DOCUMENTS

| | | | |
|---|---|---|---|
| 5,955,322 | A | 9/1999 | Guarnieri et al. |
| 6,321,221 | B1 | 11/2001 | Bieganski |
| 6,741,956 | B1 | 5/2004 | Mills, Jr. et al. |
| 7,319,998 | B2 | 1/2008 | Campos et al. |
| 7,447,678 | B2 | 11/2008 | Taylor et al. |
| 7,716,226 | B2 | 5/2010 | Barney |
| 7,745,594 | B2 | 6/2010 | Seelig et al. |
| 7,930,634 | B2 | 4/2011 | Nakamura |
| 8,577,893 | B1 | 11/2013 | Patterson et al. |
| 9,208,220 | B2 | 12/2015 | Sun |
| 2002/0111817 | A1 | 8/2002 | Cronin |
| 2004/0070426 | A1 | 4/2004 | Stojanovic |
| 2005/0131874 | A1 | 6/2005 | Verbitsky |
| 2009/0299760 | A1 | 12/2009 | Spradlin et al. |
| 2011/0177980 | A1 | 7/2011 | Lin et al. |
| 2016/0085848 | A1 | 3/2016 | Kogan et al. |

OTHER PUBLICATIONS

Ahmed, A, Dwyer, T., Hong, S.-H., Murray, C., Song, L. and Y. X. Wu. (2005). "Visualization and analysis of large and complex scale-free networks", in Proc. Euro graphics / IEEE VGTC Symposium on Visualization (Euro Vis 2005).

Aittokallio, T. and B. Schwikowski. 2006. Graph-based methods for analyzing networks\in cell biology. Brief Bioinform. 7 (3): 243-55.

Altshuller, G. S. and RB Shapiro. (1956). "On the psychology of inventive creation". The Psychological Issues (6): 37-39.

Ariga, K., Hill, J.P., Lee. M.V. Vinu, A, Charvet, R. and S. Acharya. (2008). Challenges and breakthroughs in recent research on self-assembly. Sci. Technol. Adv. Mater. 9 (2008) 014109 (96pp).

Ashburner, M., Leser, U., Rebholz-Schuhmann, D., (Eds). (2008). Ontologies and Text Mining for Life Sciences: Current Status and Future Perspectives. In Dagstuhl Seminar Proceedings. Dagstuhl, Germany: Schloss Dagstuhl—Leibniz-Zentrum fuer Informatik, Germany.

Back, T. 2006. Selective Pressure in Evolutionary Algorithms: A Characterization of Selection Mechanisms. Proceedings of the First IEEE Conference on Evolutionary Computation. IEEE World Congress on Computational Intelligence (WCCI). 6 pages.

Baharudin, B., Hong Lee, L. and K. Khan. (2010). A Review of Machine Learning Algorithms for Text-Documents Classification. Journal of Advances in Information Technology, 1 (1): 4-20.

Barbieri, F. and H. Saggion. (2014). Automatic Detection of Irony and Humour in Twitter. Proceedings of the Student Research Workshop at the 14th Conference of the European Chapter of the Association for Computational Linguistics, pp. 56-64, Gothenburg, Sweden, Apr. 26-30, 2014.

Barkan, O. (2015). "Bayesian Neural Word Embedding". arXiv:1603.06571.

Barkan, O. and N. Koenigstein (2016)."Item2Vec: Neural Item Embedding for Collaborative Filtering". arXiv: 1603.04259.

Berg, B.A. (2004). Markov Chain Monte Carlo Simulations and Their Statistical Analysis (With Web-Based Fortran Code). Hackensack, NJ: World Scientific.

Blei, D.M., Ng, A.Y. and M.I. Jordan. (2003). Latent Dirichlet Allocation. Journal of Machine Learning Research 3: 993-1022.

Blondel, V.D., Guillaume, J.-L., Lambiotte, R. and E. Lefebvre. (2008). Fast unfolding of communities in large networks. Journal of Statistical Mechanics: Theory and Experiment 10: PI0008.

Bollegala, D., Matsuo, Y, and M. Ishizuka. (2009). Measuring the similarity between implicit semantic relations using web search engines. WSDM '09 Proceedings of the Second ACM International Conference on Web Search and Data Mining ACM New 30 York, NY, USA.

Borg, I. and Groenen, P.J.F. (2005). Modern multidimensional scaling. 2nd edition. New York: Springer.

Brodlie, K.W., Duke, D.J., and K.I. Joy, (Editors). (2005). Visualisation and Analysis of Large and Complex Scale-Free Networks. Eurographics—IEEE VGTC Symposium on Visualization , pp. 1-8.

Campbell, C. and Y. Ying. (2011). Learning with Support Vector Machines. 2011, Morgan and Claypool.

Chen, P., Ding, W., Bowes, C. and D. Brown. (2009). Large-Scale Dependency Knowledge Acquisition and its Extrinsic Evaluation Through Word Sense Disambiguation. Tools with Artificial Intelligence, ICTAI '09. zt International Conference, Nov. 2-4, pp. 314-318.

Chomsky, N. (1957). Syntactic Structures. The Hague: Mouton.

Crammer, K. and Y. Singer. (2001). "On the Algorithmic Implementation of Multiclass Kernel-based Vector Machines". Journal of Machine Learning Research 2: 265-292.

Dantzig, G. (1940). On the Non-Existence of Student's Hypothesis Having Power Functions Independent of Sigma. Annals of Mathematical Statistics. No. 11: 186-192.

Dean, J. and S. Ghemawat. (2004). MapReduce: Simplified Data Processing on Large Clusters. OSDI'04 Proceedings of the 6th conference on Symposium on Operating Systems Design & Implementation 6: 10-10.

Deerwester, S., Dumais, G. W., Furnas, S. T., Landauer, T. K., & Harshman, R. (1990). Indexing by latent semantic analysis. Journal of the American Society for Information Science, 41, 391-407.

Doucet, A., Freitas, N. de, and N. Gordon (2001). Sequential Monte Carlo methods in practice. New York: Springer.

Fellbaum, Christiane, editor. (1998). WordNet, an electronic lexical database. Cambridge, MA: The MIT Press.

Figueiredo, Antonio Dias de and J. Campos (2001). The Serendipity Equations. Navy Center for Applied Research in Artificial Intelligence, Naval Research Laboratory, Washington, DC, Technical Note AIC-01-003.

Flake, G., Lawrence, S. and C. Giles. (2000). Efficient identification of web communities. In KDD '00: Proceedings of the 6th ACM SIGKDD International Conference on Knowledge Discovery and Data Mining, pp. 150-160.

Flake, G., Tarjan, R. and K. Tsioutsiouliklis. (2003). Graph clustering and minimum cut trees. Internet Mathematics 1 (4): 385-408.

Fortunato, S. and M. Barthelemy. (2007). Resolution limit in community detection. Proceedings of the National Academy of Sciences of the United States of America, 104 (1): 36-41.

Girvan, M., and M. Newman. (2002). Community structure in social and biological networks. Proceedings of the National Academy of Sciences of the United States of America 99 (12): 7821-7826.

Goldberg et al. "A Comparative Analysis of Selection Scheme used in Genetic Algorithms," In Foundations of Genetic Algorithms, G. Rawlings, Editor, San Mateo, CA: Morgan Kaufman, 1991, 27 pages.

Guimera, R., Sales-Pardo, M., and L. Amaral. (2004). Modularity from fluctuations in random graphs and complex networks. Physical Review E 70: 025101.

Harel, D. and Y. Koren. (2004). Graph Drawing by High-Dimensional Embedding. Journal of Graph Algorithms and Applications 8 (2): 195-214.

(56) References Cited

OTHER PUBLICATIONS

Hawizy, L., David M Jessop, D.M., Adams N. and P. Murray-Rust (2011). ChemicalTagger: A tool for semantic text-mining in chemistry. Journal of Cheminformatics 3:41.

Hirasawa, K., Okubo, M., Katagiri, H., Hu, J., and J. Murata. 2001. Comparison between Genetic Network Programming (GNP) and Genetic Programming (GP). Evolutionary Computation, 2001. Proceedings of the 2001 Congress, 2: 1276-1282.

Hocevar, T. and J. Demsar Janez Demsar. 2014. A combinatorial approach to graphlet counting. Bioinformatics 30 (4): 559-565.

Hofmann, T., Puzicha, J., & Jordan, M. I. (1999). Unsupervised learning from dyadic data. In Advances in Neural Information Processing Systems, vol. 11, MIT Press.

Honarkhah, M. and Caers, J. (2010). Stochastic Simulation of Patterns Using Distance-Based Pattern Modeling, Mathematical Geosciences, 42: 487-517.

Hsu, C.-W. and & C.-J. Lin. (2002). "A Comparison of Methods for Multiclass Support Vector Machines". IEEE Transactions on Neural Networks.

Hua, Z., Yang, J., Coulibaly, S. and B. Zhang. (2006). "Integration TRIZ with problemsolving tools: a literature review from 1995 to 2006". International Journal of Business Innovation and Research 1 (1-2): 111-128.

Jia, Y., Hoberock, J., Garland, M. and J.C. Hart. (1998). Visualization of Social and other Scale-Free Networks. Technical Report UIUCDCS-R-2008-2955, Apr. 2008.

Johansson, F. (2004). The Medici Effect: Breakthrough Insights at the Intersection of Ideas, Concepts, and Cultures. Harvard Business Review Press.

Kannan, R., Vempala, S. and A Yetta. (2004). On clusterings: Good, bad and spectral. Journal of the ACM51(3): 497-515.

Komusiewicz, C. (2011). Parameterized Algorithmics for Network Analysis: Clustering & Querying. Ph.D. Thesis. Elektrotechnik und Informatik der Technischen Universitat Berlin.

Lancichinetti, A and S. Fortunato (2009), Community detection algorithms: a comparative analysis. Phys. Rev. E 80: 056117.

Larsen, P.O. and von Ins, M. (2010). The rate of growth in scientific publication and the decline in coverage provided by Science Citation Index, Scientometrics 84 (3): 575-603.

Le. Q. and T. Mikolov. (2014). Distributed Representations of Sentences and Documents. Proceedings of the 31st International Conference on Machine Learning, Beijing, China, JMLR: W &CP volume.

Lee, Y, Lin, Y and G. Wahba. (2001). "Multicategory Support Vector Machines". Computing Science and Statistics 33.

Leskovec, J., Lang, K.J, and M.W. Mahoney. (2010). Empirical Comparison of Algorithms for Network Community Detection. World Wide Web Conference Committee WWW 2010, Apr. 26-30, 2010, Raleigh, North Carolina, USA ACM978 1-60558-799.

Mabu, S., Hirasawa, K. and J. Hu. (2007). A graph-based evolutionary algorithm: Genetic Network Programming (GNP) and its extension using reinforcement learning. Evol. Comput. 15 (3): 369-398.

Manning, C. D., Raghavan, P., and H. Schutze. (2008). Scoring, term weighting, and the vector space model. Introduction to Information Retrieval p. 100.

Manning, C.D., Raghavan, P., and H Schutze. (2009). An Introduction to Information Retrieval, Cambridge University Press. p. J 81.

McCarthy, D. (2009). Word Sense Disambiguation: An Overview. Language and Linguistics Compass 3: 537-558.

Metropolis, N. and S. Ulam. (1949). The Monte Carlo Method. Journal of the American Statistical Association 44 (247): 335-341.

Mikolov, T., Sutskever, I., Chen, K., Corrado, G.S., and J. Dean (2013). Distributed representations of words and phrases and their compositionality. Advances in Neural Information Processing Systems.

Milenkovic T., and N. Przulj. (2008). Uncovering biological network function via graphlet degree signatures. Cancer Inform. 6: 257-273.

Milo, R., Itzkovitz, S., Kashtan, N., Levitt, R., Shen-Orr, S., Avzenshtat, I., Sheffer, M. and U. Alon. (2004). Superfamilies of Evolved and Designed Networks. Science 303: 1538-1542.

Milo, R., Shen-Orr, S., Itzkovitz, S., Kashtan, N., Chklovskii, D. and U. Alon. (2002). Network Motifs: Simple Building Blocks of Complex Networks. Science 298: 824-827.

Moses, W., Barr, J., Kaynak, 0. and S. Root. (2011). Conducting IEEE Conferences. Sections Congress 2011. IEEE.

Mount D.M. (2004). Bioinformatics: Sequence and Genome Analysis (2nd ed.). Cold Spring Harbor Laboratory Press: Cold Spring Harbor, NY.

Nascimento, M.C.V., and de Carvalo, A C.P.L.F. (2011). Spectral methods for graph clustering—A survey. European Journal of Operational Research, 2011, vol. 211, issue 2, pp. 221-231.

Newman, M. and M. Girvan. (2004). Finding and evaluating community structure in networks. Physical Review E 69: 026113.

Nurse, Jason R. C. et al. "Building Confidence in Information-Trustworthiness Metrics for Decision Support." 2013 12th IEEE International Conference on Trust, Security and Privacy in Computing and Communications (2013): 535-543.

Nystrom, G., Razaq, A. et al. (2009). Ultrafast All-Polymer Paper-Based Batteries, Nano Lett. 9 (10): 3635-3639.

Pantel, P. and D. Lin. (2002). Discovering word senses from text. In: Proceedings of ACM SIGKDD Conference on Knowledge Discovery and Data Mining, 613-619, Edmonton, Canada.

Para, Uday Kiran. Computer-aided Semantic Signature Identification and Document Classification via Semantic Signatures. Graduate Theses, Dissertations, and Problem Reports. 4640. West Virginia University (2010).

Przulj, N., Corneil, D.G., and I. Jurisica. 2006. Efficient estimation of graphlet frequency distributions in protein-protein interaction networks. Bioinformatics 22: 974-80.

Ross, V.E., Kleingeld, AW. and L. Lorenzen. (2004). A Topographical Map of the Innovation Landscape. The Innovation Journal: The Public Sector Innovation Journal, vol. 9 (2).

Salton, G. & McGill, M. J. (1983). Introduction to Modern Information Retrieval. New York: McGraw-Hill.

Salton, G., Fox, E. and W.H. (1983). Wu. Extended Boolean information retrieval. Communications of the ACM, 26 (11).

Salton, G., Wong, A, and C.S. Yang. (1975). A vector space model for automatic indexing. Communications of the ACM18 (11): 613.

Schreiber, F. and H, Schwobbermeyer. 2005. MAVisto: a tool for the exploration of network motif. Bioinformatics 21 (17): 3572-3574.

Schutze Hinrich. (1998). Automatic word sense discrimination. Computational Linguistics 24 (1): 97-123.

Shen, C., Li, T. and C.H.Q. Ding. (2011). Integrating Clustering and Multi-Document Summarization by Bi-Mixture Probabilistic Latent Semantic Analysis (PLSA) with Sentence Bases. Proceedings of the Twenty-Fifth AAA! Conference on Artificial Intelligence, pp. 914-920.

Silver, D. and J. Veness. (2010). Monte Carlo Planning in Large POMSPs. In Lafferty, J., Williams, C.K.I. and J. Shawe-Taylor, J. et al. Advances in Neural Information Processing Systems 23. Neural Information Processing Systems Foundation.

Singhal, A (2001). Modem Information Retrieval: A Brief Overview. Bulletin of the IEEE Computer Society Technical Committee on Data Engineering.

Smola, A. J. and B. Scholkopf (2004). "A tutorial on support vector regression". Statistics and Computing 14 (3): 199-222.

Sparck Jones, K. (1972). A Statistical Interpretation of Term Specificity and Its Application in Retrieval. Journal of Documentation 28: 11-21.

Spirin V, and L.A. Mimy. 2003. Protein complexes and functional modules in molecular networks. Proc. Natl. Acad. Sci. USA 100: 12123.

Srivastava, AN. and M. Sahami, eds. (2009). Text Mining. Classification, Clustering, and Applications. CRC press.

Taddy, M. (2015). Document Classification by Inversion of Distributed Language Representations. Proceedings of the 53rd Annual Meeting of the Association for Computational Linguistics and the 7th International Joint Conference on Natural Language Processing (Short Papers), pp. 45-49.

(56) References Cited

OTHER PUBLICATIONS

Torgerson, W. S. (1958). Theory and methods of scaling. Wiley, New York.
Turian, J., Ratinov, L., Bengio, Y. Word representations: A simple and general method for semi-supervised learning. Proceedings of the 48th Annual Meeting of the Association for Computational Linguistics, pp. 384-394. Uppsala, Sweden (Jul. 2010).
Wallace, B.C., Choe, D.K., and E. Charniak. (2015). Sparse, Contextually Informed Models for Irony Detection: Exploiting User Communities, Entities and Sentiment. Association of Computational Linguistics.
World Intellectual Property Organization, Statistics on Patent Applications, 2007.
Xu, X., Zhang, I. and M. Small. 2008. Superfamily phenomena and motifs of networks induced from time series. Proc. Natl. Acad. Sci. USA 105 (50): 19601-19605.

| Dimensional Weighting | Ontological Dimensions of Unmet Need (Solution Profile) | | | Binary Scoring of *Partial* Solutions to Unmet Need | | | | | Dimensional Scores | |
|---|---|---|---|---|---|---|---|---|---|---|
| WC1 | Capability (C1) | | | Partial Solution 1 | Partial Solution 2 | Partial Solution 3 | ... | Partial Solution N | Sub-Total | *Weighted Descriptor Subtotal* |
| | Descriptor(s) | Weighting | Matching | | | | | | | |
| *C1-1* | Function 1 | C1-1-W | C1-1-M | C1-1-PS1 | C1-1-PS2 | C1-1-PS3 | ... | C1-1-PSN | Sum-C1-1 | WSum-C1-1 |
| *C1-2* | Function 2 | C1-2-W | C1-2-M | C1-2-PS1 | C1-2-PS2 | C1-2-PS3 | ... | C1-2-PSN | Sum-C1-2 | WSum-C1-2 |
| *C1-3* | Function 3 | C1-3-W | C1-3-M | C1-3-PS1 | C1-3-PS2 | C1-3-PS3 | ... | C1-3-PSN | Sum-C1-3 | WSum-C1-3 |
| ... | ... | ... | ... | ... | ... | ... | ... | ... | ... | ... |
| *C1-M* | Function M | C1-M-W | C1-M-M | C1-M-PS1 | C1-M-PS2 | C1-M-PS3 | ... | C1-M-PSN | Sum-C1-M | WSum-C1-M |
| | Sub-Total | 100% | NA | C1Sum-PS1 | C1Sum-PS2 | C1Sum-PS3 | ... | C1Sum-PSN | *Sum-C1* | WSum-C1 |
| | *Weighted Capability Subtotal* | | | WC1Sum-PS1 | WC1Sum-PS2 | WC1Sum-PS3 | ... | WC1Sum-PSN | | |
| WC2 | Characteristic (C2) | | | | | | | | | |
| | Descriptor(s) | Weighting | Matching | | | | | | | |
| *C2-1* | Feature 1 | C2-1-W | C2-1-M | C2-1-PS1 | C2-1-PS2 | C2-1-PS3 | ... | C2-1-PSN | Sum-C2-1 | WSum-C2-1 |
| *C2-2* | Feature 2 | C2-2-W | C2-2-M | C2-2-PS1 | C2-2-PS2 | C2-2-PS3 | ... | C2-2-PSN | Sum-C2-2 | WSum-C2-2 |
| *C2-3* | Feature 3 | C2-3-W | C2-3-M | C2-3-PS1 | C2-3-PS2 | C2-3-PS3 | ... | C2-3-PSN | Sum-C2-3 | WSum-C2-3 |
| ... | ... | ... | ... | ... | ... | ... | ... | ... | ... | ... |
| *C2-M* | Feature M | C2-M-W | C2-M-M | C2-M-PS1 | C2-M-PS2 | C2-M-PS3 | ... | C2-M-PSN | Sum-C2-M | WSum-C2-M |
| | Sub-Total | 100% | NA | C2Sum-PS1 | C2Sum-PS2 | C2Sum-PS3 | ... | C2Sum-PSN | *Sum-C2* | WSum-C2 |
| | *Weighted Characteristic Subtotal* | | | WC2Sum-PS1 | WC2Sum-PS2 | WC2Sum-PS3 | ... | WC2Sum-PSN | | |
| WC3 | Composition (C3) | | | | | | | | | |
| | Descriptor(s) | Weighting | Matching | | | | | | | |
| *C3-1* | Element 1 | C3-1-W | C3-1-M | C3-1-PS1 | C3-1-PS2 | C3-1-PS3 | ... | C3-1-PSN | Sum-C3-1 | WSum-C3-1 |
| *C3-2* | Element 2 | C3-2-W | C3-2-M | C3-2-PS1 | C3-2-PS2 | C3-2-PS3 | ... | C3-2-PSN | Sum-C3-2 | WSum-C3-2 |
| *C3-3* | Element 3 | C3-3-W | C3-3-M | C3-3-PS1 | C3-3-PS2 | C3-3-PS3 | ... | C3-3-PSN | Sum-C3-3 | WSum-C3-3 |
| ... | ... | ... | ... | ... | ... | ... | ... | ... | ... | ... |
| *C3-M* | Element M | C3-M-W | C3-M-M | C3-M-PS1 | C3-M-PS2 | C3-M-PS3 | ... | C3-M-PSN | Sum-C3-M | WSum-C3-M |
| | Sub-Total | 100% | NA | C3Sum-PS1 | C3Sum-PS2 | C3Sum-PS3 | ... | C3Sum-PSN | *Sum-C3* | WSum-C3 |
| | *Weighted Composition Subtotal* | | | WC3Sum-PS1 | WC3Sum-PS2 | WC3Sum-PS3 | ... | WC3Sum-PSN | | |
| Dimensional Weighting Total | Weight Ontological Dimensions Total | | | WSum-PS1 | WSum-PS2 | WSum-PS3 | ... | WSum-PSN | | |
| 100% | | | | | | | | | | |

FIG. 28

PLATFORM FOR SEMANTIC SEARCH AND DYNAMIC RECLASSIFICATION

CROSS REFERENCES TO RELATED APPLICATIONS

This application is related to and claims priority from the following U.S. patents and patent applications. This application is a continuation of U.S. patent application Ser. No. 17/849,385, filed Jun. 24, 2022, which is a continuation-in-part of U.S. patent application Ser. No. 15/663,460, filed Jul. 28, 2017, which claims priority from U.S. Provisional Patent Application No. 62/368,159, filed Jul. 28, 2016. U.S. patent application Ser. No. 15/663,460 is also a continuation-in-part of U.S. patent application Ser. No. 14/811,718, filed Jul. 28, 2015, which is a continuation-in-part of U.S. patent application Ser. No. 13/900,676, filed May 23, 2013. Each application listed above is incorporated herein by reference in its entirety.

U.S. patent application Ser. No. 15/663,460 is also a continuation-in-part of U.S. patent application Ser. No. 15/148,967, filed May 6, 2016, which is a continuation-in-part of U.S. patent application Ser. No. 14/059,460, filed Oct. 22, 2013. U.S. patent application Ser. No. 15/148,967 is also a continuation-in-part of U.S. patent application Ser. No. 14/105,174, filed Dec. 12, 2013. Each application listed above is incorporated herein by reference in its entirety.

U.S. patent application Ser. No. 15/663,460 is also a continuation-in-part of U.S. patent application Ser. No. 15/589,838, filed May 8, 2017, which claims priority to U.S. Provisional Patent Application No. 62/333,078, filed May 6, 2016, each of which is incorporated herein by reference in its entirety.

U.S. patent application Ser. No. 15/663,460 is also a continuation-in-part of U.S. patent application Ser. No. 15/589,882, filed May 8, 2017, which claims priority to U.S. Provisional Patent Application No. 62/333,092, filed May 6, 2016, each of which is incorporated herein by reference in its entirety.

BACKGROUND OF THE INVENTION

1. Field of the Invention

The present invention relates to searching for and identifying documents based on a semantic signature of the document, and more specifically to constructing a self-assembling network of document nodes for improved semantic searching.

2. Description of the Prior Art

It is generally known in the prior art to provide platforms for providing recommendations to users, such as recommended films on platforms such as Netflix and as is described in U.S. Pat. No. 6,321,221. It is known to provide such recommendations based on past user activity.

It is further known to provide a platform for identifying existing problems and providing a potential solution to the existing problems, such as is described in U.S. Pat. No. 5,581,663. Some instances of these systems, as described in US Patent Publication No. 2002/0111817, are designed to promote conception of inventions meant to address specific problems. One paradigm for promoting invention is the Theory of Inventive Problem Solving (or TRIZ) paradigm, which accepts a natural language description of an area of improvement for a technology and a constraint to achieve that improvement in order to work out a solution. TRIZ often includes forming a contradiction matrix of varies factors in an invention that provide opposing constraints in order to arrive at a potential solution. TRIZ is used in systems such as that described in US Patent Publication No. 2005/0131874.

Prior Art Patent Documents Include the Following:

U.S. Pat. No. 8,577,893 for Ranking based on reference contexts by inventors Patterson et al., filed Mar. 15, 2004 and issued Nov. 5, 2013, discloses a system ranking documents based on contexts associated with the documents. The system identifies a reference in a first document, where the reference is associated with a second document. The system analyzes a portion of the first document associated with the reference, identifies a rare word (or words) from the portion, creates a context identifier based on the rare word(s), and ranks the second document based on the context identifier.

US Patent Publication No. 2016/0085848 for Content classification by inventors Kogan et al., filed May 1, 2013 and published Mar. 24, 2016, discloses techniques for determining classifications from content of data objects. Terms from the content of one or more data objects of each of a plurality of classes are used to determine a sub-topic for one of the classes.

U.S. Pat. No. 9,208,220 for Method and apparatus of text classification by inventor Sun, filed Sep. 3, 2010 and issued Dec. 8, 2015, discloses a technique of text categorization to simplify and optimize the classification. In one aspect, a method parses a given text into one or more words; determines a word vector in a spherical space model for one of the one or more words, a number of dimensions of the spherical space being equal to a number of categories, each category corresponding to a spherical space category vector; for each category, determines a distance between a sum of word vectors of the one or more words and the respective category vector; and classifies the text into one or more categories with the shortest distance. The present disclosure also provides an apparatus used to implement the method.

U.S. Pat. No. 7,319,998 for Method and system for supporting symbolic serendipity by inventors Campos et al., filed Nov. 12, 2004 and issued Jan. 15, 2008, discloses a method and system for supporting serendipity and pseudo-serendipity. A collection of profiles are generated to model the user's worldview. A collection of shadow profiles are generated to model divergent knowledge based on the user's profiles and external information or knowledge sources. A collection of items are retrieved from the profiles and used to perform a deliberate search for laterality. The initial and lateral items are merged into a search string. The search string is used to perform a search or wandering process that is aware of potential serendipitous stimuli in an information space. The discovered, unexpected, unsought, unforeseen stimuli are intended to be subsequently presented to the user.

U.S. Pat. No. 5,581,663 for Automated problem formulator and solver by inventors Zlotin et al., filed Apr. 22, 1994 and issued Dec. 3, 1996, discloses a computer implemented apparatus to identify problems that exist in a real-world system and to assist in finding a solution to such problems. The apparatus has an input device for receiving a description of the real-world system as input. A memory device stores a graph being a representation of the description of the real-world system. A processor produces the graph representing the description of the real-world system. The processor also determines if the graph complies with a set of structural rules and parses the graph to produce an ordered list of problem statements, each problem statement in the ordered list of problem statements identifying a problem that exists in the real-world system. The memory also stores a network of operators, each operator linked to at least one other operator in the network of operators. Each operator includes a recommendation for solving a problem, and can also include an example of the application of the recommendation. The links between the operators represent historical routes to solutions to problems. The processor enables a user to traverse the network of operators to locate at least one operator relevant to the problem to be solved.

U.S. Pat. No. 5,873,056 for Natural language processing system for semantic vector representation which accounts for lexical ambiguity by inventors Liddy et al., filed Oct. 12, 1993 and issued Feb. 16, 1999, discloses a natural language processing system using unformatted naturally occurring text and generating a subject vector representation of the text, which may be an entire document or a part thereof such as its title, a paragraph, clause, or a sentence therein. The subject codes which are used are obtained from a lexical database and the subject code(s) for each word in the text is looked up and assigned from the database. The database may be a dictionary or other word resource which has a semantic classification scheme as designators of subject domains. Various meanings or senses of a word may have assigned thereto multiple, different subject codes and psycholinguistically justified sense meaning disambiguation is used to select the most appropriate subject field code. Preferably, an ordered set of sentence level heuristics is used which is based on the statistical probability or likelihood of one of the plurality of codes being the most appropriate one of the plurality. The subject codes produce a weighted, fixed-length vector (regardless of the length of the document) which represents the semantic content thereof and may be used for various purposes such as information retrieval, categorization of texts, machine translation, document detection, question answering, and generally for extracting knowledge from the document. The system has particular utility in classifying documents by their general subject matter and retrieving documents relevant to a query.

U.S. Pat. No. 6,321,221 for System, method and article of manufacture for increasing the user value of recommendations by inventor Bieganski, filed Jul. 17, 1998 and issued Nov. 20, 2001, discloses a system, method and article of manufacture for generating a serendipity-weighted recommendation output set to a user based, at least in part, on a serendipity function. The system includes a processing system of one or more processors configured to receive applicable data that includes item recommendation data and community item popularity data. The processing system is also configured to produce a set of item serendipity control values in response to the serendipity function and the community item popularity data, and to combine the item recommendation data with the set of item serendipity control values to produce a serendipity-weighted and filtered recommendation output set. The method includes receiving applicable data by the processing system, including inputting item recommendation data and community item popularity data. The method further includes generating a set of item serendipity control values in response to the community item popularity data and a serendipity function, using the processing system, and combining the item recommendation data and the set of item serendipity control values to produce a serendipity-weighted and filtered item recommendation output set, also using the processing system. The invention also includes a computer readable medium having a having a set of program instructions physically embodied thereon, executable by a computer, to perform a method similar to the method described above.

US Patent Publication No. 2002/0111817 for Network-based system and method for facilitating conception of inventions in a directed manner by inventor Cronin, filed Feb. 12, 2001 and published Aug. 15, 2002, discloses a system for facilitating conception of inventions in a directed manner. The system preferably includes a computer processor programmed to execute one or more of the following; requesting and accepting data input; aggregating and storing the input data; and providing output displaying the aggregated input data. The input data may include the following: mess statements; data statements relating to the mess statements; problem statements relating to the data statements; elements relating to the problem statements, mess statements and/or data statements; solutions to the problem statements; limitations of problem-element-solution combinations; and solutions to the limitations.

U.S. Pat. No. 7,447,678 for Interface for a universal search engine by inventors Taylor et al., filed Dec. 31, 2003 and issued Nov. 4, 2008, discloses a search engine performing a search for a user search query over a number of possible search categories. For example, the search query may be performed for general web documents, images, and news documents. The search engine ranks categories based on the search query and/or the documents returned for each category and presents the search results to the user by category. Higher ranking categories may be presented more prominently than lower ranking categories.

US Patent Publication No. 2005/0131874 for Method and system for obtaining solutions to contradictional problems from a semantically indexed database by inventor Verbitsky, filed Dec. 15, 2003 and published Jun. 16, 2005, discloses solutions to engineering or other problems obtained by expressing a problem in terms of a natural language query that contains a contradiction and submitting the query to a semantically indexed database. The database will search based on the semantic items that form, respectively, each side of the contradiction and will provide the search results to the user.

U.S. Pat. No. 7,930,634 for Document display apparatus and document display program by inventor Nakamura, filed Sep. 13, 2007 and issued Apr. 19, 2011, discloses a document display apparatus extracting a document element constituting a document and enlarging and displaying the extracted document element. The document display apparatus includes: a document display unit that displays the document element in a first display area; a document element selection detection unit that detects selection of the document element displayed by the document display unit; and a selected document display unit to display the document element detected by the document element selection detection unit in a second display area different from the first display area.

U.S. Pat. No. 7,716,226 for Method and system for probabilistically quantifying and visualizing relevance between two or more citationally or contextually related data objects by inventor Barney, filed Sep. 27, 2005 and issued May 11, 2010, discloses a method for probabilistically quantifying a degree of relevance between two or more citationally or contextually related data objects, such as patent documents, non-patent documents, web pages, personal and corporate contacts information, product information, consumer behavior, technical or scientific information, address information, and the like. In another embodiment, the invention provides a novel method for visualizing and displaying relevance between two or more citationally or contextually related data objects. In another embodiment, the invention provides a novel search input/output interface that utilizes an iterative self-organizing mapping ("SOM") technique to automatically generate a visual map of relevant patents and/or other related documents desired to be explored, searched or analyzed. In another embodiment, the invention provides a novel search input/output interface that displays and/or communicates search input criteria and corresponding search results in a way that facilitates intuitive understanding and visualization of the logical relationships between two or more related concepts being searched.

US Patent Publication No. 2009/0299760 for System and method for maximizing the efficiency and effectiveness of nonprofit scientific and other research by inventors Spradlin et al., filed Mar. 2, 2009 and published Dec. 3, 2009, discloses a computer-implemented system for the exchange of proposed scientific and other research projects and the submission of solutions to such projects. The system facilitates the posting of proposed research projects and the submission of solutions to such projects prepared by interested researchers. The solutions are reviewed according to criteria specified by the research proposal, and, in the event the solutions are accepted, compensation may be paid to the researcher upon transfer of the intellectual property rights in the solution. Subsequent dissemination of the information to the public is also contemplated.

SUMMARY OF THE INVENTION

The present invention relates to searching for and identifying documents based on a semantic signature of the document, and more specifically to constructing a self-assembling network of document nodes for improved semantic searching.

It is an object of this invention to provide a platform and method for identifying documents and other sources similar to an input document, including diverse search results.

In one embodiment, the present invention is directed to a platform for identifying relevant documents, including a server platform, including a processor and a memory, in network communication with at least one user device, wherein the server platform receives at least one input document from the at least one user device to initiate a search, wherein the server platform automatically determines a semantic signature for the at least one input document, where the semantic signature is determined based on a probabilistic distribution of rare words in the at least one input document, wherein the server platform automatically parses a plurality of documents to identify semantic signatures for each of the plurality of documents, and returns a list of documents having semantic signatures substantially similar to the semantic signature of the at least one input document, wherein the server platform automatically identifies one or more communities of documents from the list of documents based on shared similarity of documents within each of the one or more communities of documents, and wherein the server platform graphically displays the list of documents on the at least one user device in the form of a graph, wherein each document is represented by a node and edges are constructed based on similarity of the semantic signatures of connected documents being greater than a preset threshold of similarity.

In another embodiment, the present invention is directed to a method for identifying relevant documents, including providing a server platform, including a processor and a memory, in network communication with at least one user device, the server platform receiving at least one input document from the at least one user device to initiate a search, the server platform automatically determining a semantic signature for the at least one input document, the semantic signature being determined based on a probabilistic distribution of rare words in the at least one input document, the server platform automatically parsing a plurality of documents to identify semantic signatures for each of the plurality of documents, and returning a list of documents having semantic signatures substantially similar to the semantic signature of the at least one input document, the server platform automatically identifying one or more communities of documents from the list of documents based on shared similarity of documents within each of the one or more communities of documents, and the server platform graphically displaying the list of documents on the at least one user device in the form of a graph, wherein each document is represented by a node and edges are constructed based on similarity of the semantic signatures of connected documents being greater than a preset threshold of similarity.

In yet another embodiment, the present invention is directed to a platform for identifying relevant documents, including a server platform, including a processor and a memory, in network communication with at least one user device, wherein the server platform receives at least one input document from the at least one user device to initiate a search, wherein the server platform automatically determines a semantic signature for the at least one input document, where the semantic signature is determined based on a probabilistic distribution of rare words in the at least one input document, wherein the server platform automatically parses a plurality of documents to identify semantic signatures for each of the plurality of documents, and returns a list of documents having semantic signatures substantially similar to the semantic signature of the at least one input document, wherein the server platform graphically displays the list of documents on the at least one user device in the form of a graph, wherein each document is represented by a node and edges are constructed based on similarity of the semantic signatures of connected documents being greater than a preset threshold of similarity, and wherein the server platform generates a trustworthiness score for the plurality of documents based on a semantic graph density for the plurality of documents and/or intrinsic trustworthiness ratings for a source or a type of source of each of the plurality of documents.

These and other aspects of the present invention will become apparent to those skilled in the art after a reading of the following description of the preferred embodiment when considered with the drawings, as they support the claimed invention.

BRIEF DESCRIPTION OF THE DRAWINGS

FIG. 28 is a schematic diagram showing ontological dimensions constituting a solution-entity according to one embodiment of the present invention.

DETAILED DESCRIPTION

Figure 1:
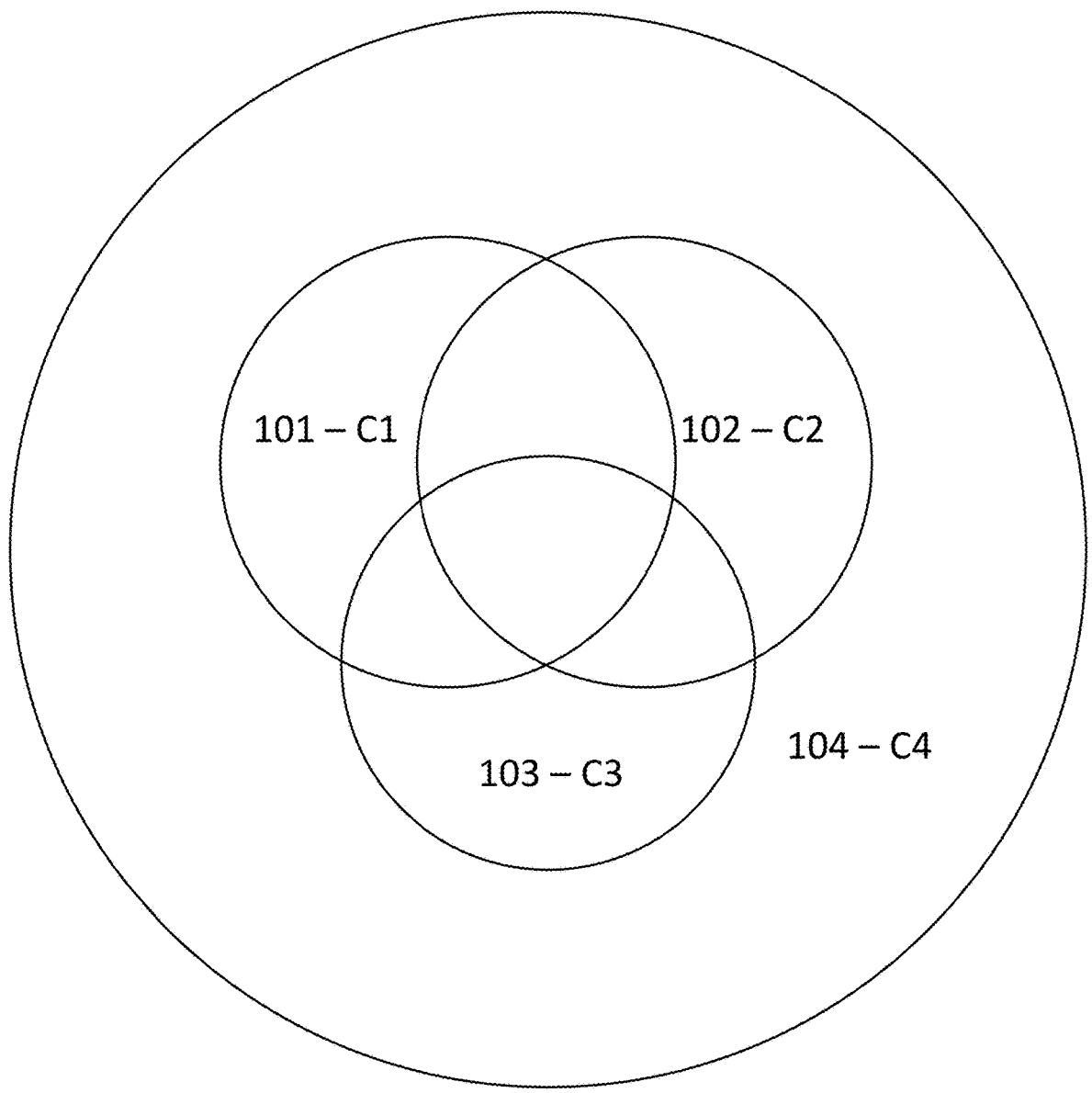
FIG. 1 is a schematic diagram showing ontological dimensions constituting a solution-entity according to one embodiment of the present invention.

The present invention relates to searching for and identifying documents based on a semantic signature of the document, and more specifically to constructing a self-assembling network of document nodes for improved semantic searching.

In one embodiment, the present invention is directed to a platform for identifying relevant documents, including a server platform, including a processor and a memory, in network communication with at least one user device, wherein the server platform receives at least one input document from the at least one user device to initiate a search, wherein the server platform automatically determines a semantic signature for the at least one input document, where the semantic signature is determined based on a probabilistic distribution of rare words in the at least one input document, wherein the server platform automatically parses a plurality of documents to identify semantic signatures for each of the plurality of documents, and returns a list of documents having semantic signatures substantially similar to the semantic signature of the at least one input document, wherein the server platform automatically identifies one or more communities of documents from the list of documents based on shared similarity of documents within each of the one or more communities of documents, and wherein the server platform graphically displays the list of documents on the at least one user device in the form of a graph, wherein each document is represented by a node and edges are constructed based on similarity of the semantic signatures of connected documents being greater than a preset threshold of similarity.

In another embodiment, the present invention is directed to a method for identifying relevant documents, including providing a server platform, including a processor and a memory, in network communication with at least one user device, the server platform receiving at least one input document from the at least one user device to initiate a search, the server platform automatically determining a semantic signature for the at least one input document, the semantic signature being determined based on a probabilistic distribution of rare words in the at least one input document, the server platform automatically parsing a plurality of documents to identify semantic signatures for each of the plurality of documents, and returning a list of documents having semantic signatures substantially similar to the semantic signature of the at least one input document, the server platform automatically identifying one or more communities of documents from the list of documents based on shared similarity of documents within each of the one or more communities of documents, and the server platform graphically displaying the list of documents on the at least one user device in the form of a graph, wherein each document is represented by a node and edges are constructed based on similarity of the semantic signatures of connected documents being greater than a preset threshold of similarity.

In yet another embodiment, the present invention is directed to a platform for identifying relevant documents, including a server platform, including a processor and a memory, in network communication with at least one user device, wherein the server platform receives at least one input document from the at least one user device to initiate a search, wherein the server platform automatically determines a semantic signature for the at least one input document, where the semantic signature is determined based on a probabilistic distribution of rare words in the at least one input document, wherein the server platform automatically parses a plurality of documents to identify semantic signatures for each of the plurality of documents, and returns a list of documents having semantic signatures substantially similar to the semantic signature of the at least one input document, wherein the server platform graphically displays the list of documents on the at least one user device in the form of a graph, wherein each document is represented by a node and edges are constructed based on similarity of the semantic signatures of connected documents being greater than a preset threshold of similarity, and wherein the server platform generates a trustworthiness score for the plurality of documents based on a semantic graph density for the plurality of documents and/or intrinsic trustworthiness ratings for a source or a type of source of each of the plurality of documents.

The world includes a multitude of problems, both large-scale (e.g., climate change, global pandemics, etc.) and smaller-scale (e.g., improving battery efficiency) that need to be addressed. While researchers tend to fund projects directed to solving specific problems, this system produces inefficiencies. Notably, technologies produced to solve a specific problem, whether or not they are successful in solving that problem, are often useful in solving separate issues not previously contemplated by the research proposal, especially when those technologies are combined with additional other technologies. In the context of innovation to improve research, many inventions, such as that described in US Patent Publication No. 2009/0299760, are directed to improving this paradigm of one-to-one problem-solution matching, rather than producing a more radical shift in focus. One example of a technology with important effects separate from its original purpose was sildenafil citrate, now commonly marketed as VIAGRA. Sildenafil citrate was initially developed as an antihypertensive agent, but its effects in treating erectile dysfunction turned out to be more prominent, indicating the potential value of drugs, for example, for addressing unintended concerns.

In addition to inefficiencies in the research process, difficulties in finding relevant information to solving the problem, such as looking for permutations of a single technology in the existing art, also slows down or interrupts the creative process. This difficulty is made particularly acute in light of the patent system, where independent inventors and small companies are often faced with difficulties in finding the most relevant prior art in a given field such that the inventors are able to design around the prior art. Designing around is important for the creative process as it both allows the inventor to produce patentable inventions that have a higher potential for monetization and allows the inventor to avoid infringing existing patented solutions.

Existing structured knowledge databases, such as Wikipedia, are highly limited in their search capabilities, as they rely on a rigid taxonomic classification for articles that produces an arbitrary structural bias inhibiting thorough, useful, and efficient research. In other instances, such as when searching patent databases (e.g., United States Patent and Trademark Office (USPTO) database, World Intellectual Property Organization (WIPO) database, GOOGLE Patents, etc.), inventors and attorneys manually search for documents similar to a proposed technology and must themselves identify complex and often obscure relationships between other documents and a proposed technology. This process is often unreliable, as it relies sometimes on chance associations, the specific knowledge base of the searcher, and any biases in the search terms and/or search process utilized by the searcher.

In order to identify potentially useful solutions and/or technologies to identify a problem or to identify existing issues that a proposed technology is likely to address, it is important to have a high-quality search architecture for sifting through large amounts of existing documentation. Many existing search engines utilize keywords to conduct searches. Keywords are typically a limited set of words associated with each document, often selected by the author of the document, the editor of the document, or the compiler of the search engine. Because keywords are often selected by different sources, there is a critical lack of consistency between sources for keywords used, even when referring to essentially the same topic, and no meaningful hierarchy of keywords is usually available. As such searches based on these keywords are typically inconsistent and of poor quality. Because keywords are limited in number, these keywords often fail to sufficiently grasp the technical details and nuances of each document in a manner sufficient for highly technical searches, where subtle differences between documents are critical. This is especially important, for example, in patent prior art searches, where the existence of a particular feature or a change in a single parameter is often the defining quality of relevancy for identifying close prior art. Therefore, a search system is needed for accurately and thoroughly identifying a diverse set of documents matching search criteria, especially for identifying potential solutions and/or technologies able to address a specific problem.

Keywords are also flawed in that they sometimes have multiple, different meanings, which affects search results in some instances. Furthermore, even if keywords have a relatively consistent meaning when first generated, longer term changes in language and word meaning have the potential to make originally clear keywords become arbitrary. Finally, keywords are often poor for searches involving documents from multiple languages. Even if the search algorithm accounts for a single translation of the keyword in another language, some keywords have multiple, if not plentiful, accurate translations in the other language that are easily elided in such systems. Therefore, a system is needed that improves upon and/or supplants keyword search systems.

Instead of keywords, the present invention utilizes semantic signatures. The present invention identifies at least one semantic signature to each document. Semantic signatures are a mathematical expression of a statistical pattern of rare words within each document. Rare words, as used in this application, are defined as those words that are not within the top 7,000 most commonly used words in a modern English corpus. By utilizing rare words within each document to form a semantic signature, the platform is able to identify similar documents based on similar semantic signatures, even for a document that lack citations, references, links, or other meta-data that otherwise connects the two documents.

Document Intake and Aggregate Document Analysis

In one embodiment, the platform receives one or more input documents from at least one user device in order to initiate a search. The platform treats the one or more input documents as arrays of words and calculates frequencies of word usage within each document relative to documents in a larger corpus (i.e., a set of documents within one or more databases). The platform therefore automatically identifies a semantic signature for the one or more input documents and subsequently searches one or more databases for documents having similar semantic signatures. This method is an improvement upon keyword searches, as it does not utilize a small number of words believed to accurately describe input documents in order to find similar documents, but instead takes into account hundreds, if not thousands, of rare words in constructing the semantic signature, thereby facilitating a more robust search.

In one embodiment, where multiple input documents are provided, the database automatically combines the set of rare words listed in each input document in order to generate an aggregate semantic signature, which is able to be used to find similar documents. Combinations of the rare words in the one or more documents are accomplished by a multitude of mathematical operations, including, but not limited to, the following: (1) the union of set of words from each document; (2) the intersection of a set of words from each document; (3) the disjoint union of a set of words from each document; (4) the coproduct (or categorical sum) of a set of words from each document; (5) the compliment (or relative compliment) of a set of words from each document; and/or (6) the symmetric difference of a set of words from each document. In another embodiment, separate semantic signatures are generated for each input document and the system automatically searches for documents that match each separate semantic signature. In yet another embodiment, in addition to receiving the one or more input documents, the platform receives one or more additional words or phrases. The one or more additional words or phrases are automatically combined with the semantic signature of the one or more documents to produce an adjusted semantic signature. In another embodiment, the additional words or phrases are not combined with the semantic signature, but instead express a limited list of relevant rare words for the semantic signature to consider and/or a list of irrelevant rare words for the semantic signature not to consider.

A document-based query system to accelerate serendipitous search is further extended through the use of document addition. In particular, in one embodiment, multiple documents are combined to form an aggregated document set search query, where the rare words from each document are combined to form a meta-query. By use of the set of rare words integrated together from different documents in the set, this search strategy enables an aggregated meaning derived from a set of documents to be used to form the meta-query, even if the user cannot clearly or completely articulate the full meaning of the integrated document set. In other words, multiple documents are combined to form an aggregated semantic signature that is used as a meta-query, concurrently enabling, in the same query, a search for non-query documents that most closely match the semantic signature of the meta-query.

There are several use cases for the use of a document set to form a meta-query, including but not limited to the following:

1. Multiple Documents as Semantic Signature to Determine Domain Expertise for Knowledge Workers and Assignment to Best Matching Document Analyses By way of non-limiting example, the document-based work product of a knowledge worker (including but not limited to a research scientist, an engineer, an attorney, a patent agent, an investment analyst, a finance professional, a journalist, an educator, an academic researcher, and similar and related professions and functional roles in an organization) is combined to form a semantic signature for that knowledge worker. Such a semantic signature, formed from the addition, combination, and/or integration of the documents comprising their work product, is used as a meta-query to detect other knowledge workers with similar knowledge, skills, experience, and/or expertise. Detecting such similar knowledge workers enables users of the search system to find experts in a particular field of knowledge.

2. Multiple Documents as Semantic Signature to Define a Place, Product, Process, or Organization and Assignment to Best Matching Document Analyses By way of non-limiting example, the document-based descriptions of a place, product, process, or organization are combined to form a semantic signature for that place, product, process, or organization. Such a semantic signature, formed from the addition, combination, and/or integration of the documents comprising the description of said place, product, process, or organization, is used as a meta-query to detect other places, products, processes, or organizations with similar and/or related attributes. Detecting such similar places, products, processes, or organizations enables users of the search system to find specific places, products, processes, or organizations with specific attributes of interest to the user of the system, even if the user cannot fully articulate the set of attributes that comprises the search query.

3. Multiple Documents as Semantic Signature to Determine Relative Contribution of Individual Documents to An Aggregated Document Set By way of non-limiting example, the relative contribution of one set of documents (the "input documents") to the composition of another document (the "analyte document") is determined by subtracting out the semantic signatures of any of a set of input documents until the analyze document has no remaining semantic content. This is accomplished by first determining the relatively rare words in each input document, forming semantic signature for each discrete input document, then comparing these discrete signatures against the semantic signature of the analyte document.

By way of non-limiting example, an iterative, goal-seeking function is used to subtract out the semantic signatures of any of the members of a set of input documents, with the goal of minimizing the total number of document subtractions that are required to remove all content (rare words) from the semantic signature of the analyte document. For a given document subtraction, the statistical pattern of relatively rare words in a particular input document are compared to the statistical pattern of relative rare words in the analyte document, and where matches are found, the rare word matches in the analyte document are used to identify and remove those rare words from the semantic signature of the analyte document in the next round of document subtraction.

More generally, similar or related operations common to set theory, topology, formal language theory, naïve set theory, and the like, are performed on documents, sets of documents, words, and sets of words, in any combination, as a means of refining a document-based meta-query search. In each case, the relative weightings of individual relatively rare words within a document, or resulting from a mathematical operation performed on a document or set of documents, is adjusted automatically to up-weight or down-weight the relative importance of any word or document in a meta-query. Further, the relative weights of different documents in a set is adjusted automatically to upweight or down-weight the relative importance of any document or set of documents in a meta-query.

Vector Modeling

Advantages of a vector space model include (i) relative xmodel simplicity through the use of linear algebra, (ii) non-binary term weights, (iii) computation of a continuous degree of similarity between queries and documents, and (iv) relevance ranking based on partial matching. Models based on and extending the vector space model include but are not limited to generalized vector space modeling, latent semantic analyses, term discrimination, Rocchio classification, and random Indexing. Further SVM extensions include but are not limited to the use of singular value decomposition and lexical databases. Open source software capable of these forms of analyses include but are not limited to: (i) Apache Lucene, a high-performance, full-featured text search engine library written in Java, (ii) Gensim, a Python+NumPy framework for Vector Space modeling, which includes algorithms for Tf-idf, Latent Semantic Indexing, Random Projections and Latent Dirichlet Allocation, and (iv) Weka, a popular data mining package for Java including WordVectors and Bag Of Words models.

Vector space models represent textual data at different organizational scales. As one non-limiting example, Word2vec is a group of related models that are used to produce word embeddings. These models are shallow, two-layerneural networks that are trained to reconstruct linguistic contexts of words. Word2vec takes as its input a large corpus of text and produces a high-dimensional space (typically of several hundred dimensions), with each unique word in the corpus being assigned a corresponding vector in the space. Word vectors are positioned in the vector space such that words that share common contexts in the corpus are located in close proximity to one another in the space. Word2vec produces a distributed representation of words either as a continuous bag-of-words (CBOW) or as a continuous skip-gram. By the continuous bag-of-words architecture, such a model predicts the current word by using a window of surrounding context words. The order of context words does not influence prediction (an inherent assumption for a bag-of-words model). By the continuous skip-gram architecture, the model uses a current word to predict its surrounding window of context words. The skipgram architecture weights nearby context words more heavily than more distant context words. At larger organizational scale, and as another non-limiting example, Doc2vec algorithms extend word2vec algorithms to utilize unsupervised learning of continuous representations for larger groupings of text, including but not limited to sentences, paragraphs, entire documents, or groups of documents.

In machine learning, support vector machines (SVMs, also support vector networks) are supervised learning models with associated learning algorithms that analyze data used for classification and regression analysis (Campbell and Ying, 2011, whose contents are fully incorporated by reference into this application for all purposes; Crammer et al, 2001, whose contents are fully incorporated by reference into this application for all purposes; Hsu and Lin, 2002, whose contents are fully incorporated by reference into this application for all purposes; Lee and Wahba, 2001, whose contents are fully incorporated by reference into this application for all purposes; Smola and Scholkopf, 2004, whose contents are fully incorporated by reference into this application for all purposes; Taddy, 2015, whose contents are fully incorporated by reference into this application for all purposes). Given a set of training documents, each marked for belonging to one or more categories, an SVM training algorithm builds a model that assigns new documents into particular categories, in a form of non-probabilistic binary linear classification. An SVM model is a representation of documents represented as points in space, mapped so that the documents in separate categories are divided by as clear a gap as possible. New documents are then mapped into that same space and predicted to belong to a category based on which side of the gap they fall on.

In addition to performing linear classification, SVMs efficiently perform a non-linear classification using what is called the "kernel trick", implicitly mapping their inputs into high-dimensional feature spaces. Kernel methods require only a user-specified kernel, i.e., a similarity function over pairs of data points in raw representation. Kernel methods owe their name to the use of kernel functions, which enable them to operate in a high-dimensional, implicit feature space without ever computing the coordinates of the data in that space, but rather by simply computing the inner products between the images of all pairs of data in the feature space. This operation is often computationally cheaper than the explicit computation of the coordinates. This approach is called the "kernel trick". The kernel trick avoids the explicit mapping that is otherwise needed to get linear learning algorithms to learn a nonlinear function or decision boundary.

When data are not labeled, supervised learning is not possible, and an unsupervised learning approach is required, which attempts to find natural clustering of the data to groups, and then map new data to these formed groups. The clustering algorithm which provides an improvement to the support vector machines is called support vector clustering. Support Vector Clustering is a similar method that also builds on kernel functions but is appropriate for unsupervised learning and data-mining. SVC is enabled by a range of potential frameworks: (i) Multi-class SVM aims to assign labels to instances by using support vector machines, where the labels are drawn from a finite set of several elements. The dominant approach for doing so is to reduce the single multiclass problem into multiple binary classification problems, (ii) Transductive support vector machines extend SVMs in that they could also treat partially labeled data in semi-supervised learning by following the principles of transduction, (iii) Newton-like iterations use an interior point method to find a solution of the Karush-Kuhn-Tucker conditions of the primal and dual problems. Instead of solving a sequence of broken down problems, this approach directly solves the problem altogether. To avoid solving a linear system involving the large kernel matrix, a low rank approximation to the matrix is often used in the kernel trick, and (iv) Platt's sequential minimal optimization (SMO) algorithm, which breaks the problem down into 2-dimensional sub-problems that are solved analytically, eliminating the need for a numerical optimization algorithm and matrix storage. Kernel SVMs are available in many machine learning toolkits, including LIBSVM, MATLAB, SAS, SVM-light, kernlab, scikit-learn, Shogun, Weka, JKernelMachines, OpenCV and similar and/or related methods.

On occasion, a document, or set of documents, are either misclassified, or the classification schema itself requires updating as classification conditions change. Under such scenarios, reclassification of part or all of a document category is useful. In one embodiment, reclassifying one or more of the documents or document sets includes receiving an input indicating a new classification for one or more documents or document sets and changing a classification of the one or more documents or document sets from a current classification to the new classification in response to the input. By way of example, and not by way of limitation, to carry our reclassification one or more times in an evolving or otherwise changing document categorization schema, individual documents, groups of documents, or entire document categories are selected for supervised reclassification. By way of non-limiting example, a user selects any combination of individual documents, groups of documents, or entire document categories to flag such document content for reclassification. Selections are made through any of several means, including but not limited to the creation of text-based lists in free-form, graphical selection of documents or sets of documents represented in a graphical user interface, where such graphical selection are carried out, by way of non-limiting example, through the use of (1) mouse clicks or display screen touches to select specific documents, (2) lassos to select a grouping of documents, and/or (3) highlighting specific documents in a graphical user interface, and similar and/or related means to identify and flag particular documents or groups of documents. Once selected, flagged documents are reclassified by a user through any of several means, including but not limited to (1) selection of a new classification category from a drop-down menu of category choices, (2) highlighting from a list of preexisting document classification categories, and/or (3) similar and/or related methods to select a document classification category from a set of document classification categories. Upon category selection, the selected and flagged set of documents to be reclassified are then used to train or retrain the reclassified document category to the selected set of documents, using any combination of the machine learning methods described above. Training is performed based on only the newly reclassified content selected and flagged by the user, or training is performed using a combination of previously classified content combined in part or in all with the newly reclassified content selected and flagged by the user.

Textual Analysis And Semantic Signature-Creation

In one embodiment, semantic signatures are identified in part through text mining. Textual and other data—whether unstructured, semi-structured, or structured, is analyzed for latent semantic content, as described, for example, in Srivastava, AN. and M. Sahami, eds. (2009). Text Mining. Classification, Clustering, and Applications. CRC press, which is incorporated herein by reference in its entirety. However, unstructured content is growing at 10 to 50 times the rate of structured data and is set to increase by 800% over the next 5 years, so manual analysis via preexisting methods is inherently not a scalable approach. Further, the manual associations being made between vast datasets unavoidably relies upon arbitrary classifications, imperfections of memory and logic that impair the validity of any insights resulting and the utility of such comparisons. Therefore, several attempts have been made to automate analysis of latent semantic content.

Latent Semantic Analysis (LSA), as described in Deerwester, S., Dumais, G. W., Furnas, S. T., Landauer, T. K., & Harshman, R. (1990). Indexing by latent semantic analysis. Journal of the American Society for Information Science, 41, 391-407, which is incorporated herein by reference in its entirety, is based on mapping high dimensional count vectors, such as term-frequency (tf) vectors arising in the vector space representation of text documents to a lower dimensional representation in a so-called latent semantic space, as described in Salton, G. & McGill, M. J. (1983). Introduction to Modern Information Retrieval. New York: McGraw-Hill, which is incorporated herein by reference in its entirety. In doing so, LSA aims at finding a data mapping that provides information beyond the lexical level of word occurrences. The ultimate goal is to represent semantic relations between words and/or documents in terms of their proximity in the semantic space. However, it is worth noting that representation obtained by LSA is unable to handle polysemy (i.e., multiple senses of a word) effectively.

Probabilistic Latent Semantics Analysis (PLSA) arises from a statistical approach to LSA, as described in Hofmann, T., Puzicha, J., & Jordan, M. I. (1999). Unsupervised learning from dyadic data. In Advances in Neural Information Processing Systems, Vol. 11, MIT Press, which is incorporated herein by reference in its entirety. PLSA associates a latent context variable with each word occurrence, which explicitly accounts for polysemy. This approach is based on a latent variable model for co-occurrence data which associates an unobserved class variable with each observation, an observation being the occurrence of a word in a particular document. As such, PLSA is limiting in that it strictly requires the number of word latent classes to be equal to the number of document latent classes. This limitation arises when sentences in documents have cluster structures that are potentially different from the document cluster structures.

Other approaches to handling polysemic parts of speech have been described, including U.S. Pat. No. 5,873,056, incorporated herein by reference in its entirety, which discloses a natural language system that takes unformatted unstructured text and creates vector representations of the text. This vector relates to a single sentence, clause or an entire document. A subject code is then assigned from a database of lexical subjects. In one embodiment, this database includes a dictionary or any other word resource, containing semantic classification information. The system is claimed to have the capacity to separate different meanings, or senses of a given word, a capability called polysemic disambiguation. The most likely applicable subject code is applied to each word selected from the plurality. There are proposed methods of handling syntactical variations such as hyphenation of terms, which are checked to see if they are recognized, or separated and parsed separately. However, because documents are not written for the express purpose of being indexed and tagged, the imprecise nature and use of language makes the above approach prone to classification inaccuracies.

Word sense disambiguation (WSD) is a subfield of computational linguistics in which computer systems are designed to determine the appropriate meaning of a word as it appears in the linguistic context. Most WSD research has been conducted using an inventory for which there is a sample of manually disambiguated data that is used for testing, such as WordNet described in Fellbaum, Christiane, editor. (1998). WordNet, an electronic lexical database. Cambridge, MA: The MIT Press, which is incorporated herein by reference in its entirety. WordNet is designed similarly to a thesaurus, rather than a dictionary, with words listed in groups of near-synonyms (called synsets) and where each word is listed in however many synsets fit its meanings. These synsets are specific to different parts-of-speech (POS) (nouns, verbs, adjectives and adverbs) and are linked to each other by semantic relations such as hyponymy and antonymy with hyponymy being the main relation used for nouns and verbs. WSD systems are designed to look for clues from the context that has been provided using information from either man-made lexical resources or corpus data or both. The standard classification of WSD systems uses the term 'knowledge-based' for systems that use man-made lexical resources and splits corpus-based approaches into two types: 'supervised' and 'unsupervised' systems. Supervised systems use a predefined inventory and hand-labeled training data produced by human annotators who supply the correct sense label from the inventory for each instance of the word as it appears in context. This data is equal in form to the data used for testing, but the training data are kept separate so as not to bias the evaluation. The systems learn from the hand-labeled training examples. Unsupervised systems, on the other hand, learn from corpus data that have not been hand-labeled for word meaning, and any processing of the corpus data is done automatically by the platform.

Parsing technology has generally moved from grammar-based approaches to probabilistic data-driven machine learning. However, successful implementation of data-driven techniques depends on substantial volumes of annotated text and extensive training data sets that are time-consuming to produce and the required high quality of such sets makes a crowd-sourced acquisition of such data hard to ensure. Accordingly, there is currently a trend for reducing the supervision required by using mostly unstructured and/or semi-structured data, as discussed in Baharudin, B., Hong Lee, L. and K. Khan. (2010). A Review of Machine Learning Algorithms for Text-Documents Classification. Journal of Advances in Information Technology, 1 (1): 4-20, which is incorporated herein by reference in its entirety.

One approach leverages the latent variables hidden or implicit in probabilistic models. In particular, the approach uses free flowing natural language combined with domain-specific terminology and numeric phrases, as discussed in Hawizy, L., David M Jessop, D. M., Adams N. and P. Murray-Rust (2011). ChemicalTagger: A tool for semantic text-mining in chemistry. Journal of Cheminformatics 3:41, which is incorporated herein by reference in its entirety. Given the highly stylized and formulaic language which occurs in many disciplines, such as delimitations by typographic conventions such as newlines and bold text, technology-specific entities and terminology from different scientific domains, stock phrases, and data phrases including units of measurement. As such, these types of documents, including patents, as well as scientific and medical literature, provide a rich source for the development of machine processes for automatic information extraction. Text-mining often uses Natural Language Processing (NLP) tools for the automatic discovery of previously unknown information from such data, where computer systems are designed to identify the correct meaning (or sense) of a word in a given context.

Word clustering is carried out through a variety of means including through type-based, token-based, and knowledge-based approaches. In the type-based approaches, words are clustered together by virtue of the contexts in which they occur and these clusters of word types are used to represent senses. For each target word, a ranked list of related words is obtained called nearest neighbors. These neighbors are ranked using a measure of the number of shared contexts that they have with the target word; the higher the score, the 'closer' the neighbor. The assumption is that the similarity of the contexts is indicative of the semantic similarity.

In token-based approaches, clustering is based on word instances. For example, Schutze, Hinrich. (1998). Automatic word sense discrimination. Computational Linguistics 24 (1): 97-123, which is incorporated herein by reference in its entirety, uses a type-based approach that simply represents every word type (e.g., regime, animal) by a vector of the co-occurrence frequency each word has with a fixed set of words selected using an automatic machine learning approach for being particularly informative for the task. Then to represent each token instance of a word, the method uses the centroid (normalized average) of all the vector representations of the word types occurring in the context of a target instance. These centroid vectors representing the occurrences of the target word are then clustered into groups.

In knowledge-based approaches, human-generated lexical resources, such as dictionaries and thesauruses are used as a semantic framework. If the resource has a broad enough coverage, the technique will be applicable to most words in the language, though it possibly does not adapt well to domain specific text and it is only able to be applied to languages that have a lexical resource with the required information.

In one embodiment, once parsing out of salient parts of speech has been achieved, the method compares the two datasets, however current approaches such as U.S. Pat. No. 7,716,226, which is incorporated herein by reference in its entirety, are limited to the framework of a citation network whereby a first generation relatedness score is applied to two or more input documents. The first generation relatedness score is calculated by a computer at least in part by counting a number of shared citational relationships occurring between said two or more input documents.

Bi-mixture PLSA, as described in Shen, C., Li, T. and C. H. Q. Ding. (2011). Integrating Clustering and Multi-Document Summarization by Bi-Mixture Probabilistic Latent Semantic Analysis (PLSA) with Sentence Bases. Proceedings of the Twenty-Fifth AAA! Conference on Artificial Intelligence, pp. 914-920, which is incorporated herein by reference in its entirety, is a recent approach to PLSA that permits the number of latent word classes to be different from the number of latent document classes. This strategy extends co-clustering of documents and words to co-clustering of documents and sentences. By simultaneously clustering documents and sentences, this approach leverages mutual influence to improve the clustering of both layers.

U.S. Pat. No. 7,930,634, which is incorporated herein by reference in its entirety, discloses a method of representing a corpus of text and images from the use of either graphical or text reference symbols. However, this approach has no user-controlled selection of particular text or image data relative to a user-defined description that would otherwise provide context for the data representation and enable machine learning training.

Measuring the similarity between implicit semantic relations is an important task in information retrieval and natural language processing. Accurate measurement of relational similarity is an important step in numerous natural language processing tasks. For example, Bollegala, D., Matsuo, Y, and M. Ishizuka. (2009). Measuring the similarity between implicit semantic relations using web search engines. WSDM '09 Proceedings of the Second ACM International Conference on Web Search and Data Mining ACM New York, NY, USA, which is incorporated herein by reference in its entirety, uses web search engines to efficiently compute the relational similarity between two pairs of words by (1) representing the various semantic relations that exist between a pair of words using automatically extracted lexical patterns, (2) clustering the extracted lexical patterns to identify the different semantic relations implied by them, and (3) measuring the similarity between different semantic relations using an inter-cluster correlation matrix. The method then uses a pattern extraction algorithm to extract a large number of lexical patterns that express numerous semantic relations, clusters the extracted lexical patterns, and measures the relational similarity between word-pairs using inter-cluster correlation.

Once a database has been created that contains the data elements which relate to the parametric attributes of interest, that data is used to map graphical images, and render network representations of ontologically separable entities positioned relative to their relatedness on one or more ontological dimensions.

By way of non-limiting example, using an automated source document scraping system, such as the software tool Automation Anywhere Enterprise (AAE), a web-based database of content, such as the contents of Wikipedia and/or other encyclopedic content as well as the U.S. or other patent database (see for example http://www.uspto.gov/patents/process/search/), is accessed for scientific publications, patent documents, and Curriculum Vitae as well as many other forms and classes of source documents.

In one embodiment, a "macro" is established using a web recording functionality enabled by the AAE tool, where a web recorder monitors the processes performed on a user device while analyzing a single patent. In particular, the web recorder monitors the user and/or system as the user and/or system tags specific fields within the source document content to be extracted, including, but not limited to, content found in any of several forms summarized below.

For Wikipedia and/or other encyclopedic content, content to be scraped includes but is not limited to outlines that survey key articles in Wikipedia, outlines of knowledge divided by field of study, subject overviews structured as lists that identify the subjects' topics and show how they are related to each other, topic lists for related content, including other lists, lists of countries and territories, lists of people including by nationality and/or by occupation, alphabetical indexes including indexes of articles, subject overviews in structured lists that show how topics are related to each other, timelines that list articles chronologically, such as historical timelines, often arranged by subject and/or by major events, peer-reviewed feature content, such as featured written and/or spoken articles, pictures, sounds, videos, and/or portals, indices of major categories, often arranged by subject, article categories, content categories, various types of encyclopedic content, such as content that assists with the navigation of the encyclopedia, as well as pages related to the maintenance of the encyclopedia, fundamental categories containing the most fundamental ontological categories, such that every article category system is reasonably expected to be found, lists of Dewey Decimal classes, Library of Congress classification subjects, content based on Roget's Thesaurus, glossaries, references, languages, and related matter.

For U.S. and other patents, content to be scraped includes, but is not limited to, the patent title, abstract, inventors, assignees, filing date, issuing date, art group, related patents and patent families, related scientific or technical literature, patent examiner names, funding sources, field of invention, related art, focal topics, technologies applied to or leveraged for the invention, technologies enabled by the invention, methods applied to and/or leveraged for the invention, methods enabled by the invention, physical and/or chemical laws leveraged for and/or limiting the invention, invention context, invention function, invention enablers, invention constraints (including, but not limited to, limitations which bound the invention functionality including but not limited to length scale, time scale, temperature range, pressure range, pH, state of matter (solid, liquid, gas, and/or plasma), state of phase, and so forth), invention functional properties, invention structural properties, invention structural properties, functional gaps, and the like. For fields that are explicitly formatted within the framework of the U.S. patent, tagging that format while AAE web monitoring is being carried out will enable a macro to be created that automatically repeats that process with other patents. For fields that are not explicitly formatted, such as a length scale constraint, the AAE tool scans the words within the patent file for a particular target keyword, such as "nanometer" or "micrometer" or "diameter" or "length" or "width", and so forth, and a numerical element sought out within a specified number of words before and/or after that keyword. In this manner the patent content is mined and specific fields extracted for specific attributes.

For scientific publications, content to be scraped includes but is not limited to article title, article authors, author institution(s), author location(s), institution location(s), department affiliation(s), article abstract, which summarizes the content of the article, an introduction section which describes the research rationale, background, and related work, a material and/or methods section that provides often rich experimental detail as to the conduct of the research, including but not limited to formulae, recipes, reagents and sources of reagents, experimental materials and sources of experimental materials, the operating environment(s) in which the experiment(s) were conducted, including but not limited to static and/or changing measurements of temperature, time, pressure, light, sound, mechanical stress and/or strain, statistics of sample numbers and sizes, and/or other experimental parameters, a results section which typically summarizes the experimental outcome, often in tabular and/or graphical format, often with statistical analyses, a discussion section which deduces certain implications from comparison of the experimental design and the results, a conclusion section which suggests potential implications based on the discussion and results, often logically deduced from such information, and which often suggests next steps and further experimental strategy based on such information, a references section which lists other research articles, material sources, vendors, software, and other supporting information.

For Curriculum Vitae, content to be scraped includes but is not limited to name, current title(s), current location(s), current affiliation(s) (including but not limited to company, organization, or institution), past title(s), past affiliations (including but not limited to company, organization, or institution), educational degrees (including but not limited to degree level(s), year(s) of degree completion(s), and field(s) of study), name(s) of educational institutions, location(s) of educational institution(s), (recommendations, connections to other individuals, website URLs, professional summaries, experience summaries (including but not limited to role titles, role descriptions, industry, role duration, location, accomplishments, and description of organizational affiliations (such as size of organization and field of endeavor), listing of skills and/or experience, often by keywords, professional interests, personal interests, professional associations, personal associations, honors and/or awards, professional objectives and/or goals, personal information, publications, presentations such as public speeches at professional conferences, issued patents and/or pending patent applications, languages spoken and/or written, level of language fluency for each language spoken and/or written, and related and other supporting materials. File formats are typically in ASCII or other machine-readable text. If a file format is in a pdf format, optical character recognition software is used to process the pdf to make it more readable as ASCII characters. There are several potential sources of on-line resume databases including www.linkedin.com.

Once the web recorder function has been completed for a representative source document, where the AAE tool grabs data as for example data tables, the data is then be exported automatically to any of several databases, including, but not limited to, Microsoft Excel, Microsoft Access, Microsoft SQL server, DB2, Oracle, and the like.

Once the AAE tool has carried out its extraction functions for one patent file, the process is automatically repeated for multiple additional patent files. By way of non-limiting example, for patents, if the monitoring system records the user pressing the "next" button within the U.S.P.T.O. website page, embedding that step within the macro then automatically enables a continuous extraction process. In one illustrative scraping demonstration session, a sample of 31 patents had four data fields (Inventors, Assignee, Application Number, Filing Date) extracted in 229 seconds, indicating a non-optimized scraping/extraction rate of about 1.85 seconds per patent-field. If 30 fields were extracted per patent scrape, then one patent requires about one minute for complete extraction. This suggests about 1,440 patents per day, or 525,600 patents per year, so for 8,000,000 patents, the scraping process takes a minimum of about 15.2 years. In one embodiment, to minimize the extraction time, multiple simultaneous patent scraping systems are employed: 15 concurrent systems reduce the total scraping time to one year, while 150 concurrent systems running in parallel reduces the total scraping time to less than two months, or 1500 less than a week. Since massively parallel computing is now able to be bought inexpensively, this is readily achievable.

In addition to the publicly available patent and patent application databases in the United States, Europe, and elsewhere, additional data is extracted in a similar manner, including but not limited to scientific and/or technical literature, patents and patent applications, case law, computer code, news articles, web site contents, books, journal articles, trade press articles, brochures, technical specifications of products and/or process, reviews of movies, musical pieces, literature, newspaper articles, magazine articles, books, financial data and documents, poems, blogs, social media content such as blogs, posts, and/or tweets, art forms, food recipes, training manuals, operating procedures, accounting procedures, financial analyses, Securities Exchange Commission (SEC) documents, Federal Reserve Notes, related matter, and so forth.

As similarly themed documents often use similar words, one approach to minimizing potential taxonomic bias is to categorize the relatedness of an entity by parsing the documents for parts of speech and assess the frequency in the manner already described in the detailed description of the invention to produce a similarity metric.

Ontological dimensions such as capability, composition, characteristic, and context, as well as related dimensions, are used to link together related entities based on their relative level of similarity (i.e., more closely related entities are positioned closer together on an ontological dimension, while less closely related entities are positioned farther apart on the same ontological dimension).

Specific claims from within databases are taken and posed back to a different user as either a true/false multiple-choice type question or as a pick from a list type question (e.g., best of five). This provides a crowd confidence weight to a given entry. In one embodiment, entries with a consistently low crowd weight are effectively downweighted and/or flagged for specialist review of the content.

Need is a dynamic phenomenon. For example, the need for new antibiotics for multidrug resistant infections is growing, but the absolute need for trauma surgeons six months after a natural disaster might diminish. The other resources that fluctuate in demand include; clean water, food, energy generators, IV fluids, essential medicines, sanitation, vaccines, temporary shelters, heavy machinery for moving rubble, transportation infrastructure, etc. It is therefore likely that a given need should be reviewed for temporal and factual validity by automated parsing of the contents against web sources to look for recent and relevant news, journal articles or other sources, as well as manually—and the individual logger should curate it as it tracks them by the unique entry identifier. In some instances, a decay factor is modeled based on system-learned behavior of the above mechanisms to predict how the relevance of a given or need changes over time based on construction of need archetypes.

Pair-wise comparison of documents is a central bottleneck for the computational processes described above. Accordingly, a computational framework was implemented to release this bottleneck and thus allow for the massive parallelization of document assembly and feature detection in semantic networks. This strategy implements algorithms as multiple logical processes that do not share state but rather communicate by passing messages. This approach enables algorithm implementation as a single program while leveraging the resources of multiple machines.

Designing and implementing concurrent systems is inherently hard, and distributed concurrent systems are even harder because they incorporate the difficulties of distributed memories where networks are comparatively slow and often unreliable. Our choices of technologies and techniques are aimed at taming the inherent complexity of distributed concurrency to give us a better balance of development time vs. the quality of result in terms of correctness and robustness to failures (e.g., network failures).

Identification and extraction of "high-signal" words in a document (the rarest words that inform document meaning) makes use of distributed processing, and so leverages the parameterized work queue pattern described above. The document ingest problem is not trivial to solve in a distributed or parallel manner. While each document is independent, as part of ingesting a corpus it is important to assign numeric term ids for every term in every document. It is essential that the same term in different documents be assigned the same term id, as this consistency allows cross-document comparisons.

However, one does not know in advance what terms will occur in a corpus, and these terms are only discovered during the process of document ingestion. In particular, the platform independently processes two documents and, in both cases, comes across a new term that has not been assigned a term id. It is necessary to output a processed form of both documents where this same term uses the same term id. Achieving this outcome requires some form of communication so that the term id to use is agreed upon. A distributed algorithm for term id assignment has been developed, where a central process maintains an authoritative mapping from terms to term ids. Processes that are ingesting documents communicate with this central process to find out the authoritative term id assignment for new terms they encounter while reading in new documents. This communication is done asynchronously so that the worker processes continues to process more documents while they wait to confirm authoritative terms ids of pending documents.

For corpus ingestion, the top-level process in charge of corpus ingestion creates a work queue and submits all the corpus fragments. It also starts a helper process for the authoritative term id mapping. It gives the work queue the procedure to run on all the workers. This procedure is then responsible for processing a sequence of corpus fragments as given to it by the work queue master process.

To process an individual corpus fragment, the work queue starts up a number of helper processes: (i) one for reading documents from disk or S3 location, (ii) one for writing processed documents to disk (or S3), and (iii) one to perform the processing itself. This latter process is put in touch with the central process that maintains the authoritative term id mapping. It then proceeds through the documents sequentially (via the helper input process), occasionally exchanging messages with the central authoritative term id process, and pushing completed documents (via the helper output process). During processing, it is sometimes necessary to hold onto pending documents until authoritative term ids are assigned for all terms. This will typically not be very large, so overall the worker processes incrementally churn through very large sets of documents without requiring very large memory usage.

Network Construction and Analysis

The semantic signatures are used to construct networks/graphs of documents as nodes connected based on relatedness. Networks contain interconnected sets of discrete nodes whose connectivity is related to the relatedness of those nodes. Network structures arise in many widely ranging contexts, including but not limited to the biological (such as metabolic and anabolic pathways, genetic regulatory networks, and the human nervous system), intrinsic networks (the internet as well as telephone and other communication systems), the social (for example the personal connectivity between individuals and/or groups with one another), and the informational (such as the topical and other relatedness of scientific papers, citations, patents, web site content, technical data sheets, and other publications). In all cases, network structure impacts function, in that network topology defines the means by which discrete network nodes are able to communicate and inter-relate with one another. Thus, it is critically important to articulate network structure to assess potential function.

Network structures are inherently challenging to articulate. They are often structurally complex and potentially manifest as high-dimensional and tangled connectivity within a many-to-many framework. Different elements are strongly or weakly inter-connected to one another. The connectivity of the nodes is sometimes dynamic, changing in shape and/or strength over time, and sometimes changing non-linearly. The nature of particular nodes or hubs in the network frequently vary greatly from one another, both in form and function. This typically intricate topology of a network results in the potential occlusion of the deep network structure as well as particular details of interest.

As a result of this occlusion, many methods for network visualization have been suggested, including, but not limited to, fast multi-level force-directed methods, high-dimensional embedding, spectral graph drawing, combinatorial clustering (with or without filtering), and multidimensional scaling methods. Force-directed modeling applies a cost function (or force model) whose minimization enables articulation of the optimal (minimum cost) layout. While force-directed approaches help display certain forms of graphs, more powerful layout methods have also been proposed, including Graph Embedding Methods (GEM) PYTHON package, Graph-Based Interaction-Aware Trajectory Prediction (GRIP), ACE, $FM^3$ and Topolayout.

High-dimensional embedding makes use of the projection of high-dimensional information into a two-dimensional plane, enabling easier graphical rendering and interpretation. Data is first processed to embed the graph in high-dimensional space, then projected in 2D using principal component analysis. Running time is linear in the graph size, as described in Harel, D. and Y. Koren. (2004). Graph Drawing by High-Dimensional Embedding. Journal of Graph Algorithms and Applications 8 (2): 195-214, which is incorporated herein by reference in its entirety.

Spectral graph drawing computes the layout of a graph using eigenvectors of related matrices, and enables fast computation of layouts for a small vector space. Further, spectral graph drawing leads to an exact solution to the layout, whereas most other strategies result in an NP-hard problem, approximated rather than solved.

Combinatorial clustering makes use of multi-level network structures, where subgraphs are nested based on their position in a multi-level framework, as discussed in Komusiewicz, C. (2011), Parameterized Algorithmics for Network Analysis: Clustering & Querying. Ph.D. Thesis. Elektrotechnik und Informatik der Technischen Universitat Berlin, which is incorporated herein by reference in its entirety. Node clustering simplifies graphs by merging neighboring nodes, which, when repeated, organizes the graph into a hierarchy. Visualization techniques to leverage such hierarchical structure enable multiscale inferences ranging from micro-scale observations of individual elements to macro-scale observations of group trends. Several combinatorial clustering methods have been developed, such as spectral clustering algorithms, based on the eigen decomposition of Laplacian matrices of either weighted or unweighted graphs, as discussed in Nascimento, M. C. V., and de Carvalo, A C. P. L. F. (2011). Spectral methods for graph clustering—A survey. European Journal of Operational Research, 2011, vol. 211, issue 2, pages 221-231, which is incorporated herein by reference in its entirety. While clustering is effective for planar graphs, for non-planar graphs, such as those exemplified in scale-free networks, edge density often increases, which makes the layout less flexible and more tangled. Filtering methods retain edge and node semantics by ensuring that the simplified graph is maintained as a subgraph of the original. Stochastic filtering approaches statistically sample the graph, scaling well and preserving many graph characteristics, but for scale-free networks, where by definition most nodes are of least degree, stochastic filtering sometimes destroys connectivity and other features. Deterministic filtering removes edges by use of a graphical element metric such as "betweenness centrality" (BC), or how often a node lies on the shortest path between other nodes. Girvan and Newman computed the betweenness centrality for edges instead of nodes, and removed the highest BC edges from a graph to isolate and cluster its sub-networks.

Three-dimensional approaches have also been developed to enable better network visualization. Leveraging three-dimensional imaging, graphical visualizations have been developed where nodes were constrained to lie on parallel planes or on the surface of spheres, as discussed in Ahmed, A, Dwyer, T., Hong, S.-H., Murray, C., Song, L. and Y. X. Wu. (2005). "Visualization and analysis of large and complex scale-free networks", in Proc. Euro graphics/IEEE VGTC Symposium on Visualization (Euro Vis 2005) and Ahmed, A and S.-H. Hong. (2007). Navigation Techniques for 2. 5D Graph Layout, Hong, S.-H., Ma, K.-L. (editors), Proc. Asia-Pacific Symposium on Visualization (APVIS2007), 5-7 Feb. 2007, Sydney, Australia, IEEE Computer Society. pp. 81-84, each of which is incorporated herein by reference in its entirety. In that work, linearly mapping colors to node degree was too poor a differentiating metric, so a logarithmic color tone mapping methodology was developed. Further, anisotropic shading has been used to indicate directionality and edge detection in dense scale-free networks.

Multidimensional scaling (MDS, also called Torgerson Scaling or Torgerson-Gower scaling) is a set of related statistical techniques that leverage ordination, an exploratory analytical technique that orders objects so that similar objects are near each other and dissimilar objects are farther from each other, as described by Borg, I. and Groenen, P. J. F. (2005). Modern multidimensional scaling. 2nd edition. New York: Springer, which is incorporated herein by reference in its entirety. These distances are then related to one another either numerically and/or graphically. Many ordination techniques exist, including principal components analysis (PCA), nonmetric multidimensional scaling (NMDS), correspondence analysis (CA) and its derivatives (detrended CA (DCA), canonical CA (CCA)), Bray-Curtis ordination, and redundancy analysis (RDA).

The core framework amongst the family of these related MDS algorithms is based upon a matrix of object-to-object similarities, then assignment of a numerically indexed location to each such object in N-dimensional space, as described in Honarkhah, M. and Caers, J. (2010). Stochastic Simulation of Patterns Using Distance-Based Pattern Modeling, Mathematical Geosciences, 42: 487-517, which is incorporated herein by reference in its entirety. To perform this function, an indexing algorithm typically inputs a matrix of item dissimilarities and then constructs a coordination matrix output whose assembly is designed to minimize a loss function (typically called strain). Other loss functions (such as stress) are also used for the scaling process, and these and other loss functions are able to be further optimized using weighted distances between objects.

Multidimensional scaling (MDS) is either metric or non-metric. For metric MDS, the optimization procedure concurrently embraces a range of loss functions and weighting schemes. For non-metric MDS, a non-parametric monotonic relationship is sought between node dissimilarities and the Euclidean distance between such nodes, often using isotonic regression. In a more generalized approach, node dissimilarities are ordered by distance on an input surface, which is embedded into a target surface, and the embedding process is designed to minimize the distortions that arise from embedding the input surface into the target surface. Higher dimensional topologies (e.g., three-dimensional volumetric shapes and higher dimensional structures) are also able to be leveraged for the optimization function.

Many approaches have been taken to determine substructure with networks, such as that described in Lancichinetti, A and S. Fortunato (2009), Community detection algorithms: a comparative analysis. Phys. Rev. E 80: 056117, which is incorporated herein by reference in its entirety. One well-established mathematical approach employs the topologically-based detection of communities through the analysis of differential link density within a community relative to a larger network structure. In particular, the "Louvain" method unveils hierarchies of communities within large networks by iteratively optimizing the "modularity" of a partition of a network, as described in Blondel, V. D., Guillaume, J.-L., Lambiotte, R. and E. Lefebvre. (2008). Fast unfolding of communities in large networks. Journal of Statistical Mechanics: Theory and Experiment 10: P10008, which is incorporated herein by reference in its entirety. Linguistic-based analyses are also performed to detect similarities in documents. For example, communities within document networks are also able to be detected by the sharing of common topics or subtopics within documents. To determine which documents are comprised of which topics or subtopics, latent Dirichlet allocation (LDA) is used, as disclosed by Blei, D. M., Ng, A. Y. and M. I. Jordan. (2003). Latent Dirichlet Allocation. Journal of Machine Learning Research 3: 993-1022, which is incorporated herein by reference in its entirety. LDA is a topic modeling framework that considers documents as mixtures of topics and maps the words most likely associated with particular topics within each document. By determining the most likely topics within documents, those documents with shared topics are grouped into communities. Through these and other means, documents are grouped into community subgraphs within larger knowledge networks.

Serendipity is defined as making beneficial, unintended and unexpected discoveries by accident, as described in Figueiredo, Antonio Dias de and J. Campos (2001). The Serendipity Equations. Navy Center for Applied Research in Artificial Intelligence, Naval Research Laboratory, Washington, DC, Technical Note AIC-01-003, which is incorporated herein by reference in its entirety. However, detection of particular classes of knowledge that might enable potentially serendipitous discovery have been difficult to quantity. In spite of this, certain enabling factors are known. For example, as with the detection of irony (described in Wallace, B. C., Choe, D. K., and E. Charniak. (2015). Sparse, Contextually Informed Models for Irony Detection: Exploiting User Communities, Entities and Sentiment. Association of Computational Linguistics, which is incorporated herein by reference in its entirety) and humor (described in Barbieri, F. and H. Saggion. (2014). Automatic Detection of Irony and Humour in Twitter. Proceedings of the Student Research Workshop at the 14th Conference of the European Chapter of the Association for Computational Linguistics, pages 56-64, Gothenburg, Sweden, Apr. 26-30, 2014, which is incorporated herein by reference in its entirety), surprise is a key element in serendipity. Surprise is itself characterized by a lack of expectation—in other words, an unexpectedly relevant connection between content arising from disparate contexts. Unexpectedness and incongruity, bounded by surprise, are often signals and facilitating factors of irony, humor, and serendipity.

Given the prominent role of cross-field hybridization in innovation, a logical strategy to engender such innovation is to acquire knowledge from different fields that have some contextual distance between them. This would support serendipitous discovery, especially if substantial volumes of information were contemporaneously co-acquired. However, given the rapid growth of knowledge, substantial knowledge co-acquisition is challenging. For example, fully reading 100,000 documents (a typical volume of documents generated in the most recent five year period for many sub-disciplines), at an hour per article and 2,000 hours per year, would take fifty years, a professional lifetime. Presuming perfect recall during this time, were one to cross-compare these documents in a pairwise manner at a pace of one minute per pairwise cross-comparison, it would take n*(n−1)/2 minutes (where n=the number of documents), or (100,000*99,999)/2=4,999,950,000 minutes. Since there are 525,600 minutes in a year, this task would take 9,513 years, approximately the duration of recorded human civilization. This is too long. What is needed, and not yet available, is an automated system to rapidly and efficiently cross-compare large numbers of documents from disparate contexts and automatically determine their semantic relatedness in a manner enabling both detection of document similarity and community membership, accelerating serendipitous discovery and enabling self-assembling automated curation of documents and document sets.

In one embodiment, the platform receives drag-and-drop selection of one or more documents to use as "seed documents" in initiate a search process. In one embodiment, the platform automatically records activity and path history from one or more user devices utilizing the platform, such that the activity and/or path history are able to be reviewed at a later time. In one embodiment, a graphical user interface (GUI) generated by the platform includes a "bread crumb" tool in which previous search history and/or previous browsing history on the platform are shown as interconnected nodes. The platform is able to receive click selection of a node on the bread crumb tool to automatically return to a previous search and/or previous selected display of results, allowing for more efficient and useful reanalysis of previous activity than a single back button, for example, provides.

Referring now to the drawings in general, the illustrations are for the purpose of describing one or more preferred embodiments of the invention and are not intended to limit the invention thereto.

FIG. 1 is a schematic diagram showing ontological dimensions constituting a solution-entity according to one embodiment of the present invention. Solution-entities (e.g., documents describing solutions and/or technologies) comprise ontological dimensions that are able to be separated from one another. In one embodiment, solution-entities comprise a plurality of ontological dimensions that are able to be separated from one another. Each Solution-entity has a capability (C1) dimension 101, a characteristic (C2) dimension 102, a composition (C3) dimension 103, and/or a contextual information (C4) dimension 104. In one embodiment, the C1 dimension 101 describes the specific functional ability of a solution-entity. In one embodiment, the C2 dimension 102 describes the relative strengths or weaknesses of the solution, absolute data relating to aspects of the solution such as size, and/or specific characteristics relating to the performance of its function. In one embodiment, the C3 dimension 103 describes the elemental matter, constituent elements, or processes that comprise a solution. In one embodiment, the C4 dimension 104 describes the field in which technology or unmet needs exist, such as the general area of technology or a specific sub-field. One of ordinary skill in the art will understand that the C1, C2, C3, and C4 dimensions described herein are only meant to be illustrative of ontological dimensions for solution-entities and are not intended to provide an exhaustive list or a maximum number of ontological dimensions that a solution-entity is able to have.

Figure 2:
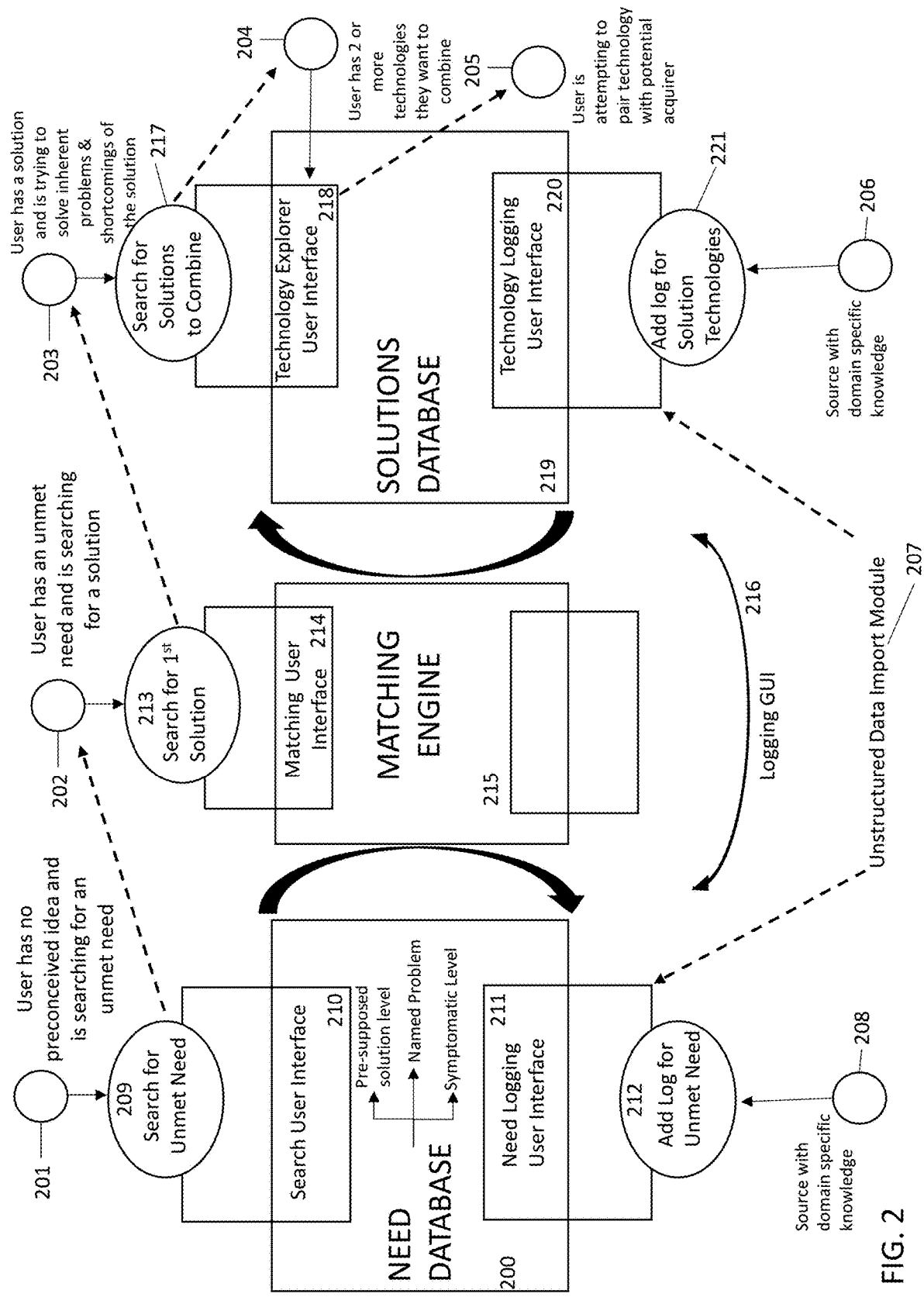
FIG. 2 is a schematic diagram showing the interaction between a needs database, a matching database, and a solutions database according to one embodiment of the present invention.

FIG. 2 is a schematic diagram showing the interaction between a needs database, a matching database, and a solutions database according to one embodiment of the present invention. FIG. 2 provides a general overview for the interaction between user devices and the platform. In one embodiment, the platform includes a needs database 200, a matching engine 215, and a solutions database 219, where the matching engine 215 is capable of directly interacting with and interfacing with both the needs database 200 and the solutions database 219. In one embodiment, a browsing user device 201 conducts a search 209 for an unmet need on a search user interface 210 associated with the needs database 200. The browsing user device 201 is controlled, for example, by a researcher looking for a practical application for an existing technology or looking for new problems to tackle. The search user interface 210 produces one or more search results, providing the browsing user device 201 with at least one unmet need from the needs database 200.

The matching engine 215 of the platform receives a request, including at least one unmet need, to conduct a search 213 for at least one solution to the at least one unmet need from a match request user device 202 through a matching user interface 214. The matching engine 215 then produces at least one solution matching the at least one unmet need and transmits the matching results to the match request user device 202.

In one embodiment, the solutions database 219 receives at least one solution optimization request from a solution refining user 203 through a technology explorer user interface 218. In one embodiment, the solution optimization request includes at least one unmet need to be addressed, and at least one solution technology. The technology explorer user interface 218 is then used to identify one or more additional solution technologies to be combined with the at least one solution technology to address the at least one unmet need. Thereafter, the solutions database 219 transmits one or more additional solution technologies to the solution refining user device 203. In one embodiment, the solutions database 219 receives additional solution optimization requests from the solution refining user device 204 in order to further improvement upon the solution. When the solution is fully refined, the final combination of solutions is transmitted to the user device 205. One of ordinary skill in the art will understand that the browsing user device 201, the match request user device 202, the solution refining user device 203, 204, and the user device 205 are not necessarily separate and distinct user devices and instead often represent different roles for the same user device over time.

In one embodiment, the platform receives a selection to apply a filter to the search user interface 210, the matching user interface 214, and/or the technology explorer user interface 218 from a user device. In one embodiment, the filter includes a specified spatial or locational impact, population impact (i.e., a number of people potentially affected by a problem), historical and/or anticipated rates of technological or sociological progress within a particular field, and/or potential types of barriers to progress. Furthermore, while each solution-entity and each unmet need have an associated semantic signature used in order to search documents according to semantic meaning, in one embodiment, each solution entity and each unmet need is also tagged with at least one meta-tag, representing at least one topic, field, author, and/or other associated information. In one embodiment, the search user interface 210, the matching user interface 214, and/or the technology explorer user interface 218 are able to be filtered based on the at least one meta-tag.

In one embodiment, the solutions database 219 receives 221 one or more solution-entities (i.e., technologies) from at least one knowledge source database and/or at least one user device 206 through a technology logging user interface 220. For example, in one embodiment, the solutions database 221 includes at least one web crawler that automatically scrapes at least one patent database (e.g., USPTO database, GOOGLE PATENTS, WIPO database, etc.), at least one scientific database (e.g., PUBMED, etc.), and/or at least one other type of database to add new patents, patent applications, articles, images, and other documents to the database. In another embodiment, the web crawler only automatically scrapes patents detected to be expired and/or patent applications detected to be abandoned, in order to ensure that only public domain technology is added to the solutions database 219. In one embodiment, the needs database 200 receives 212 one or more unmet needs from at least one knowledge source database and/or at least one user device 208 through a need logging user interface 211. In one embodiment, the need logging user interface 211 and the technology logging user interface 220 form a single logging graphical user interface (GUI) 216 that forms part of an unstructured data import module 207. In one embodiment, unmet needs are automatically gathered by at least one web crawler from at least one online database.

Figure 3:
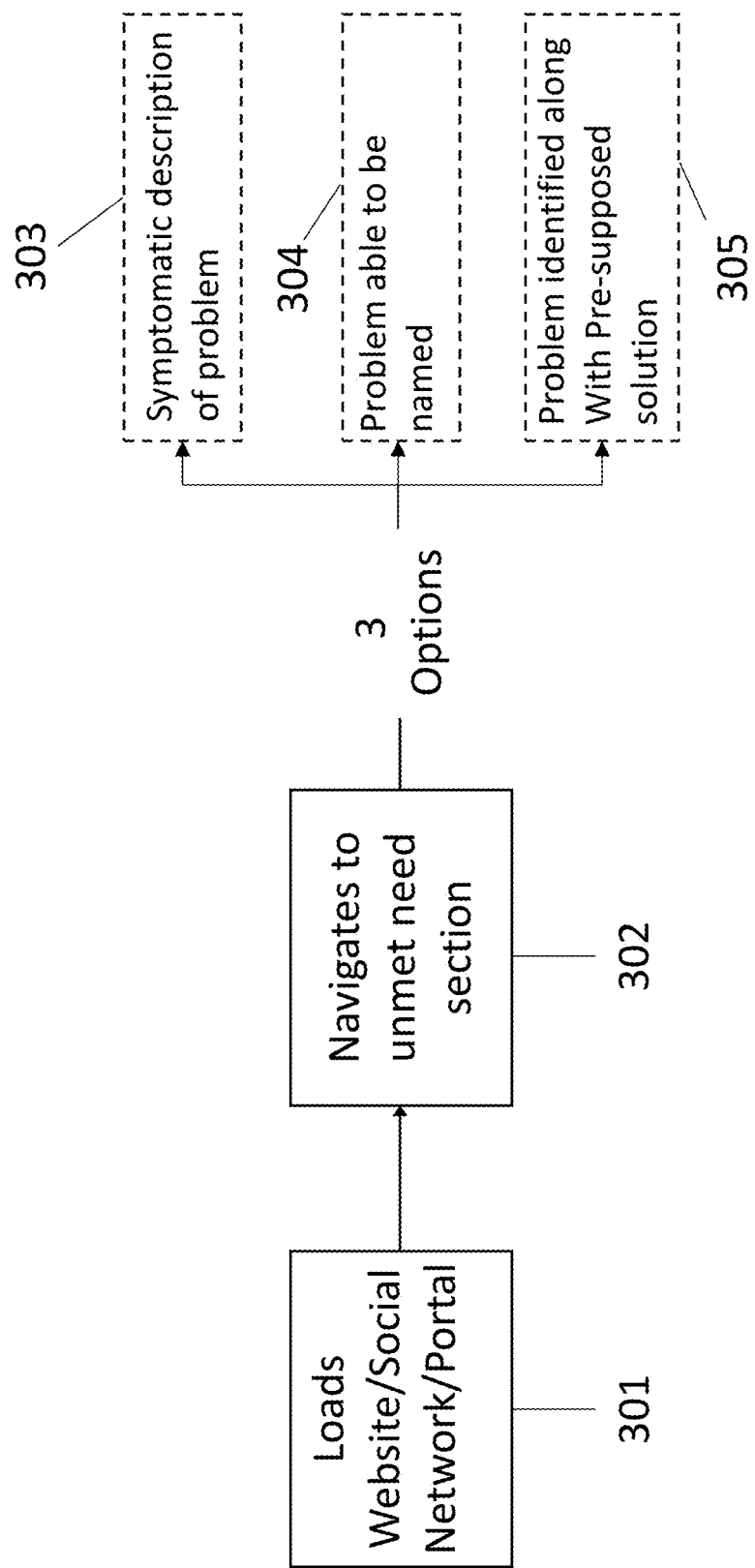
FIG. 3 is a flow diagram showing three different forms of unmet need according to one embodiment of the present invention.

FIG. 3 is a flow diagram showing three different forms of unmet need according to one embodiment of the present invention. The process for viewing unmet needs through the needs database is relatively simple. First, the platform receives a request to access the site and thereafter loads 301 the portal to the website. The platform then receives a request 302 to navigate to an unmet need interface. Unmet Needs are able to be conceptualized and logged according to three separate paradigms. In the first paradigm 303, unmet needs are logged via a knowledge source and/or a user device that only possess information about constituent elements of the problem, not with the root cause. In the second paradigm 304, the problem is able to be named, meaning that the knowledge source and/or user device includes information regarding the causal elements behind the problem. Finally, in the third paradigm 305, the knowledge source and/or user device includes information regarding a current solution being used to address the problem, but which itself needs to be improved. These three paradigms indicate amounts of information typically stored in the needs database with regard to different unmet needs based on the amount of knowledge of the source that added each unmet need. These therefore indicate the sort of information that the search interface typically uses to gather results.

Figure 4:
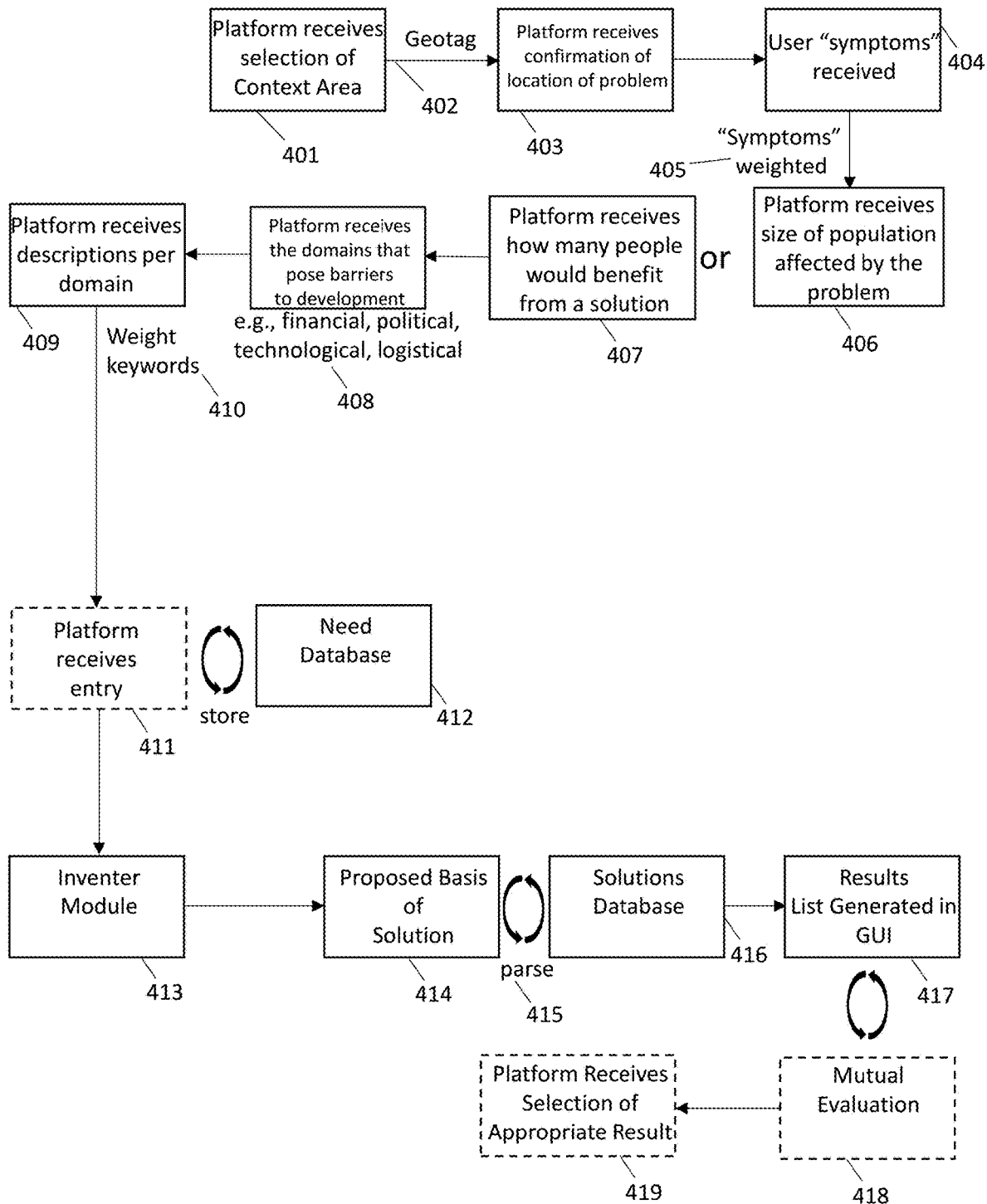
FIG. 4 is a flow diagram for logging an unmet need, where only a symptomatic description of the need is provided according to one embodiment of the present invention.

FIG. 4 is a flow diagram for logging an unmet need, where only a symptomatic description of the need is provided according to one embodiment of the present invention. Examples of unmet needs with only symptomatic descriptions include noting the relative excess or deficit of a material or condition. In a medical context, an example of an "unmet need" is the description "many cases of coughs, productive, sustained after foreign travel, not responding to usual therapies." For a recruitment to an organization, an example of an "unmet need" is the description "too few programmers to handle platform, lacking coherent vision and strategy." The diagram in FIG. 4 addresses one method of finding a solution to such a symptomatically described unmet need. The process begins with the platform receiving information regarding an unmet need in order to log the problem in the needs database. The platform receives a selection from a user device of a context area for the problem (e.g., medical, administrative, economic, etc.) 401. In one embodiment, the selection is automatically associated with a geotag 402, which includes metadata regarding the location of the user device providing the selection. In one embodiment, the platform then transmits a confirmation request to the user device and receives confirmation from the user device that the geotag 402 accurately indicates a location of the problem 403.

The platform then receives one or more symptoms associated with the unmet need 404. The platform then automatically weighs 405 each symptom according to the importance of each symptom. In one embodiment, the weighting is provided by the at least one user device. In another embodiment, the weighting is automatically determined based on previous preference data of the at least one user device and/or preference data of a larger group of user devices that have previously utilized the platform. After weighing the symptoms, the platform receives a size of population likely to be affected by the problem 406 from the user device. In one embodiment, the platform receives a designation of how many people are likely to benefit from a solution to the problem 407 from the user device. By receiving the size of the affected population, in one embodiment, the system is better able to prioritize equivalently matching unmet needs for users attempting to browse existing unmet needs through the search user interface. In one embodiment, the platform then receives a designation of barriers (e.g., financial, political, technological, logistical, etc.) to development of a solution to the unmet need 408 from the user device. The platform then receives descriptions per domain (e.g., C1, C2, C3, etc.) of the unmet need 409 and, in one embodiment, weightings of the descriptions 410, from the user device. Receiving this information causes the unmet need to be logged 411 in the needs database 412.

After the unmet need is logged 411, the matching engine (also called the inventor module) 413 is used to match semantic signatures of each unmet need with one or more solutions in the solutions database 416. In one embodiment, the platform then automatically generates a proposed basis for the solution 414 to solve the unmet need based on parsing 415 one or more sections of the one or more solutions. The platform then generates a list of the results in a graphical user interface (GUI) 417 on the user device. The user device then evaluates 418 the list of results and the platform receives a selection of one or more appropriate results 419 from the user device from the list of the results.

Figure 5:
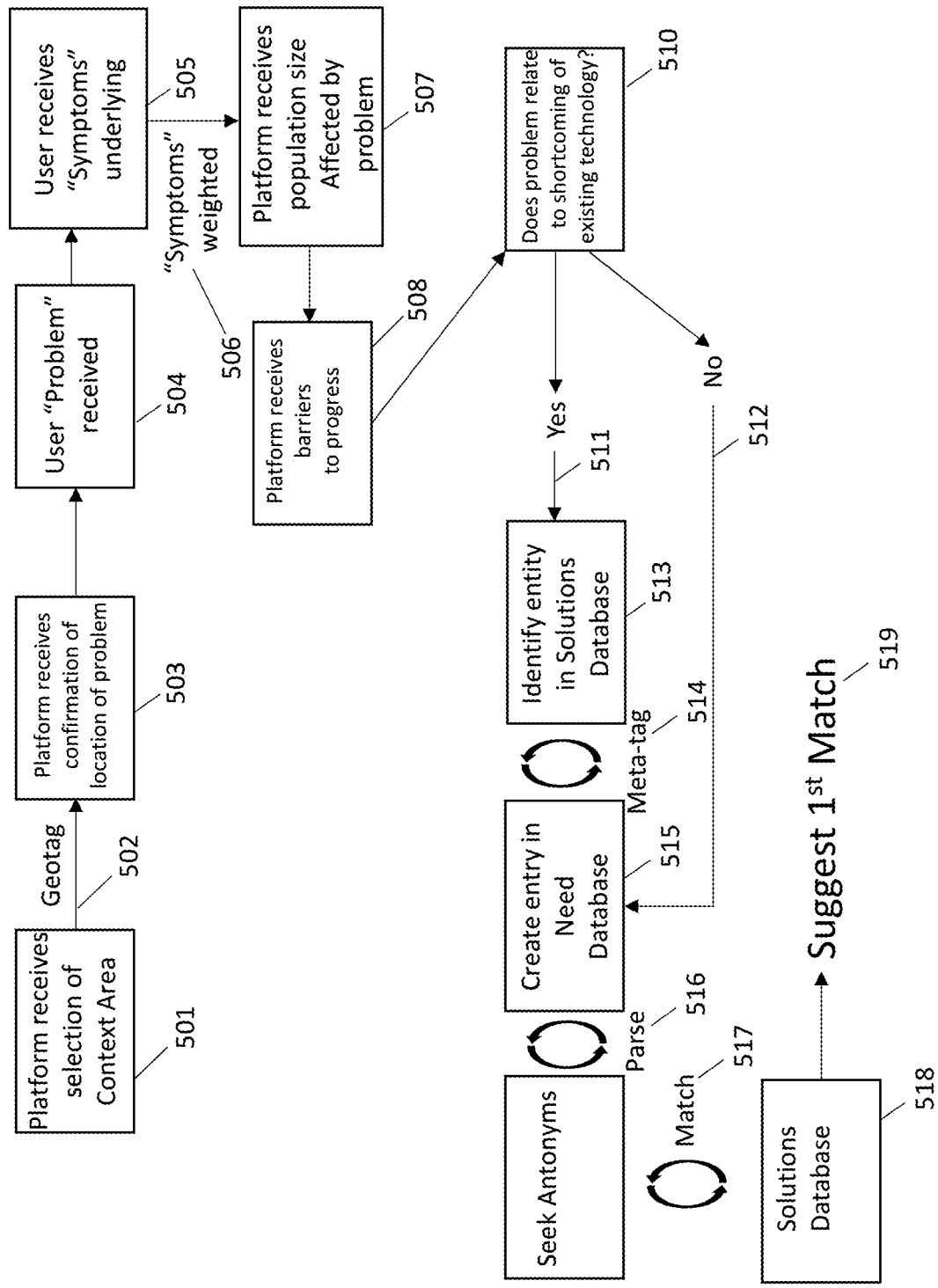
FIG. 5 is a flow diagram for logging an unmet need, wherein greater information is known and provided according to one embodiment of the present invention.

FIG. 5 is a flow diagram for logging an unmet need, wherein greater information is known and provided according to one embodiment of the present invention. Examples of named problems able to be addressed by the process outlined in FIG. 5 include, in the medical field, "drug-resistant tuberculosis" or, in the recruitment field, "inadequate management." Similar to FIG. 4, the process outlined in FIG. 5 begins with the platform receiving information regarding an unmet need in order to log the problem in the needs database. The platform receives a selection from a user device of a context area for the problem (e.g., medical, administrative, economic, etc.) 501. In one embodiment, the selection is automatically associated with a geotag 502, which includes metadata regarding the location of the user device providing the selection. In one embodiment, the platform then transmits a confirmation request to the user device and receives confirmation from the user device that the geotag 502 accurately indicates a location of the problem 503. In one embodiment, the platform transmits a confirmation message to the user device indicating that the problem is being logged in the needs database 504.

The platform then receives one or more symptoms associated with the unmet need 505. The platform then automatically weighs 506 each symptom according to the importance of each symptom. In one embodiment, the weighting is provided by the at least one user device. In another embodiment, the weighting is automatically determined based on previous preference data of the at least one user device and/or preference data of a larger group of user devices that have previously utilized the platform. After weighing the symptoms, the platform receives a size of population likely to be affected by the problem 507 and/or a designation of how many people are likely to benefit from a solution to the problem from the user device. By receiving the size of the affected population, in one embodiment, the system is better able to prioritize equivalently matching unmet needs for users attempting to browse existing unmet needs through the search user interface. In one embodiment, the platform then receives a designation of barriers (e.g., financial, political, technological, logistical, etc.) to development of a solution to the unmet need 508 from the user device.

The platform then prompts the user device to provide information regarding whether the unmet need is related to shortcomings in existing technologies 510. If the platform receives an affirmative response, then the platform automatically identifies 511 at least one entry in the solutions database 513 corresponding to the unmet need based on matching semantic signatures. In one embodiment, the platform automatically applies at least one meta-tag 514 to the unmet need and/or the at least one matching solution in order to identify the connection between the unmet and the matching solution. The unmet need is then added to the needs database 515. If the platform receives a negative response 512, then the platform simply adds the unmet need to the needs database 515 without meta-tagging a connection to any particular entry in the solution database.

For logged unmet needs, the platform automatically parses each need 516 to identify, using natural language processing, the parts of the unmet need description describing the main sources of the problem, and then identifies antonyms for words and phrases in the unmet need description. In one embodiment, the identified antonyms are used to form a semantic signature to be matched 517 with one or more entries in the solution database 518. When the platform identifies a match, a suggested solution to the unmet need is determined and transmitted 519 to the user device.

Figure 6:
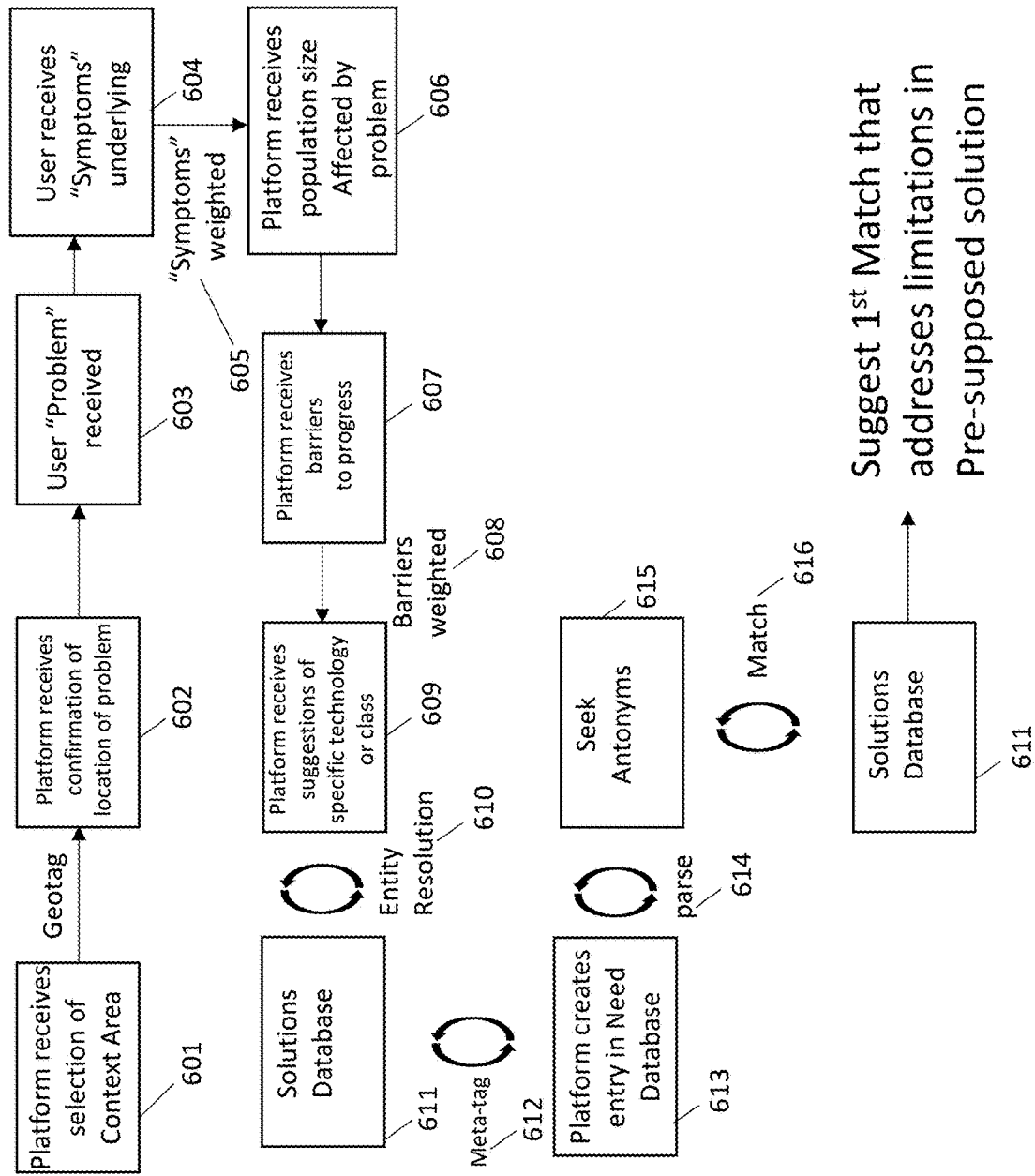
FIG. 6 is a flow diagram for logging an unmet need, where a pre-supposed solution class is provided according to one embodiment of the present invention.

FIG. 6 is a flow diagram for logging an unmet need, where a pre-supposed solution class is provided according to one embodiment of the present invention. Examples of named problems with presupposed solutions able to be addressed by the process outlined in FIG. 6 include, in the medical field, "novel therapies against drug-resistant TB, which are able to be used in combination with existing therapies but have distinct mechanisms of action from them and alternative resistance pathways," or, in the recruitment field, "a new dedicated chief executive officer (CEO) and management team, who have demonstrated track records in providing long-term strategic visions and delivering results." Similar to FIGS. 4 and 5, the process outlined in FIG. 6 begins with the platform receiving information regarding an unmet need in order to log the problem in the needs database. The platform receives a selection from a user device of a context area for the problem (e.g., medical, administrative, economic, etc.) 601. In one embodiment, the selection is automatically associated with a geotag, which includes metadata regarding the location of the user device providing the selection. In one embodiment, the platform then transmits a confirmation request to the user device and receives confirmation from the user device that the geotag accurately indicates a location of the problem 602. In one embodiment, the platform transmits a confirmation message to the user device indicating that the problem is being logged in the needs database 603.

The platform then receives one or more symptoms associated with the unmet need 504. The platform then automatically weighs 605 each symptom according to the importance of each symptom. In one embodiment, the weighting is provided by the at least one user device. In another embodiment, the weighting is automatically determined based on previous preference data of the at least one user device and/or preference data of a larger group of user devices that have previously utilized the platform. After weighing the symptoms, the platform receives a size of population likely to be affected by the problem 606 and/or a designation of how many people are likely to benefit from a solution to the problem from the user device. By receiving the size of the affected population, in one embodiment, the system is better able to prioritize equivalently matching unmet needs for users attempting to browse existing unmet needs through the search user interface. In one embodiment, the platform then receives a designation of barriers (e.g., financial, political, technological, logistical, etc.) to development of a solution to the unmet need 607 from the user device. Finally, the platform receives one or more suggestions of specific technology or actions that will help to alleviate the problem 609 from the user device.

The platform performs entity resolution 610 to filter solutions in the solutions database 611 to ones of the same type (e.g., having a similar descriptor in one or more domains) as the one or more suggested specific technologies or actions. The platform then applies a meta-tag 612 to each entry in the solutions database 611 that matches the filter. An entry for the unmet need is then logged into the needs database 613. For logged unmet needs, the platform automatically parses each need 614 to identify, using natural language processing, the parts of the unmet need description describing the main sources of the problem, and then identifies antonyms 615 for words and phrases in the unmet need description. In one embodiment, the identified antonyms are used to form a semantic signature to be matched with one or more entries in the solution database 611. When the platform identifies a match, a suggested solution to the unmet need is determined and transmitted to the user device. In one embodiment, the suggested solution includes an explanation for how the solution addresses limitations described with regard to the pre-supposed solution.

Figure 7:
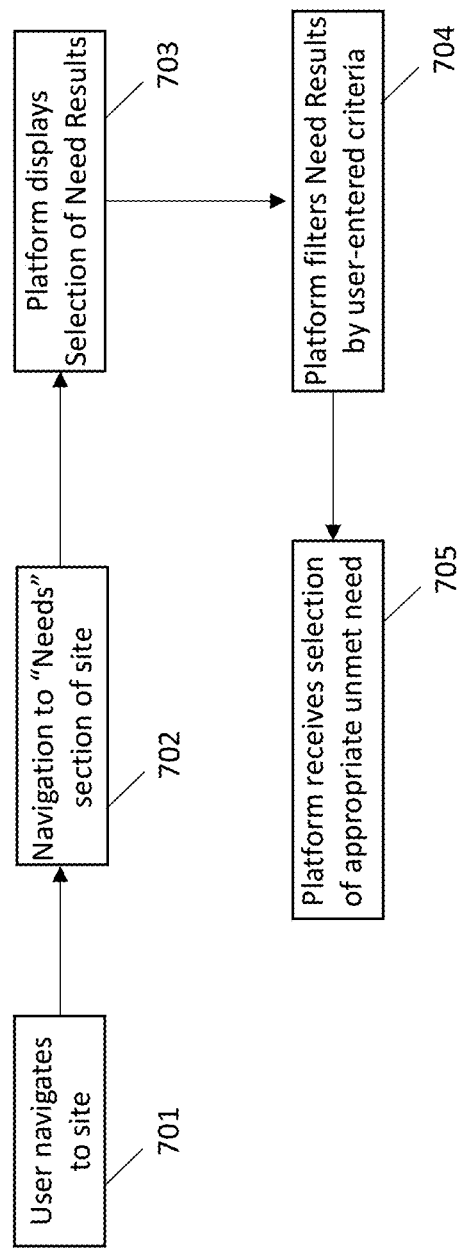
FIG. 7 is a flow diagram for finding an unmet need according to one embodiment of the present invention.

FIG. 7 is a flow diagram for finding an unmet need according to one embodiment of the present invention. After a user device navigates to a site 701 and then to a specific "needs section of the site (i.e., a search user interface of the need database) 702, the platform generates a selection of need results 703 and transmits the selection to the user device. In one embodiment, the platform receives a selection to filter the need results (e.g., filter by date added, filter by most popular, filter by technology area, filter by spatial or locational impact, filter by number of people affected, filter by historical and/or anticipated rates of technological process, filter by types of potential barriers to progress, filter by symptomatic need, need with root cause, and/or need with presupposed solution, etc.) 704. The platform then filters the list of results and receives a selection of one or more of the needs 705. In one embodiment, after the platform receives a selection of one or more of the needs, a details page for each of the one or more selected needs is generated and transmitted to the user device.

Figure 8:
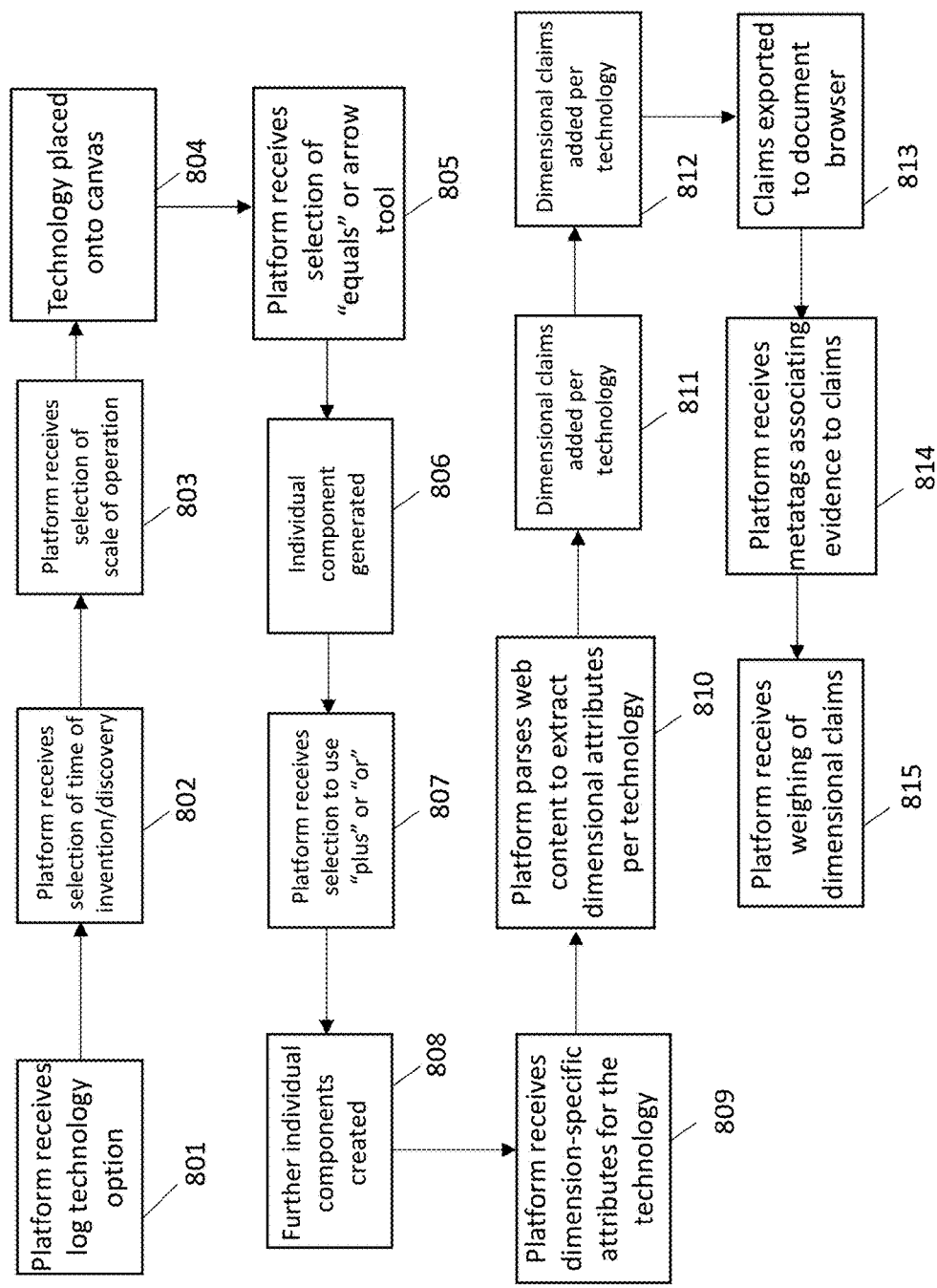
FIG. 8 is a flow diagram for logging a solution-entity according to one embodiment of the present invention.

FIG. 8 is a flow diagram for logging a solution-entity according to one embodiment of the present invention. In one embodiment, the process for logging a solution-entity in the solutions database begins when the platform receives a selection to log an entry 801 from a solution adding user device. The platform then receives a designation of when the selected technology was invented or discovered 802 and/or the scale of operation of the technology 803 from the adding user device. In one embodiment, the technology logging user interface includes a canvas module. The canvas module enables technologies and/or components of technologies to be dragged and dropped onto the canvas 804 as represented, for example, by squares, and connected through various operations. For example, in one embodiment, the platform receives a selection of an "equals" tool or an arrows tool 805 and generates one or more components of the technology 806. Based on selections from the adding user device of operations such as "plus" (i.e., AND in Boolean logic) or "or" 807 and generation of further components of the technology 808, connections are generated between the one or more components to create a logic flow chart or a diagram of physical connection for the solution. In one embodiment, the platform then receives dimension-specific attributes for the technology 809, either through short statements of text or through one or more web documents and/or webpages describing the technology. If webpages are included in the dimension-specific attributes, then the platform automatically accesses the website and uses natural language processing to parse text on each of the linked webpages in order to determine dimension-specific attributes of the technology 810. In one embodiment, dimension-specific attributes include one or more capabilities of the technology under C1 (e.g., capable of lifting an objecting, capable of providing thrust, etc.), one or more characteristics of the technology (e.g., cost, weight, size, etc.) under C2, one or more descriptions of the composition of the technology (e.g., elemental composition) under C3, and/or a context of the technology (e.g., the field or subfield of the technology, a description of why the technology is necessary in the field, etc.) under C4. In one embodiment, the dimension-specific attributes includes shortcomings (e.g., potential side effects of a drug), cross-functional impact (e.g., positive and/or negative off-target effects), effectiveness, throughput, maintenance concerns, durability, capacity, cost, efficiency, cost-efficiency, safety, complexity of operation, and/or other factors. The platform then receives additional dimensional attributes for each technology and/or each component of the technology 811, 812. The platform then automatically generates a list of the dimensional attributes and displays the dimensional attributes of the technology on the user device 813. In one embodiment, the platform then receives at least one meta-tag for the technology and/or components of technology 814. In one embodiment, meta-tags are associated with at least one highlighted portion of text in a text summary of the technology and/or at least one highlighted portion of text in at least one document associated with the technology. In one embodiment, the platform receives weightings for each of the dimensional attributes of the technology 815. In one embodiment, the platform automatically applies a capped maximum to the weightings, defining a trade-off space for the solution. By way of example and not limitation, for each domain, a total of 100 notional weighting units are able to applied to each attribute.

Figure 9:
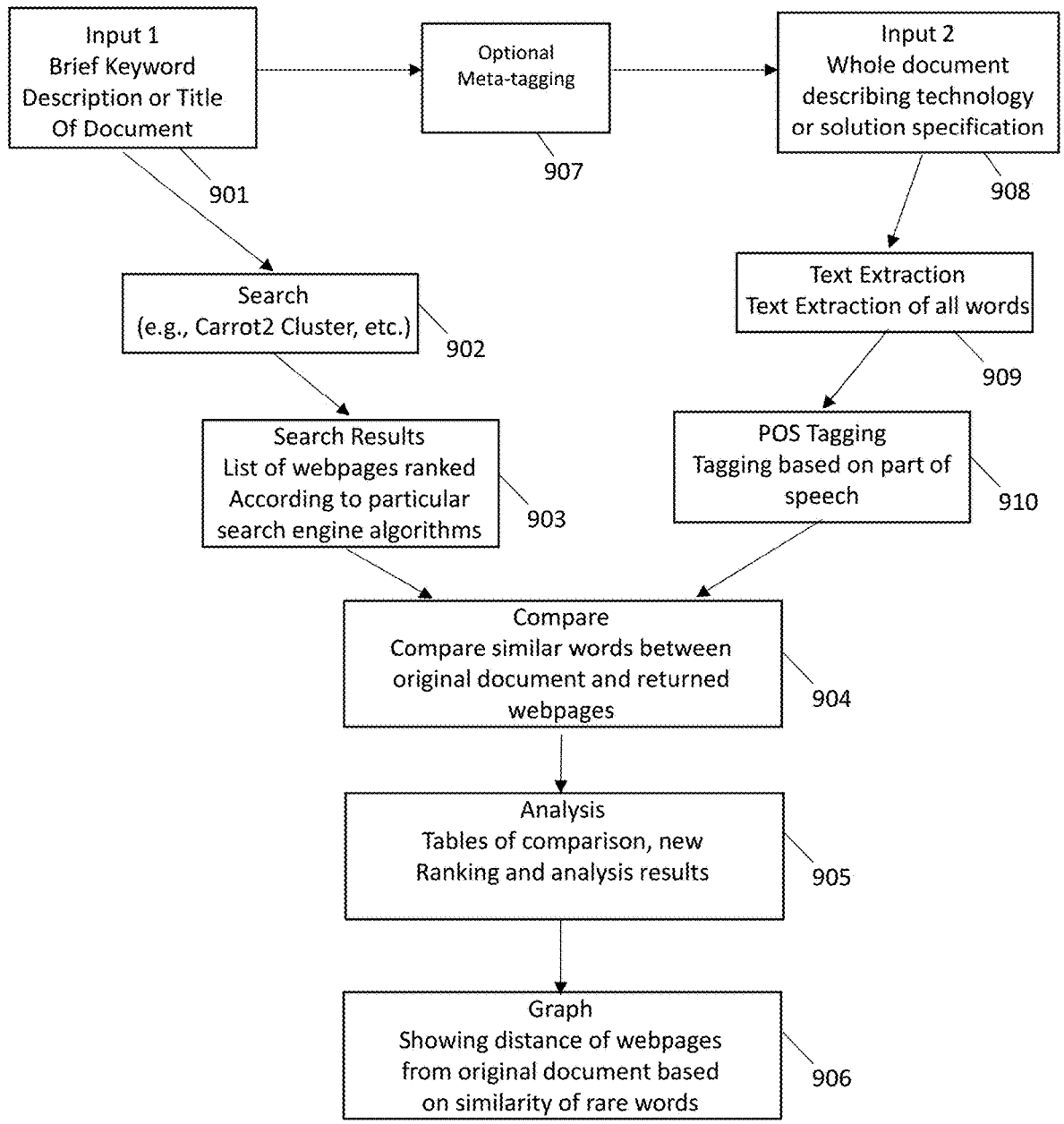
FIG. 9 is a flow diagram for logging a solution-entity according to another embodiment of the present invention.

FIG. 9 is a flow diagram for logging a solution-entity according to another embodiment of the present invention. Unlike the process shown in FIG. 8, which is almost entirely driven by input from a user device, the process for logging a solution-entity shown in FIG. 9 provides a semi-automated process for logging. In one embodiment, the platform receives a brief description of highly associated keywords with a technology and/or a title of at least one document 901 from a user device. The platform then utilizes a web crawler to automatically search the web and/or at least one database 902 to identify search results 903 for the brief description of highly associated keywords and/or the title of the document. In one embodiment, uses a search results clustering algorithm (e.g., Carrot2 Clustering) to automatically cluster search results. In one embodiment, the search results are automatically ranked according to one or more ranking modules. In one embodiment, the search results are a list of relevant webpages. In one embodiment, the platform receives one or more metatags 907 associated with the brief description of highly associated keywords and/or the title of the at least one document.

In one embodiment, the platform also receives the entire text of at least one document describing a technology and/or solution 908. The platform then automatically extracts the entire text of the at least one document 909 to produce an array of words and performs part-of-speech (POS) tagging of each of the words in the array 910. In one embodiment, the platform performs POS tagging based, in part, on similarity to at least one machine-readable thesaurus, which assists in reducing noise in the results. In one embodiment, after parsing each document for a first time, the platform automatically generates a list of most significantly associated parts of speech (i.e., verbs, nouns, adjectives, etc.) and synonyms are automatically generated for each of the significantly associated parts of speech. In one embodiment, each of the at least one document is tagging with a primary theme tag. For words having different possible meanings (i.e., polysemic words), the primary theme tag is used as a calibration point to determine the most likely contextual meaning of each word. The brief description of the highly associated keywords and/or the titles of technologies are then searched, along with the synonyms for the most significantly associated parts of speech, in each document. After each round of parsing each document, the platform performs statistical analysis of variance. In one embodiment, parsing ceases when there is a statistical divergence between the parsed terms and the index topic. In one embodiment, the most significant parts of speech are used to automatically populate the dimensions of the solution-entity. However, in one embodiment, the platform is able to receive requests to edit the dimension of the solution-entity by the user device.

In one embodiment, the platform automatically compares words in the webpages in the search results to the words in the array for each of the at least one document 904. Based on the comparison, the platform automatically generates a table of comparison and the search results receive a new ranking based on closeness of language to the at least one document 905. In one embodiment, the platform then automatically generates a graph, where the original document is represented by a node and each of the webpages in the search results represent a node. Edges are drawn between the original document and each of the webpages (and edges drawn between one webpage and another) based on similarity of a semantic signature of each document and webpage (i.e., based on the statistical distribution of rare words in each document and webpage) 906.

Figure 10:
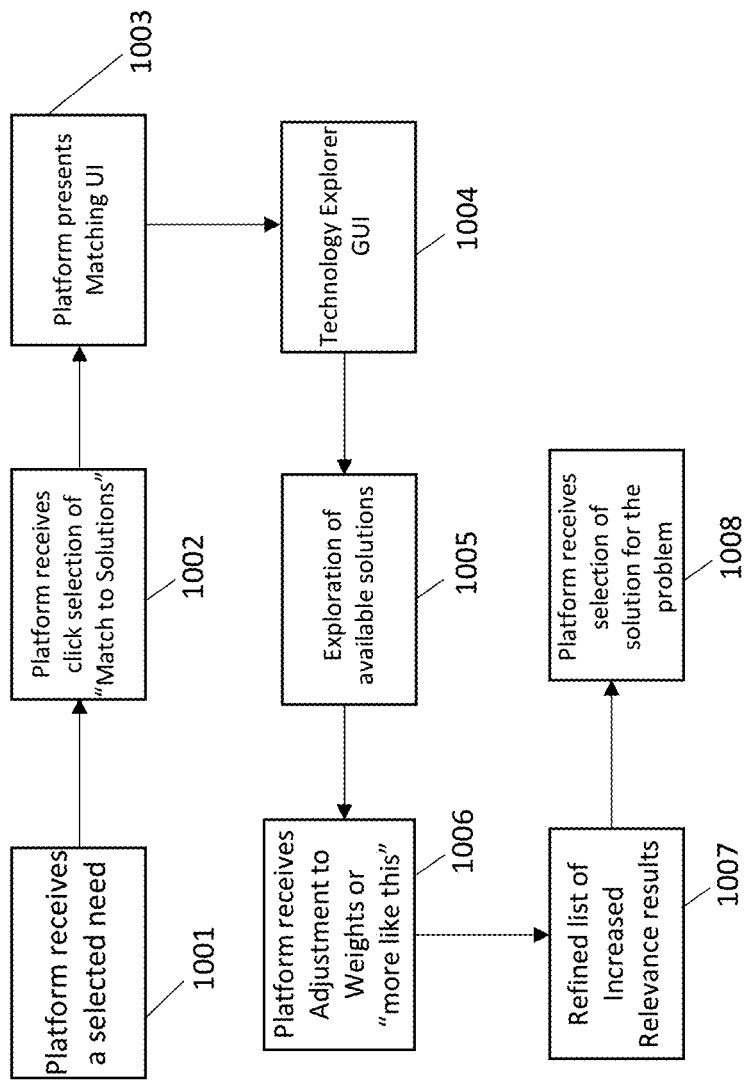
FIG. 10 is a flow diagram of a matching process for matching an unmet need with a solution-entity according to one embodiment of the present invention.

FIG. 10 is a flow diagram of a matching process for matching an unmet need with a solution-entity according to one embodiment of the present invention. In one embodiment, the platform receives a selected need (e.g., from the need database) 1001. The platform then receives click selection of an option to "match to solutions" 1002 and then generates a matching user interface (UI) for identifying a solution corresponding to the need 1003 and/or a technology explorer GUI 1004 for searching for one or more solutions. The platform generates a list of solutions matching the need through the matching user interface and/or the technology explorer GUI. After a user device browses through the list of solutions 1005, the platform receives a selection of one or more of the solutions, designating "more like this" or "less like this" to adjust the weights of the search parameters used by the matching UI and/or the technology explorer GUI 1006. In response, the platform automatically generates a new list of results 1007, having improved relevancy results based on the selected one or more solutions. The platform then receives a selection of a solution for the problem 1008.

The ability to adjust the list of results based on similarity to a previously presented result is a marked improvement over most search engines, which are optimized for simplicity and speed, rather than for adjustability. The automatic assumptions and keywords used by the search engine are therefore often unable to be changed, without the changing the search terms themselves, which often has a more dramatic and less useful response on the search results. The degree of control of the trade-off space between the ontological dimensions of search results is an ability unique to the present invention. In one embodiment, the platform receives a selection to use C1, C2, C3, and/or C4 dimensional criteria in order to determine how a match is made and/or how the results are ranked. In one embodiment, the platform is able to receive plain language questions and search criteria such as "Show me solutions which X." This plain language search functionality includes the ability to search for negative limitations, such as "Show me technologies that are not made from X."

Figure 11:
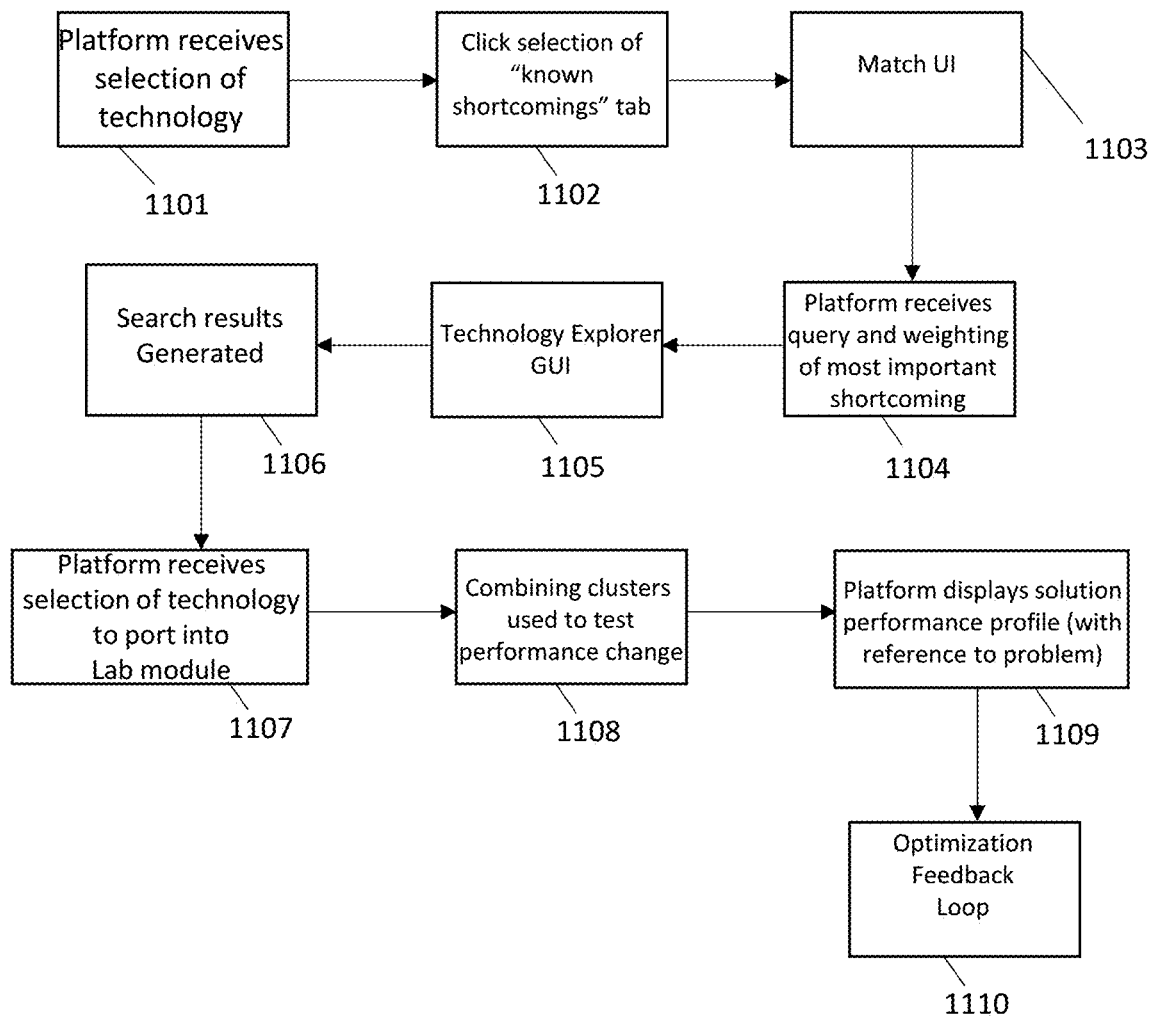
FIG. 11 is a flow diagram for overcoming a shortcoming with a known solution-entity according to one embodiment of the present invention.

FIG. 11 is a flow diagram for overcoming a shortcoming with a known solution-entity according to one embodiment of the present invention. In one embodiment, the platform receives a selection of a technology (e.g., a solution-entity from the solutions database) 1101 from a user device and click-selection to use a "known shortcomings" tab of a GUI 1102. The match UI 1103 and/or the technology explorer GUI 1105 of the platform and/or then receives a query from the user device and/or a weighting of most important shortcomings of the selected technology 1104. The platform automatically determines each of the dimensional attributes of the selected technology and automatically designates one or more of the dimensional attributes as faulty, indicating that the platform will search for substantially similar technologies with changes focused on the faulty dimensional attributes. The platform generates search results based on the selected criteria 1106. The platform receives a selection of one or more technologies from the search results 1107. In one embodiment, the platform receives a selection to modify one or more components of the selected technologies via a Lab module. In one embodiment, the Lab module is operable to generate a simulated performance profile of the one or more selected technologies 1108. The solution then displays the performance profile of the tested technologies 1109. In one embodiment, this process generates a feedback loop for testing and improving the one or more selected technologies 1110.

Figure 12:
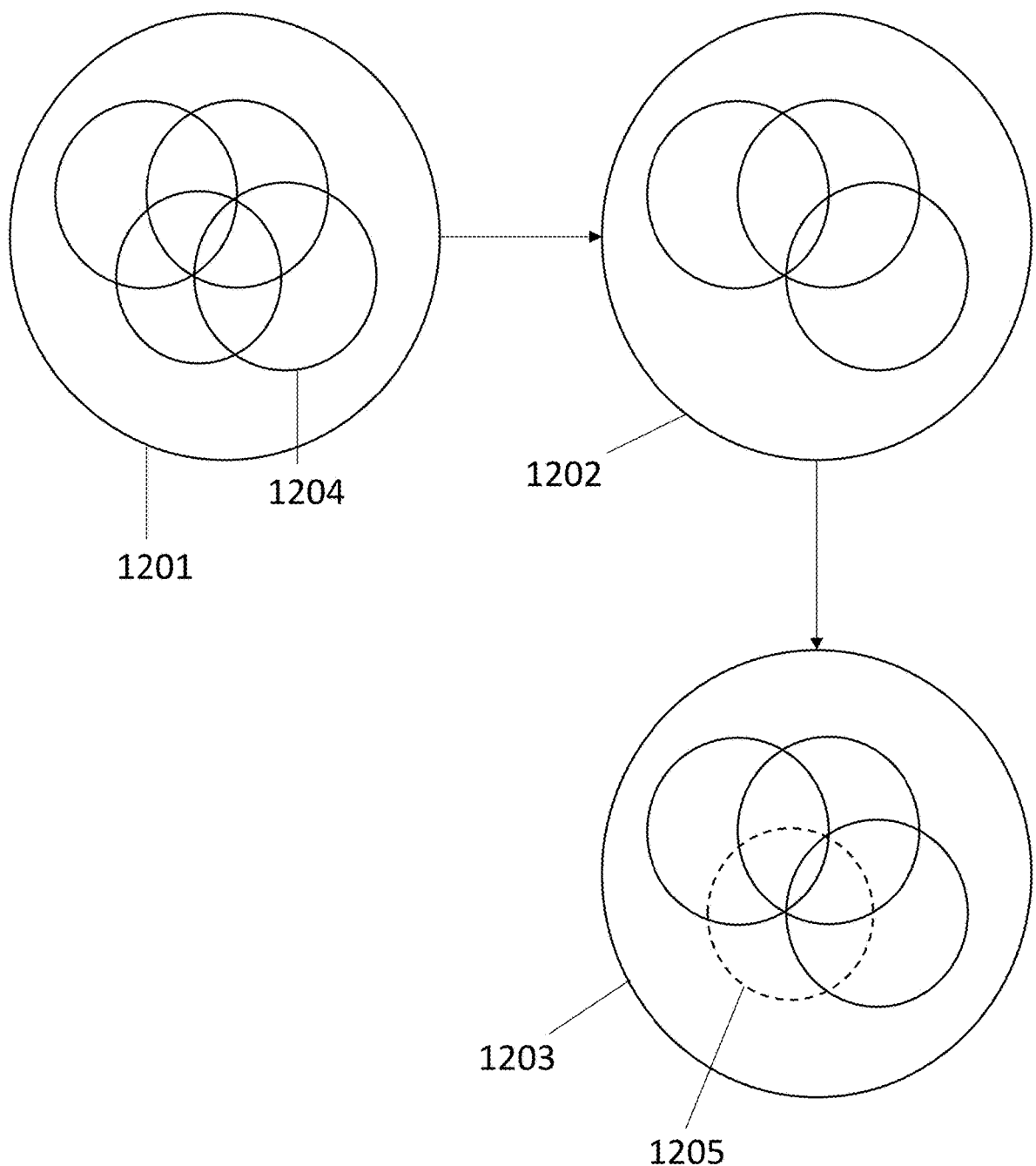
FIG. 12 is a schematic diagram of solution optimization via adding or subtracting solution-entities from a solution profile according to one embodiment of the present invention.

FIG. 12 is a schematic diagram of solution optimization via adding or subtracting solution-entities from a solution profile according to one embodiment of the present invention. Solutions or technologies are able to be conceptualized as units containing individual, separable components (or dimensional attributes). The platform allows for these components to be easily mixed and matched to more precisely refine a technology. For example, in FIG. 12, a first iteration of a technology 1201 includes four different components 1204. After selection is received from a user device, a second iteration of the technology 1202 is generated, lacking one of the components (or dimensional attributes) of the first iteration 1201. Then, after further selection is received from a user device, a third iteration of the technology 1203 is generated, having an additional component (or dimensional attribute) 1205 not associated with the first iteration 1201 or the second iteration 1202.

Figure 13:
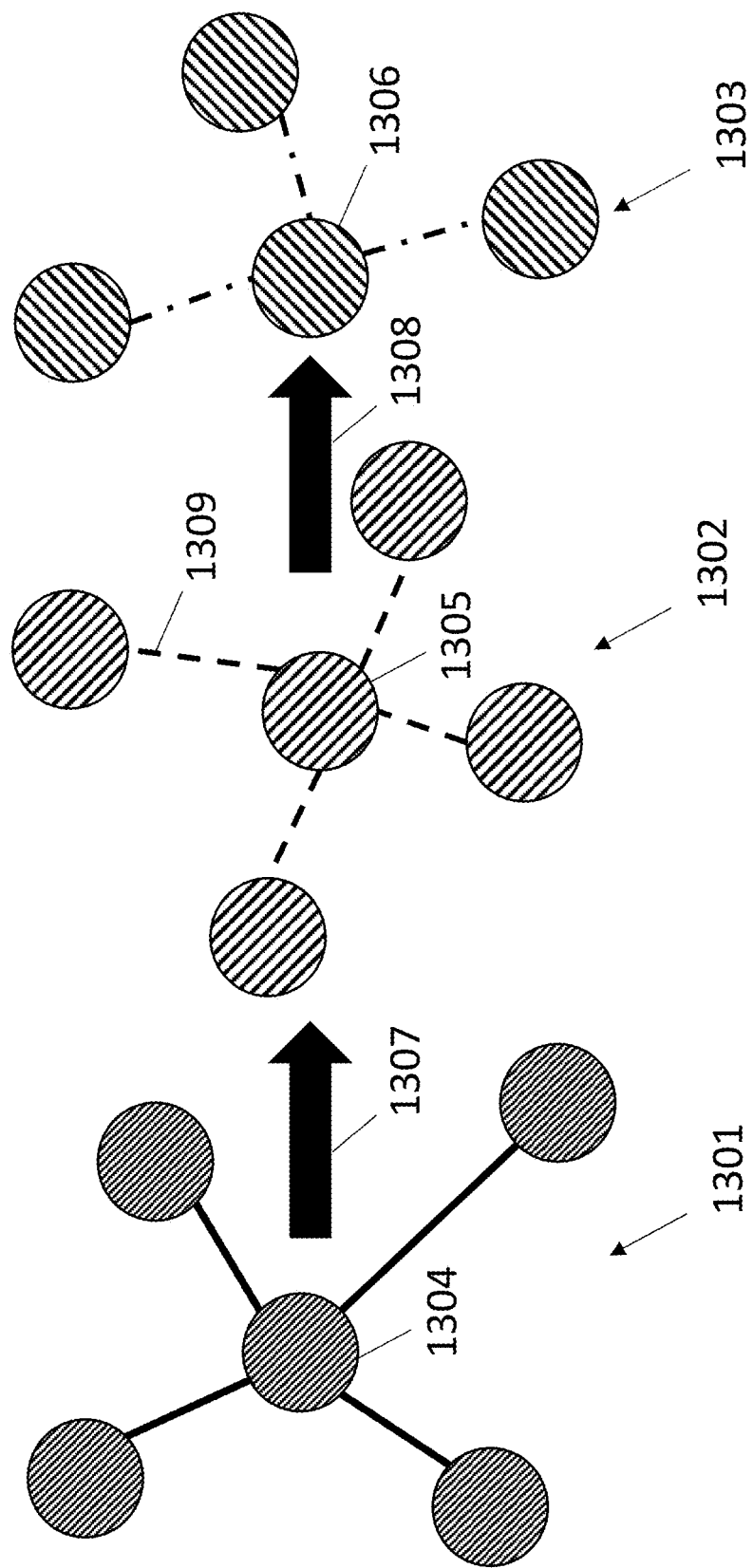
FIG. 13 is a schematic diagram of a self-assembled network according to one embodiment of the present invention.

FIG. 13 is a schematic diagram of a self-assembled network according to one embodiment of the present invention. One advantage of the present invention is the ability to utilize self-assembled information networks, where unmet needs and solution-entities form nodes within the framework. Self-assembly is a process in which a disordered system of components (e.g., a database of documents) forms an ordered structure as a result of interactions between the components themselves, rather than manual assignment of connections between the nodes. The platform is capable of automatically parsing unmet needs and solution-entities into ontologically separable dimensional attributes, which are then able to be compared between both unmet needs and solution-entities along one or more ontological dimensions.

After the platform receives a selection of a first dimensional criterion by which to organize nodes, the platform automatically generates and displays a graph of each node. In a first iteration 1301, a central node 1304 is associated with four other nodes via edges. In one embodiment, properties of the edges (e.g., line length, line-dash pattern, color, transparency, line thickness, line angle, etc.) in the network represent differences in the relationship between each node. In one embodiment, an edge between two nodes indicates sufficient similarity between the two nodes relative to a preset threshold. In one embodiment, the platform receives a selection of a second dimensional criterion 1307, causing the network to automatically reassemble in a new fashion. As shown in FIG. 13, a second iteration 1302 of the graph includes a central node 1305 connected to four surrounding nodes by different types of edges 1309 relative to the first iteration 1301. In one embodiment, the platform receives a selection of a third dimensional criterion 1308, causing the network to again automatically reassemble into a third iteration 1303, with a central node 1306 connected to only three nodes.

Figure 14:
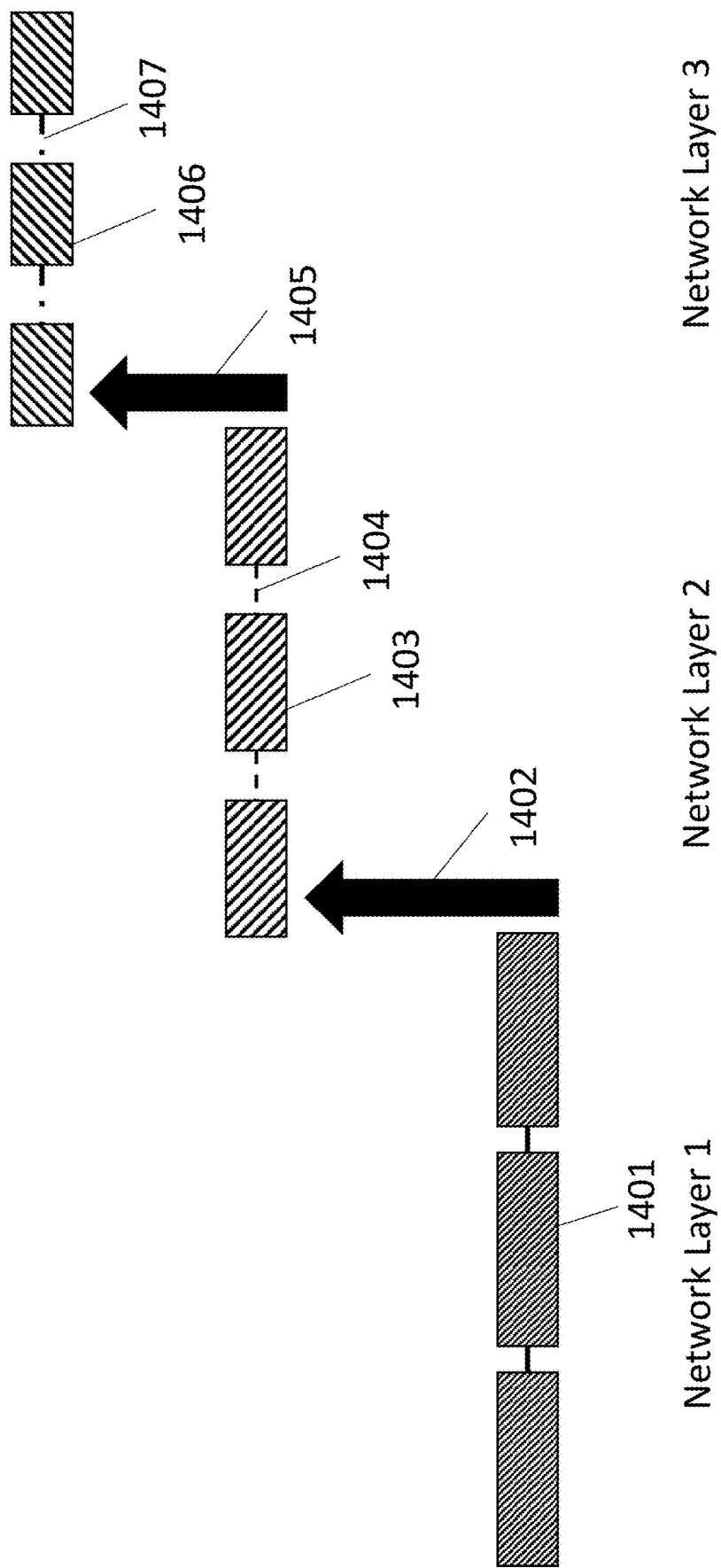
FIG. 14 is a schematic diagram of a self-assembled network according to another embodiment of the present invention.

FIG. 14 is a schematic diagram of a self-assembled network according to another embodiment of the present invention. FIG. 14 provides an alternative visualization to the graphical visualization shown in FIG. 13. In a first iteration (i.e., network layer 1), nodes 1401 are connected via edges according to a first dimensional criterion. When a second dimensional criterion (i.e., network layer 2) 1402 is applied, the nodes 1403 reorganize and are connected by new edges 1404. If a third dimensional criterion (i.e., network layer 3) 1405 is applied, the nodes 1406 again reorganize and are connected by new edges 1407. Dynamically reorganizing and self-assembling networks are useful, as they do not have the same sort of structural bias that databases with rigid taxonomic structures possess. This lack of rigidity is therefore useful in identifying new and innovative solutions.

In one embodiment, solution-entities are defined as collection of component nodes (e.g., themselves defined as documents, collection of documents, summary text, etc.) and the interconnections or inter-dependencies between the component nodes, such that the solution-entities are able to be represented by a subgraph of the component nodes and inter-nodal interconnections.

Self-assembly of interconnected document-nodes is able to proceed by a number of means, including (1) pairwise comparison of shared yet relatively rare words of one or more parts of speech, (2) pairwise comparison of term frequency-inverse document frequency (Tf-Idf) vectors, as described in Sparck Jones, K. (1972). A Statistical Interpretation of Term Specificity and Its Application in Retrieval". Journal of Documentation 28: 11-21 and Salton, G. & McGill, M. J. (1983). Introduction to Modern Information Retrieval. New York: McGraw-Hill., each of which are incorporated herein by reference in its entirety, Tf-Idf frequency normalization variants such as Boolean/logarithmic scaling, as described in Salton, G., Fox, E. and W. H. (1983). Wu. Extended Boolean information retrieval. Communications of the ACM, 26 (11) and Singhall, A (2001). Modern Information Retrieval: A Brief Overview. Bulletin of the IEEE Computer Society Technical Committee on Data Engineering, each of which are incorporated herein by reference in its entirety, Rochio classifiers, and other similar methods, such as described in Manning, C. D., Raghavan, P., and H Schutze. (2009). An Introduction to Information Retrieval, Cambridge University Press. Page J 81, which is incorporated herein by reference in its entirety, (3) sentence-to-vector, paragraph-to-vector, and document-to-vector based comparisons, as described in Le. Q. and T. Mikolov. (2014). Distributed Representations of Sentences and Documents. Proceedings of the 31st International Conference on Machine Learning, Beijing, China, JMLR: W &CP volume, which is incorporated herein by reference in its entirety, and (4) bioinformatics-inspired approaches including, but not limited to, dot-matrix plotting, and dynamic programming techniques such as the Needleman-Wunsch algorithm and the Smith-Waterman algorithm, as described in Mount D. M. (2004). Bioinformatics: Sequence and Genome Analysis (2nd ed.). Cold Spring Harbor Laboratory Press: Cold Spring Harbor, NY, which is incorporated herein by reference in its entirety.

The system of self-assembling networks allows for at least four distinct forms of user engagement with the graphical network, including steps, skips, hops, and jumps. After the platform detects any form of movement by the user, the platform is capable of assessing and comparing relative differences between the prior need and/or solution-entities and the current need and/or solution entities. A step includes movement from a need or solution entity in one network layer to a neighboring need or solution entity in the same network layer, allowing for exploration of relatedness in a single ontological dimension. A skip includes movement from a need or solution entity in one network layer to a non-neighboring need or solution entity in the same network layer. Similar to a step, a skip allows for an exploration of relatedness in a single ontological dimension, but with greater speed and less rigidity. A hop includes movement from one network layer to another within the same need or solution entity, allowing the user to explore how the same need or solution entity is positioned within along a different ontological dimension. Finally, a jump includes movement from one need or solution entity in a first network layer to another need or solution entity in another network layer. Jumps are often motivated by a desire to migrate from a local optimum solution to a more global optimum solution for a particular unmet need.

Figure 15:
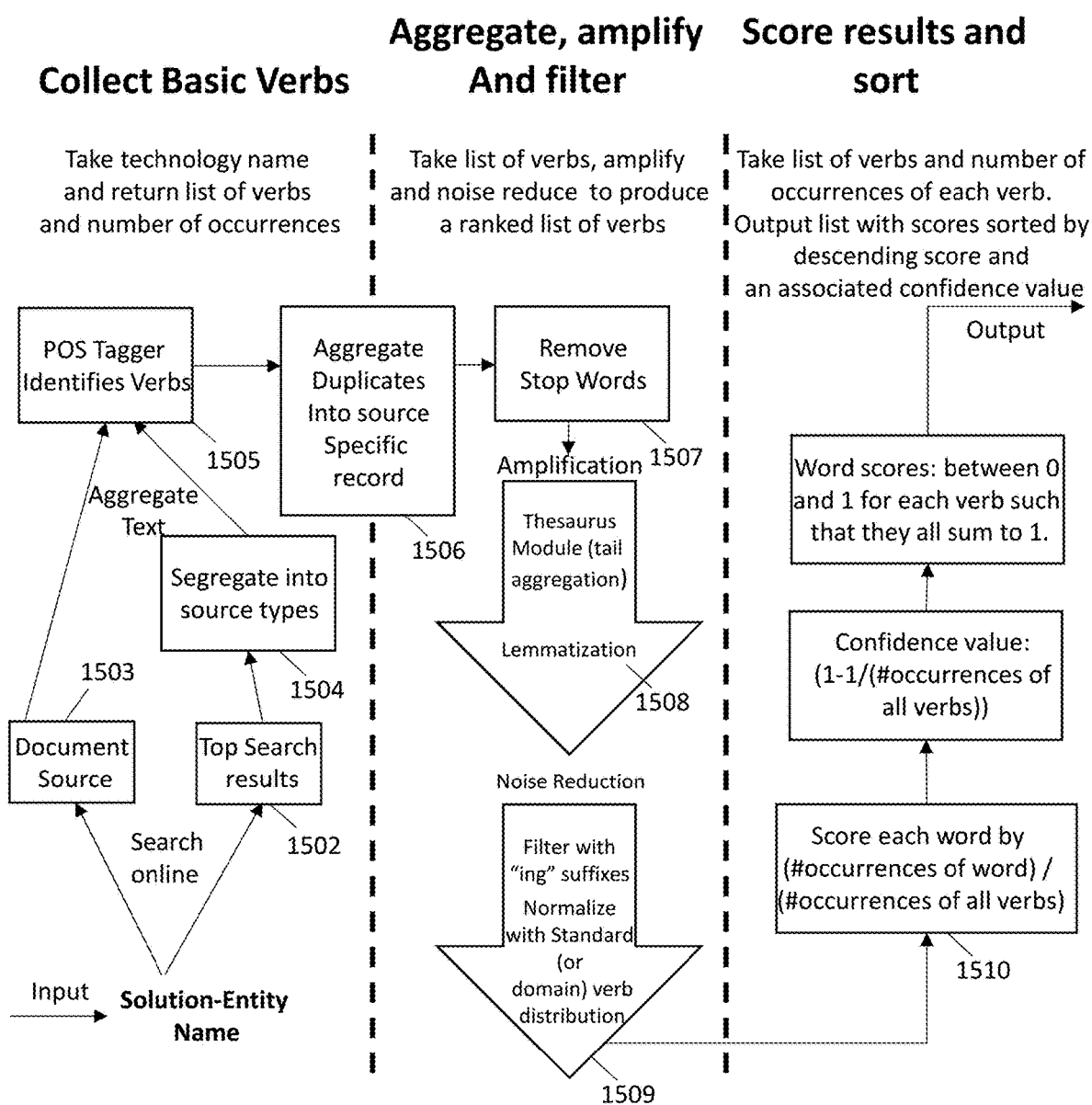
FIG. 15 is a flow diagram for linguistic parsing of documents according to one embodiment of the present invention.

FIG. 15 is a flow diagram for linguistic parsing of documents according to one embodiment of the present invention. In one embodiment, identifying highly associated parts of speech for each document proceeds in three major stages: collection, aggregation, and scoring. The purpose of the collection stage is to take a technology name and return a list of words in a particular part of speech (e.g., verbs) and a number of occurrences of each word. First, the platform takes as an input a solution-entity name (or a technology name). The platform utilizes a web crawler to automatically search for the technology name online, taking both online documents 1503 and webpage links 1502. In one embodiment, the online documents 1503 and/or webpage links 1502 are automatically separated into groups based on the type of document and/or the type of website (e.g., corporate website, blog, journal article, newspaper article, patent, patent publication, etc.). The text of each document and/or webpage is then aggregated and a part of speech (POS) tagger is used to identify verbs used in the corpus 1505. The platform then moves into the second stage, aggregating duplicate words into a source-specific record 1506. The platform then automatically removes stop words from the source-specific record 1507. The platform then interacts with a thesaurus module (e.g., containing a list of words, meanings of words, and synonyms/antonyms for words) in order to perform lemmatization 1508. Lemmatization involves adding inflected versions of all words on the list and grouping each group of inflected words together to analyze them together. In one embodiment, together with lemmatization, the platform amplifies the source-specific record in other ways, including applying one or more filters to remove/down-weight low relevance words, subtractive filtering common words for a particular topical domain, using an iterative search cascade calculated to increase frequency of relevant terms in a data file, using word proximity analysis to increase frequency of relevant terms, and/or detecting units of measurement. The platform reduces noise in the record by filtering words with "ing" suffixes and normalizing the list with standard verb distributions 1509. The platform then moves on to the scoring stage. Each word is scored relative by dividing the number of occurrences of the word relative to all words of its part-of-speech (e.g., all verbs) in the source-specific record 1510. A confidence value for scoring is established as equal to $1-1/(\#occurrences\ of\ chosen\ part\ of\ speech)$. Therefore, the resulting output should be a source-specific record of words, each having a score between 0 and 1, where the sum of all the scores is equal to 1.

In one embodiment, the POS tagger does not detect all words of a particular part-of-speech, but is limited to one or more specialist corpuses. In one embodiment, the platform is fed the specialist corpus, which includes "specialist words" or various parts of speech associated with a particular field (e.g., medical, engineering, financial, etc.). In another embodiment, the platform automatically generates the specialist corpus using a web crawler by crawling at least one online database associated with a particular field (e.g., crawling PubMed for medical specialist words). Often times, particular parts of speech are associated with particular dimensions of an invention. By way of example and not of limitation, most words contributing to the C1 dimension (describing a solution's capabilities) are verbs, most words contributing to the C2 dimension (describing a solution's characteristics) are adjectives, and most words contributing to the C3 dimension (describing a solution's composition) are nouns, which helps to segregate word lists associated with each dimension.

Figure 16:
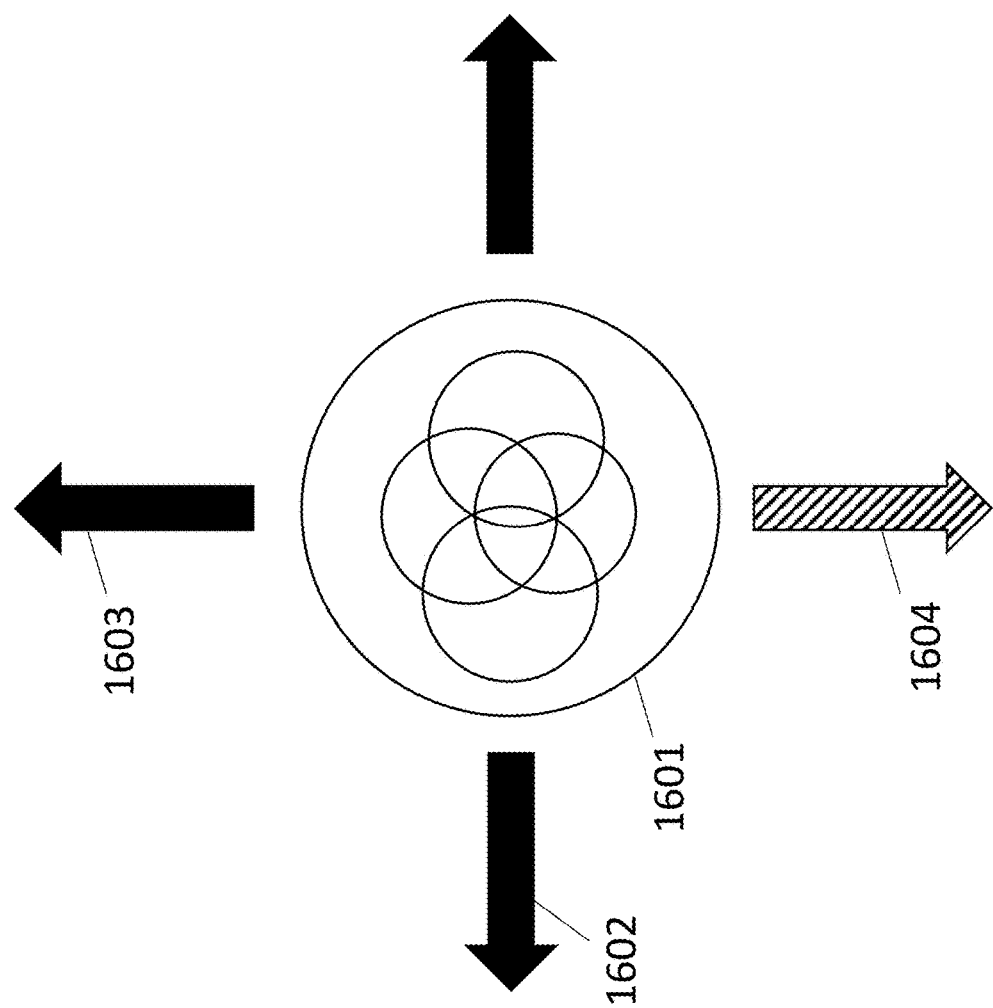
FIG. 16 is a schematic diagram of a solution-entity with links to surrounding solution-entities according to one embodiment of the present invention.

FIG. 16 is a schematic diagram of a solution-entity with links to surrounding solution-entities according to one embodiment of the present invention. A single solution-entity 1601 has connections 1602, 1603, 1604 to surrounding solution-entities according to one or more ontological dimensions. In one embodiment, the greater the similarity between two technologies in a particular dimension, the short the line length. In one embodiment, the greater the certainty of relatedness, the thicker the line length. In one embodiment, the greater the controversy surrounding an aspect of potential relatedness, the greater the extent to which a line contains dashes and/or is semi-transparent. In one embodiment, the color of the line is used to indicate a particular ontological dimension. In one embodiment, the linkages are comprised of words, tag words, and/or tag clouds that are colored, shaded, and/or made semi-transparent to denote particular semantic meaning related to the linkages they represent.

Figure 17:
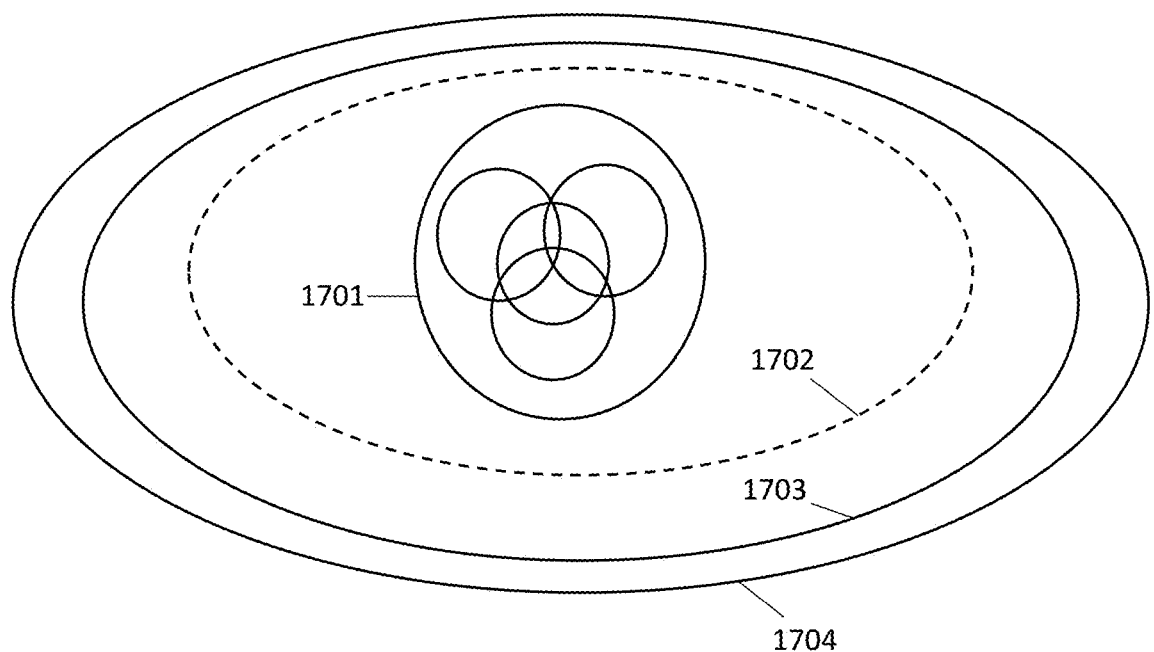
FIG. 17 illustrates an organization schema for a solution technology, wherein associated documents are sorted into a hierarchy of rings surrounding the solution technology according to one embodiment of the present invention.

FIG. 17 illustrates an organization schema for a solution technology, wherein associated documents are sorted into a hierarchy of rings surrounding the solution technology according to one embodiment of the present invention. In one embodiment, each node is represented by a circle (or another shape) 1701 on a canvas. When a cursor hovers over a particular node, the node is surrounded by a plurality of concentric rings containing associated documents, contact information, software tools, and other enabling elements that are able to be ordered by relevance, detail level, source type, evidence-level, reliability, and/or credibility. In one embodiment, documents in the innermost ring 1702 surrounding the node include patents and highly cited journal articles (i.e., the most relevant/most trustworthy documents), documents in the next ring 1703 include news articles, and documents in the outermost ring 1704 include social media sources 1704 (i.e., the least trustworthy documents). In one embodiment, the rings include contact information or assistance information with the cheapest, most reliable, and/or easiest to access options in the innermost ring and the most expensive, least reliable, and/or most difficult to access options in the outermost ring. For example, in one embodiment, the innermost ring 1702 includes, contact information for an expert in a related field, the next ring 1703 includes links to software tools for assistance with the technology, and the outermost ring includes information about upcoming conferences related to a related field.

Figure 18:
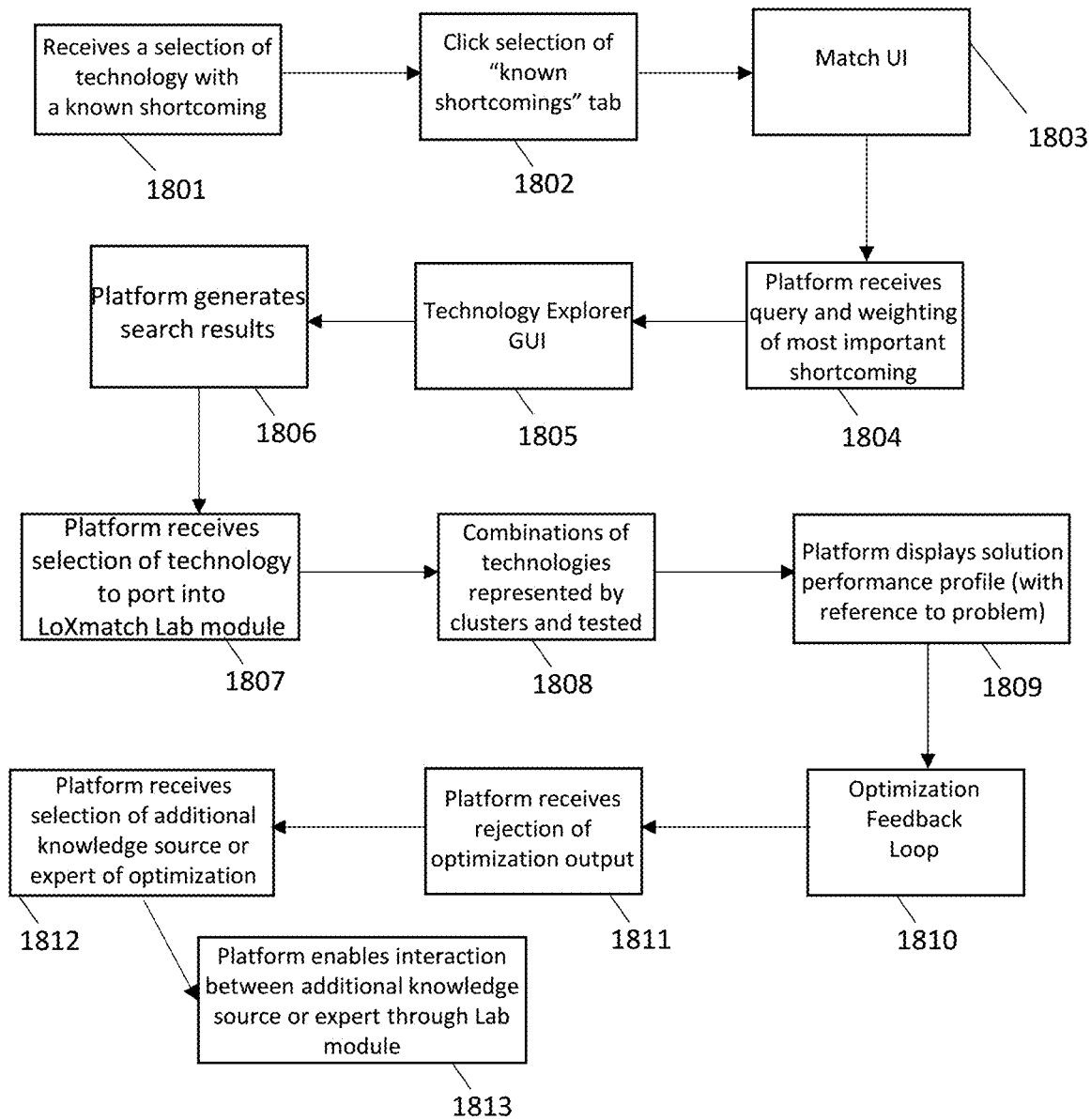
FIG. 18 is a flow diagram for solution optimization including social collaboration according to one embodiment of the present invention.

FIG. 18 is a flow diagram for solution optimization including social collaboration according to one embodiment of the present invention. In one embodiment, the platform includes collaborative tools for multiple people to participate in a single search process simultaneously. The platform receives a selection of a technology with a known shortcoming from at least one user device 1801 and click selection by the at least one user device to navigate to a "known shortcomings" tab 1802. Through the match UI 1803 and/or the technology explorer GUI 1805, the platform receives a query and/or a weighting of the most important shortcoming with regards to the selected technology 1804. The platform generates search results for the query 1806 and receives the selection of one or more technologies from the search results 1807. The one or more selected technologies are tested alone or in combination using a Lab module 1808 and a solution performance profile for each technology or combination of technologies is generated and displayed on the at least one user device 1809. The platform receives further refinements of the technologies and/or combinations of technologies 1810 in response to the solution performance profile. In one embodiment, the platform receives a rejection to further refine the solution and a rejection to the finally confirmed solution 1811.

The platform receives a selection of one or more additional knowledge sources or experts 1812. In one embodiment, the selection of one or more additional knowledge sources or experts 1812 includes at least one contact point (e.g., phone number, email address, social media account, etc.) and/or at least one device ID for a user device corresponding to the additional knowledge sources or experts. In one embodiment, the platform is operable to automatically transmit at least one message to the additional knowledge source or expert 1813 based on the contact point and/or the at least one device ID provided, thereby enabling interaction and collaboration with the additional knowledge source or expert. In one embodiment, the platform includes a native video chat hosting system, enabling direct audio, video, and/or text communication over the platform with the additional knowledge source or expert.

Figure 19:
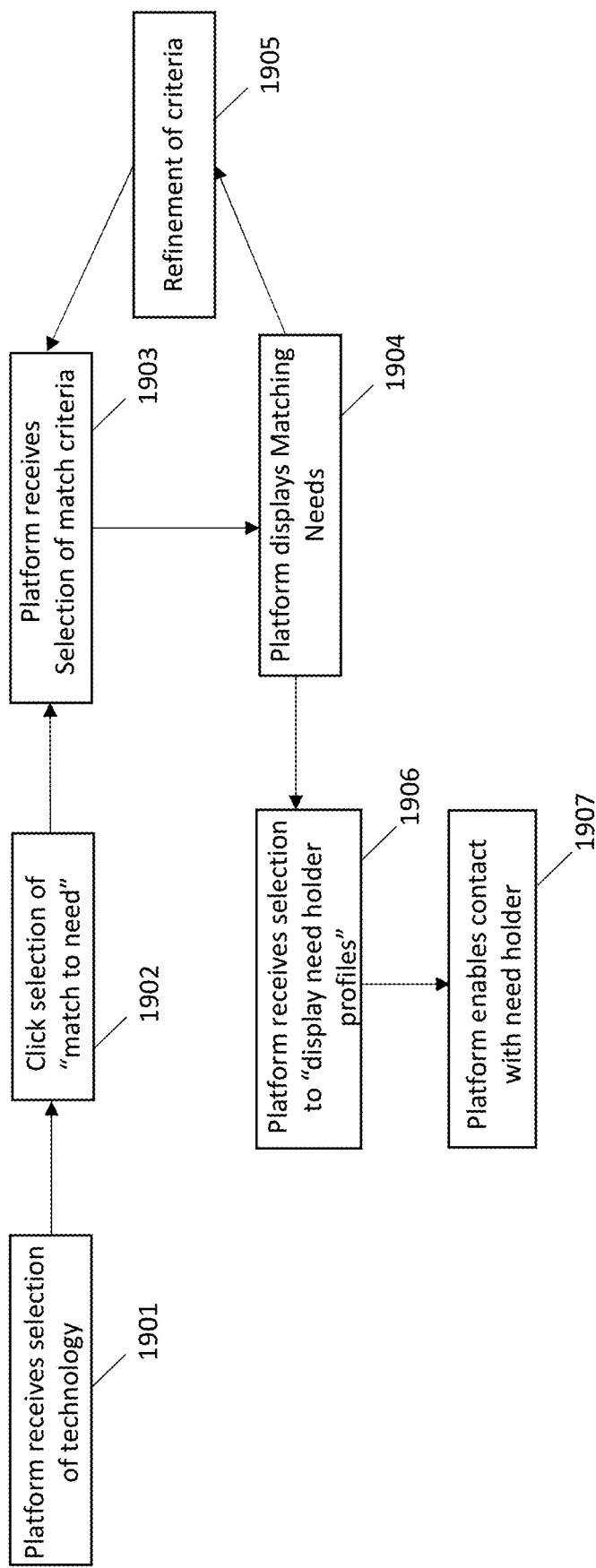
FIG. 19 is a flow diagram for identifying relevant needs according to one embodiment of the present invention.

FIG. 19 is a flow diagram for identifying relevant needs according to one embodiment of the present invention. In one embodiment, the platform receives a selection of at least one technology (or at least one solution-entity) 1901 and click selection of "match to need" 1902 from at least one user device. The platform receives a selection of one or more match criteria for identifying an unmet need to be solved by the selected technology 1903 from the user device and the platform then generates and transmits matching needs 1904 meeting the match criteria. Subsequently, the user device receives a selection of one or more refinements to the match criteria to achieve more desirable results 1905. When the search results meet the interests of the user device, the platform receives a selection to "display need holder profiles" 1906 to identify what individuals have designated a desire to address a particular unmet need and the platform automatically transmits contact information for the need holders to the user device 1907.

Figure 20:
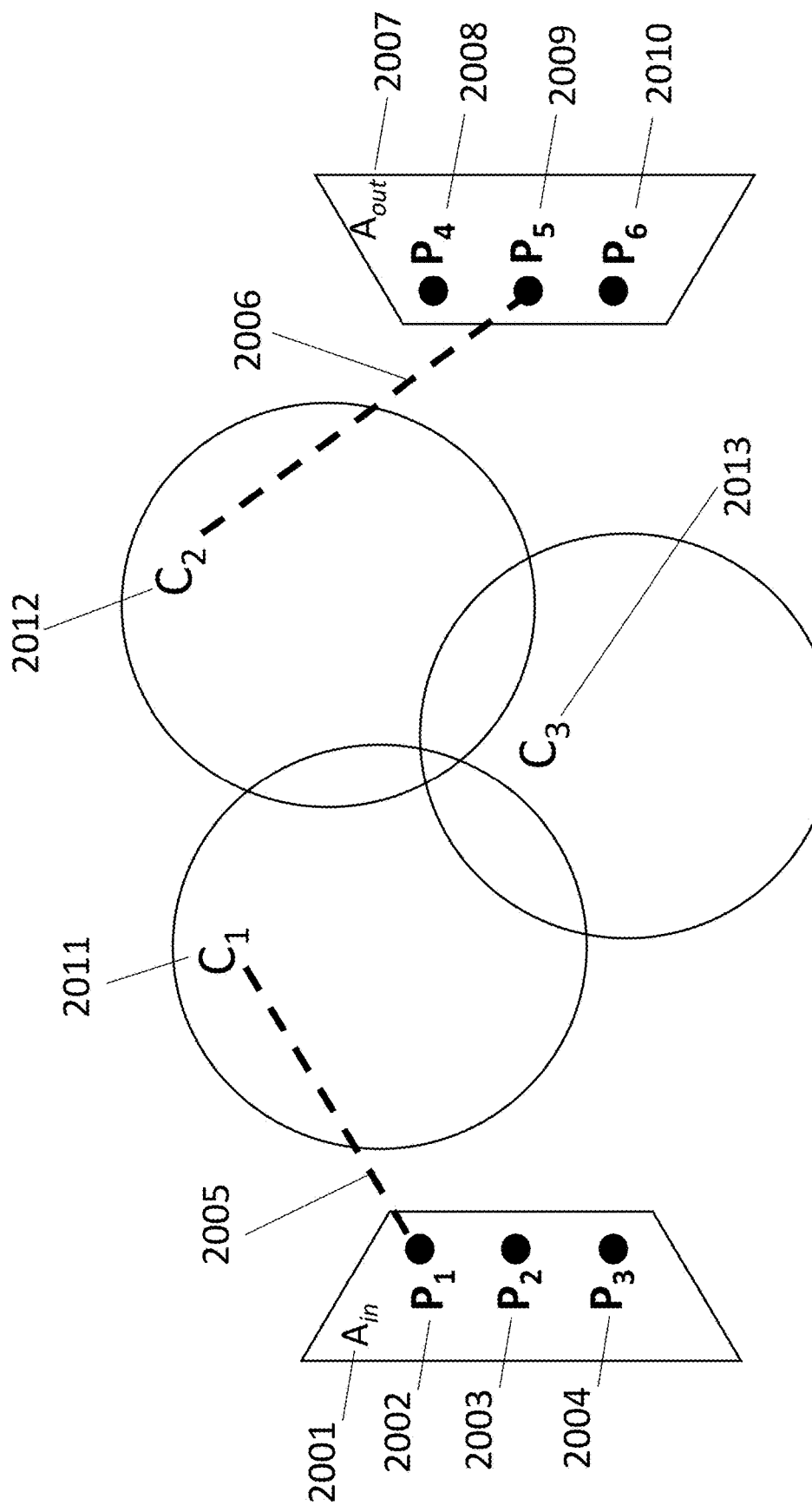
FIG. 20 is a schematic diagram illustrating differential weighting of pivot agents within a set of input or output nodes according to one embodiment of the present invention.

FIG. 20 is a schematic diagram illustrating differential weighting of pivot agents within a set of input or output nodes according to one embodiment of the present invention. FIG. 20 presents a way to decontextualize a solution node in order for a user, such as an inventor, to find broader uses for the attributes of the node. The system includes an input context anchor 2001 with three pivot agents ($P_1$ 2002, $P_2$ 2003, and $P_3$ 2004) and an output context anchor 2007 with three pivot agents ($P_4$ 2008, $P_5$ 2009, and $P_6$ 2010). The pivot agents correspond to attributes within the C1 dimension 2011, C2 dimension 2012, and/or C3 dimension 2013 of a solution-entity, represented through links 2005, 2006. Decontextualization is able to be achieved by downweighting or upweighting different pivot agents, downweighting or upweighting the input context anchor or the output context anchor, and/or linking a particular pivot agent with a particular ontological dimension. This allows for more diverse sets of solution that often help spur innovation. In another embodiment, user holds the context anchors locked while the solution node is varied, or, vice versa, the solution node is locked while the context anchors are varied.

Figure 21:
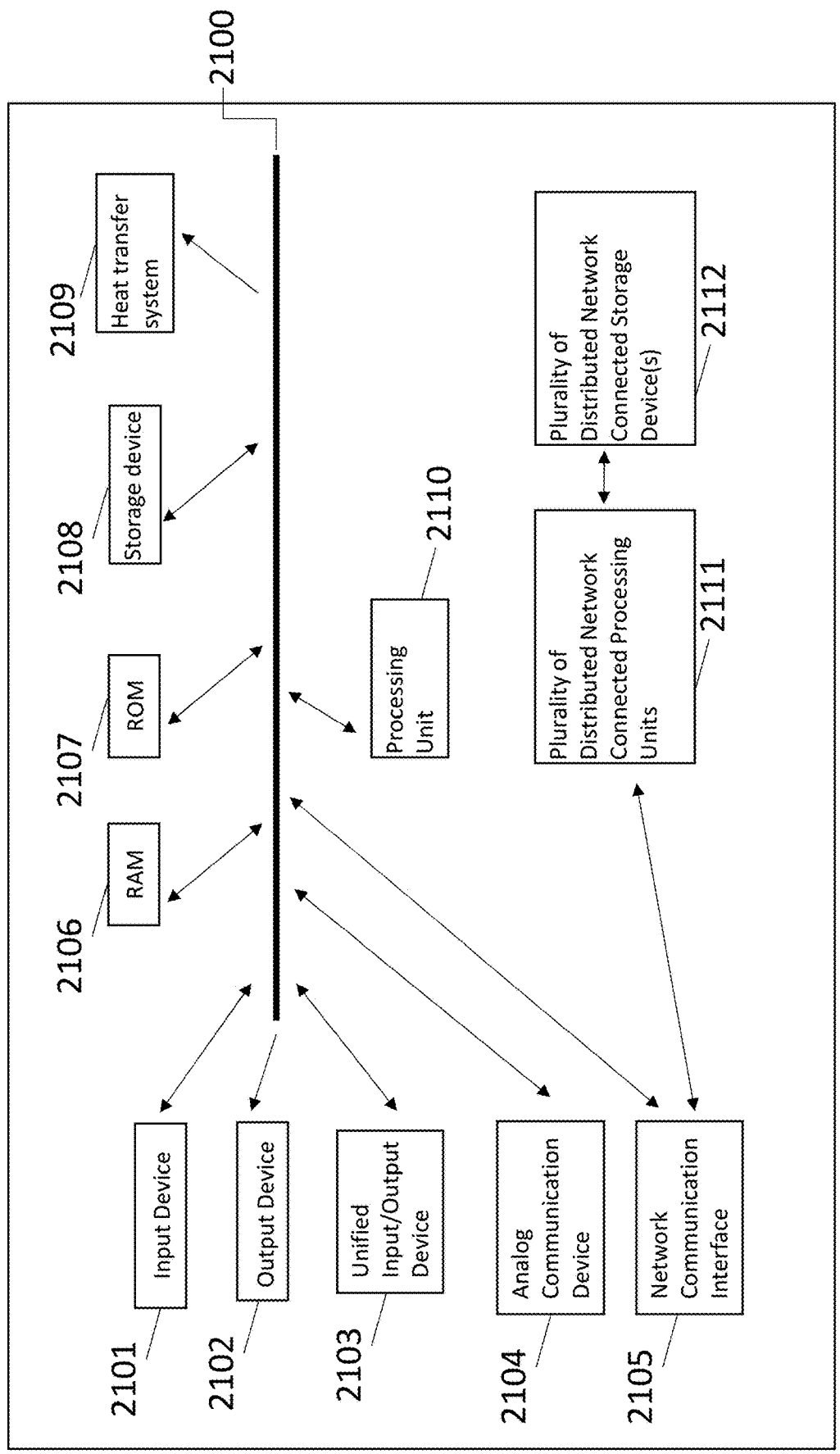
FIG. 21 is a schematic diagram of a computing device according to one embodiment of the present invention.

FIG. 21 is a schematic diagram of a computing device according to one embodiment of the present invention. A computing device 2100 is intended to represent various forms of information processing computers, such as laptops, desktops, workstations, personal digital assistants, servers, server farms, blade servers, mainframes, and other appropriate digital computers. The computing device 2100 is further intended to represent any other typically non-mobile electronic devices, such as televisions, Internet-enabled digital controllers or displayers, or other electronic devices with one or more processors embedded therein or attached thereto. Computing device 2100 includes an input device 2101, and output device 2102, a unified input/output device 2103, an analog communication device 2104, a network communication device 2105, as well as RAM memory 2106, ROM memory 2107, a memory storage device 2108, a heat transfer system 2109, and a central processing unit 2110. The network communication interface 2105 is attached to a plurality of distributed network connected processing units 2111 and a plurality of distributed network connected storage devices 2112. In such a way, the computing device 2100 is configured to access information relating to the unmet needs and solutions over the network, e.g., through communication with one or more of the distributed network-connected processing units 2111 and/or storage devices 2112. Each of the components 2101, 2101, 2103, 2104, 2105, 2106, 2107, 2108, 2109, and 2110 are interconnected using various busses, and are able to be mounted on a common motherboard or in other manners as appropriate.

The processor 2110 processes instructions for execution within the computing device 2100, 2111, including instructions stored in the memory 2106, 2107 or on the storage device 2108, 2112 to display graphical information for a GUI on an external input/output device, such as display output device 2102 coupled to high speed interface 2105. In other implementations, multiple processors and/or multiple buses are used, as appropriate, along with multiple memories and types of memory. Also, multiple computing devices 2100 are able to be connected, in series and/or in parallel, with each device providing portions of the necessary operations (e.g., as a server bank, a group of blade servers, or a multi-processor system). Further, forms of information other than graphical data are able to be presented to the user, including but not limited to sound, haptic feedback, olfactory stimuli, and related sensory cues.

The memory 2106, 2107 stores information within the computing device 2100. In one implementation, the memory 2106, 2107 is a computer-readable medium. In one implementation, the memory 2106, 2107 is a volatile memory unit or units. In another implementation, the memory 2106, 2107 is a non-volatile memory unit or units.

The information stored in the memory 2106, 2107 includes executable instructions and related data that, when executed by the processor 2110 causes the device to implement all or part of the methods depicted in FIGS. 2, 3, 4, 5, 6, 7, 8, 9, 10, 11, 15, 18, and 19 and/or other methods described hereinabove.

The storage device 2108, 2112 is capable of providing mass storage for the computing device 2100. In one implementation, the storage device 2108, 2112 is a computer-readable medium. In various different implementations, the storage device 2108, 2112 includes a floppy disk device, a hard disk device, an optical disk device, or a tape device, a flash memory or other similar solid-state memory device, a set of tokenized nucleotide strands, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 2106, 2107, the storage device 2108, 2112, or memory 2106, 2107 on processor 2110.

The computing device 2100 is able to be implemented in a number of different forms. For example, it is able to be implemented as a standard server multiple times in a group of such servers. It is also able to be implemented as part of a rack server system. In addition, it is able to be implemented in a personal computer such as a laptop computer. Alternatively, components from the computing device 2100 are able to be combined with other components in a mobile device (not shown). Each of such devices contain one or more of computing device 2100 and an entire system is able to be made up of multiple computing devices communicating with each other.

The processing unit 2110 processes instructions for execution within the computing device 2100, including instructions stored in the memory 2106, 2107. The processor also includes separate analog and digital processors.

The processor 2110 communicates with a user through control interface 2101, 2103 and display interface 2102. The display 2102 is, for example, a TFT LCD display or an OLED display, or other appropriate display technology. The display interlace comprises appropriate circuitry for driving the display 2102 to present graphical, auditory, haptic and/or other information to a user. The control interface 2101, 2103 receives commands from a user and convert them for submission to the processor 2110.

In one embodiment, the memory includes, for example, flash memory and/or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 2106 and/or 2107, expansion memory, or memory on processing unit 2110. The device 2100 communicates wirelessly through communication interlace 2105, which include digital signal processing circuitry where necessary. The communication interface 2105 provides for communications under various modes or protocols, such as GSM voice calls, SMS, EMS, or MMS messaging, CDMA, TDMA, PDC, WCDMA, CDMA2000, or GPRS, among others. In one embodiment, short-range communication occurs, such as using a BLUETOOTH, WIFI, or other such transceiver (not shown). In addition, GPS receiver module provides additional wireless data to device 2100.

The device 2100 is in the form of or embedded within a phone, a smartphone, a watch, a smartwatch, electronic or digital jewelry, wearable computing devices, and portable computing devices, including but not limited to transportation systems such as automobiles, motorcycles, scooters, boats, planes, helicopters, spacecraft, and the like.

Various implementations of the systems and techniques described here are realized in digital electronic circuitry, integrated circuitry, specially designed ASICs (application specific integrated circuits), computer hardware, firmware, software, and/or combinations thereof. These various implementations include implementation in one or more computer programs that are executable and/or interpretable on a programmable system including at least one programmable processor, which is special or general purpose, coupled to receive data and instructions from, and to transmit data and instructions to, a storage system, at least one input device, and at least one output device.

These computer programs (also known as programs, software, software applications, instructions, or code) include machine instructions for a programmable processor, and are implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here are implemented on a computer having a display device (e.g., a CRT (cathode ray tube) or LCD (liquid crystal display) monitor) for displaying graphical and/or other image-based information to the user and a keyboard and a pointing device (e.g., a mouse or a trackball) by which the user provides input to the computer. Other kinds of devices are used to provide for interaction with a user as well; for example, feedback provided to the user is able to include any form of sensory feedback (e.g., visual feedback, auditory feedback, or tactile feedback); and input from the user is received in any form, including acoustic, speech, or tactile input. Further, the display of output is carried out through the presentation of graphical, sound, haptic, or olfactory feedback, any combination of these modes of sensory modes.

The systems and techniques described here are implemented in a computing system that includes a back end component (e.g., as a data server), or that optionally includes a middleware component (e.g., an application server), or that includes a front end component (e.g., a client computer having a graphical user interface or a Web browser through which a user interacts with an implementation of the systems and techniques described here), or any combination of such back end, middleware, or front end components. The components of the system are interconnected by any form of medium of digital data communication (e.g., a communication network). Examples of communication networks include a local area network ("LAN"), a wide area network ("WAN"), and the Internet.

The computing system includes clients and servers. A client and server are generally remote from each other and typically interact through a communication network. The relationship of client and server arises by virtue of computer programs running on the respective computers and having a client-server relationship to each other.

In one embodiment, Erlang-style distributed concurrency is used to implement algorithms as multiple logical processes that do not share state but rather communicate by passing messages. These processes are either housed in the same machine as one other or are distributed across difference machines. In the latter case, the message passing becomes network communication. This approach enables algorithm implementation as a single program yet uses the resources of multiple machines.

DRAM serves as a computer's main memory, performing calculations on data retrieved from storage. Both DRAM and cache memory are volatile memories that lose their contents when the power is turned off. DRAM is installed on the motherboard, and the CPU accesses it through a bus connection. DRAM must be refreshed every few milliseconds. Cache memory, which also is a type of random access memory, does not need to be refreshed. It is built directly into the CPU to give the processor the fastest possible access to memory locations, and provides nanosecond speed access time to frequently referenced instructions and data.

Computational processes are carried out using any combination of processing units, including but not limited to one or more central processing units (CPUs), and/or one or more graphical processing units (GPUs), and/or one or more tensor processing units (TPUs). GPUs have up to 5,000 computational cores per GPU. Computational Processing Units (CPUs and/or GPUs and/or TPUs) have substantive increases in their memory caches including but not limited to caches in any or all of Level-1 (L1), and/or Level-2 (L2), and/or Level-3 (L3) cache memory and/or Level-4 (L4). Further, L2 and/or L3 and/or L4 cache memory is implemented with large memory per cache.

Processing unit caches are small pools of memory that store information the processing unit (CPU and/or GPU and/or TPU) is most likely to next need. Some processors use an inclusive cache design (by way of non-limiting example, data is stored in one level of cache yet also duplicated in an adjacent cache level) while processes are exclusive (meaning the two caches never share data). If data isn't found in the L2 cache, the processing units continues down the cache chain to L3 (typically still on-die), then to main memory (DRAM). The goal of the cache system is to ensure that a processing unit has the next bit of data it will need already loaded into cache by the time the processing unit seeks it (termed a "cache hit").

The goal of the cache system described above is to ensure that a processing unit has the next bit of data it will need already loaded into cache by the time the processing unit seeks it (termed a "cache hit"). There is typically a linear relationship between total cache hit rate in one cache level (e.g., L1) as a function of cache size is the next cache level (e.g., L2): the total cache hit rate rises sharply as the memory size of the next level cache increases. A larger, slower, cheaper next level cache (e.g., L2) provides all the benefits of a large current level cache (e.g., L1)—yet without the concurrent die size and power consumption penalty. Most modern L1 cache rates have hit rates far above the theoretical 50 percent shown here—by way of non-limiting example, Intel and AMD both typically field total cache hit rates in excess of 95 percent or higher. By way of nonlimiting example, cache memory is increased over a wide potential range, from 32 KB to 1 GB or more.

Each computational processor contains a particular form of "tag RAM", which serves as a record of all the memory locations that map to any given block of cache. If a cache is fully associative, it means that any block of RAM data is stored in any block of cache. The advantage of such a system is that the hit rate is high, but the search time is extremely long. By way of non-limiting example, the CPU has to search through its entire cache memory to find out if the data is present before searching main memory. Alternatively, caches are designed with direct-mapping, where each cache block contains one and only one block of main memory. This type of cache is searched extremely quickly, but since it maps 1:1 to memory locations, it has a low hit rate.

The performance impact of adding or increasing cache memory is directly related to its efficiency, equivalent to its cache hit rate; repeated cache misses catastrophically impact processor performance. Accordingly, mixed designs that balance these design extremes are implemented in n-way associative caches. By way of nonlimiting example, a 2-way associative cache means that each main memory block maps to one of two cache blocks. A four-way associative cache means that each block of main memory could be in one of four cache blocks. An n-way associative cache means that each block of main memory is in one of n cache blocks.

Central Processing Units (CPUs), Graphic Processing Units (GPUs), and Tensor Processing Units (TPUs) form the core infrastructure enabling rapid document processing, including rapid graph-bases queries and high-speed execution of deep learning processes, all important processes that enable high responsiveness to users. Computers configured with all these components serve as the hardware that enables the efficient, effective, large-scale execution of deep learning and graph-based mathematics, both of which are essential for a highly responsive user interface (which is itself critical for widespread adoption by most end users). In particular, a server configured with 32 CPU Cores, several thousand GPU cores (5,000 GPU cores is ideal), and several TPUs enables highly concurrent, highly user responsive, distributed computation, which are massively scaled in a computer network for rapid, time- and cost-efficient computation.

The CPU is a flexible, general-purpose processor based on Von Neumann architecture, processing data using both software and memory. CPU memory is high-speed static random access memory (SRAM) that a computer microprocessor accesses more quickly than it accesses regular random access memory (RAM). This memory is typically integrated directly into the CPU chip or placed on a separate chip that has a separate bus interconnect with the CPU. The purpose of cache memory is to store program instructions and data that are used repeatedly in the operation of programs or information that the CPU is likely to need next. The computer processor accesses this information quickly from the cache rather than accessing it from computer's main memory. As a microprocessor processes data, it looks first in the cache memory. If it finds the instructions or data it's looking for there from a previous reading of data, it does not have to perform a more time-consuming reading of data from larger main memory or other data storage devices. Cache memory is responsible for speeding up computer operations and data processing.

However, since the CPU is so flexible, the hardware doesn't always know what is the next calculation until it reads the next instruction from the software. A CPU has to store the calculation results on memory inside CPU for every single calculation. This memory access becomes the downside of CPU architecture called the Von Neumann bottleneck. Even though the huge scale of neural network calculations means that these future steps are entirely predictable, each CPU's Arithmetic Logic Units (ALU, the component that holds and controls multipliers and adders) executes them one by one, accessing the memory every time, limiting the total throughput and consuming significant energy.

Cache memory is categorized into hierarchical levels that describe its closeness and accessibility to a microprocessor. L1 cache, or primary cache, is extremely fast but relatively small, and is usually embedded in the processor chip as CPU cache. L2 cache, or secondary cache, is embedded on the CPU, or it is on a separate chip or coprocessor and to avoid main system bus traffic. Level 3 (L3) cache is specialized memory developed to improve the performance of L1 and L2. With multi-core processors, each core has dedicated L1 and L2 cache, but shares an L3 cache. Memory caching, using DRAM or flash buffer disk reads, is meant to improve storage I/O by caching data that is frequently referenced in a buffer ahead of slower magnetic disk or tape. Cache memory, on the other hand, provides read buffering for the CPU.

In addition to instruction and data caches, other caches are designed to provide specialized system functions. According to some definitions, the L3 cache's shared design makes it a specialized cache. Other definitions keep instruction caching and data caching separate, and refer to each as a specialized cache. As one non-limiting example, Translation Look-aside Buffers (TLBs) are also specialized memory caches whose function is to record virtual address to physical address translations. Specialized caches are also available for applications such as web browsers, databases, and network address binding. These types of caches might be distributed across multiple networked hosts to provide greater scalability or performance to an application that uses them.

The ability of cache memory to improve a computer's performance relies on the concept of locality of reference. Locality describes various situations that make a system more predictable, such as where the same storage location is repeatedly accessed, creating a pattern of memory access that the cache memory relies upon. There are several types of localities. Two key ones for cache are temporal and spatial. Temporal locality is when the same resources are accessed repeatedly in a short amount of time. Spatial locality refers to accessing various data or resources that are in close proximity to each other. Typical specifications for a CPU include memory ranging from 6 to 64 GB or more, memory bandwidth ranging from 24 to 32 GB/Sec, L1 Cache from 256 to 512 kB or more, and L2 Cache from 8 to 15 MB or more.

A Graphics Processing Unit (GPU) is a specialized type of microprocessor with potentially thousands of processing cores running simultaneously in each GPU core. Further, each core, though it is slower than a CPU core, is tuned for high efficiency for the basic mathematical operations required for video rendering and certain repetitive and highly-parallel computing tasks ("GPU Computation").

To gain higher computational throughput than a CPU, a GPU has up to 5,000 or more Arithmetic Logic Units (ALUs) in a single processor. As a result, thousands of multiplications and additions are able to be executed simultaneously. This GPU architecture works well on applications with massive parallelism, such as matrix multiplication required for rapid computation in a neural network. GPUs are designed with their own onboard or co-boarded L1, and/or L2, and/or L3, and/or L4 cache memory.

CPUs are more flexible than GPUs. CPUs have a larger instruction set, so they perform a wider range of tasks. CPUs also run at higher maximum clock speeds and are capable of managing the input and output of all of a computer's components. However, the GPU is still a general-purpose processor that has to support millions of different applications and software. The von Neumann bottleneck thus implies that for every single calculation in the thousands of ALUs, the GPU need to access registers or shared memory to read and store the intermediate calculation results. Because the GPU performs more parallel calculations on its thousands of ALUs, it also spends proportionally more energy accessing memory and also increases footprint of the GPU for complex circuitry.

Typical specifications for a GPU include memory ranging from 768 MB to 6 GB or more, memory bandwidth ranging from 100 to 200 GB/Sec, L1 Cache from 16 to 48 KB or more, and L2 Cache from 512 to 768 kB or more.

Tensor Processing Units (TPUs) are the hardware that enables the efficient, effective, large-scale execution of deep learning neural net mathematics, requiring a processor that executes large matrix multiplication as fast as possible yet with relatively low power consumption.

The TPU is designed to be a matrix processor specialized for neural network workloads rather than a general-purpose processor. In particular, the TPU was designed to manage the massive multiplications and additions required for rapid neural network mathematics, while also consuming less power and with a smaller physical footprint. This approach resulted in a major reduction of the von Neumann bottleneck: Since the primary task for the TPU is matrix processing, hardware designers of the TPU were aware of every calculation step to perform that operation, so they were able to properly place thousands of multipliers and adders and connect them to each other directly to form a large physical matrix of those operators. This architecture is called a systolic array. In case of Google's Cloud TPU v2, there are two systolic arrays of 128×128, aggregating 32,768 ALUs for 16 bit floating point values in a single processor. A systolic array executes neural network calculations by first loading the parameters from memory into the TPU matrix of multipliers and adders, then the TPU loads data from memory. As each multiplication is executed, the result will be passed to next multipliers while taking summation at the same time. Therefore, the output will be the summation of all multiplication result between data and parameters. During the whole process of massive calculations and data passing, no memory access is required at all.

The Google TPU Matrix Multiplication Unit has a systolic array mechanism that contains 256×256=total 65,536 ALUs. That means a TPU is able to process 65,536 multiply-and-adds for 8-bit integers every cycle. Because a TPU runs at 700 MHz, a TPU is able to compute 65,536×700,000,000=46×1012 multiply-and-add operations or 92 Teraops per second (92×1012) in the matrix unit. A TPU is a matrix multiplication engine meaning it does matrix multiplication and matrix operations. TPUs typically deliver 15-30× higher performance and 30-80× higher performance-per-watt than contemporary CPUs and GPUs.

As described above, this hardware design and computational framework transcends otherwise crippling computational bottlenecks to enable rapid pair-wise comparisons and/or semantic self-assembly within massive document sets. Furthermore, transcending the pair-wise computational bottlenecks described above enables higher user concurrency, and/or faster system responsiveness to user requests. All of these factors, taken together or separately, are critical and central requirements for success: Users expect and often demand fast response, high concurrency, and rapid data processing as core features required for sustained system adoption. Competition from other companies promoting and/or commercializing any of a myriad of similar and/or related knowledge management and/or knowledge discovery systems serve to further sharpen the requirement for a knowledge management and/or knowledge discovery system to exhibit fast response, and/or high concurrency, and/or rapid data processing.

To achieve the fast computation times and resultant system responsiveness that end-users require for mass adoption, computational processes are designed for documents in a "processing unit"- and "cache-friendly"-manner. First, for each of the computational processes described below, the processes required for rapid execution of each mathematical task is assigned to a CPU, and/or GPU, and/or TPU, in any combination, together optimized as an ensemble for minimal task execution time even while processing relatively massive amounts of data. Second, for each of the computational processes described below, execution instructions is placed on any combination of one or more CPUs, and/or one or more GPU, and/or one or more TPUs, wherein each CPU includes memory ranging from 6 to 64 GB or more, memory bandwidth ranging from 24 to 32 GB/Sec, L1 Cache from 256 to 512 kB or more, and L2 Cache from 8 to 15 MB or more, and wherein each GPU includes memory ranging from 768 MB to 6 GB or more, memory bandwidth ranging from 100 to 200 GB/Sec, L1 Cache ranging from 16 to 48 kB or more, and L2 Cache ranging from 512 to 768 kB or more. Furthermore, in one embodiment, one or more TPUs are co-implemented to enable rapid matrix multiplication and addition mathematical processing. In all cases, total task execution time is minimized while also reducing total power consumption and physical computational footprint. Each of the processing tasks described below are thus optimized for assigned processing unit; implemented L1, L2, and L3 cache memories, appropriate memory bandwidth, total power consumption, and physical footprint.

Furthermore, in developing a computation strategy, one uses one node per core per machine, or one uses nodes that make use of multiple cores, in the cores of either CPUs, and/or GPUs, and/or TPUs, depending on the specific processes being run. On the one hand, using a node that makes use of multiple cores gives the potential to share in memory databases between processes on the same node. On the other hand, using more nodes and fewer cores per node has performance advantages because they use independent GC heaps and large shared heaps tend to limit multi-core scaling. Optimizing computational processes to balance these design strategies are achieved on a per process- and/or total process set-basis.

A work queue transforms a set of inputs into a set of outputs. The work queue is a pattern because the identity of those inputs and outputs is not specified in the pattern itself but rather parameterized. Further the work queue patterns make use of processes on multiple nodes to transform the inputs into outputs. This, combined with the fact that there are multiple independent inputs, allows the work queue pattern to achieve a parallel speedup.

One master work queue process keeps track of state. Another process submits work to the work queue and collects results. Crucially, the latter process also determines the parameters of the work queue, namely the type of the input and output, and the procedure to get from one to the other. The work queue starts worker processes on one or more nodes. It runs the given procedure for turning inputs into outputs, and wraps it in some code to exchange messages with the work queue master process. The worker processes request work items from the queue and when work items are supplied the process them and send back the work item output.

The work queue master process monitors the worker processes to ensure that if any of them fail or become disconnected that the work they were doing is not lost, rather it is returned to the queue to be given to some other worker process later. It will also restart workers, provided the node is still accessible. This provides reliability even in the face of nodes stopping, failing or becoming disconnected. The work queue makes use of nodes even once it has already started, meaning it starts worker processes on them and assign them work to do. Combined with the fact that the work queue is robust to nodes disappearing, this gives the potential for the dynamic scaling of worker nodes. For example, such a capability is required to make use of the AWS spot market where EC2 instances are acquired at any time.

Figure 22:
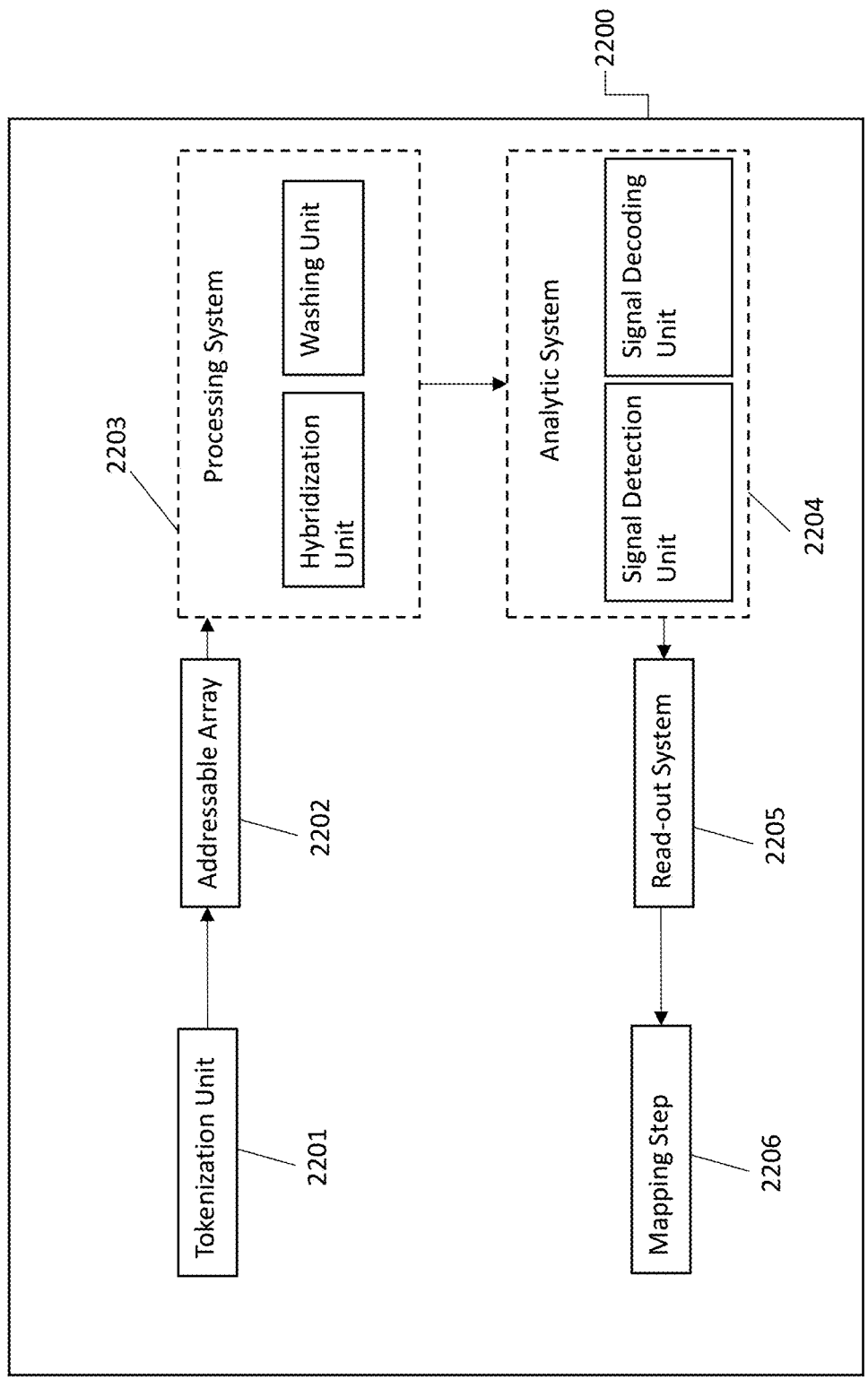
FIG. 22 is a schematic diagram of a computing device according to one embodiment of the present invention.

Alternative computing systems are able to be employed to obtain a similarly high computational speed to enable the invention described in this document. FIG. 22 is a schematic diagram of a computing device according to one embodiment of the present invention. In particular, Computing device 2200 is further intended to represent any other form of information processing system, including but not limited to DNA-based computing systems. In such a computing system, a tokenization unit 2201 is used to assign meaning to particular DNA strands ("target" strands), which then interact with an addressable array 2202 that contains additional DNA strands ("probes") chemically bound to the array surface. A processing system 2203 is used to hybridize the target and probe DNA followed by a washing. An analytic system 2204 then reads out the results of the hybridization reaction through a readout system 2205 and the tokenization run in reverse to map 2206 the readout in a manner that provides an output from the system.

Figure 23:
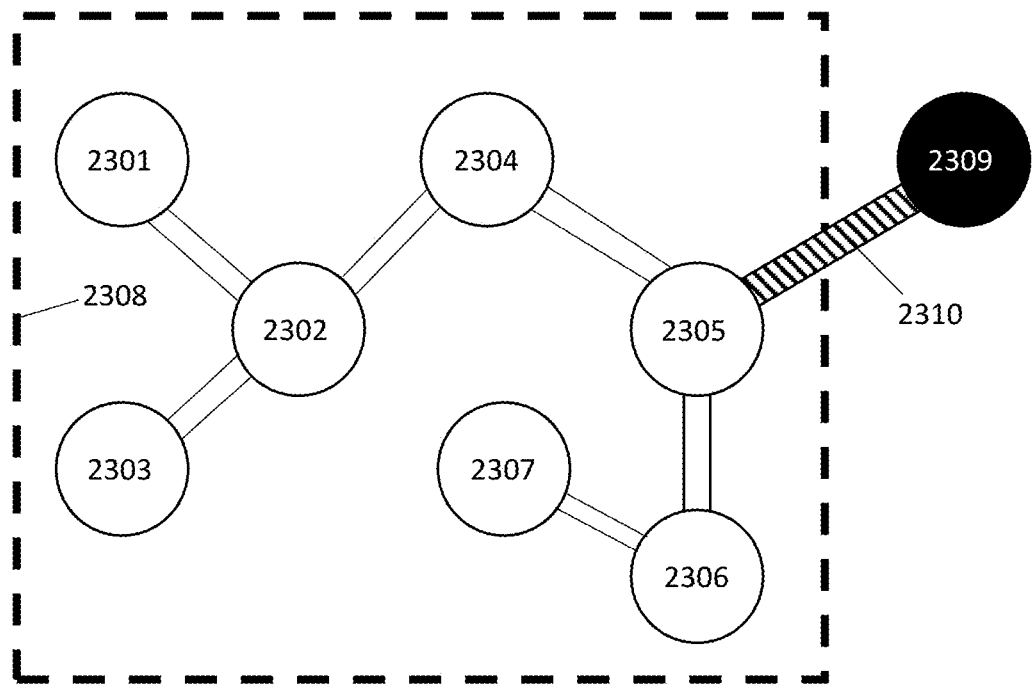
FIG. 23 illustrates a method for serendipitous detection of document nodes by identifying nodes with unshared community membership according to one embodiment of the present invention.

FIG. 23 illustrates a method for serendipitous detection of document nodes by identifying nodes with unshared community membership according to one embodiment of the present invention. FIG. 23 is a graphical illustration of nodes and edges. A first node 2301 is connected by an edge to a second node 2302, which is connected to a third node 2303 and a fourth node 2304. The fourth node 2304 is connected to a fifth node 2305, which is connected to a sixth node 2306. The sixth node 2306 is connected to a seventh node 2307. The first node 2301, second node 2302, third node 2303, fourth node 2304, fifth node 2305, sixth node 2306, and seventh node 2307 are all grouped in a single community, represented by the dashed rectangle 2308 in FIG. 23. Additionally, the fifth node 2305 is connected to an eighth node 2309 outside of the community via a cross-community edge 2310.

Identifying a node outside a community, such as the eighth node 2309, is useful as it provides a potentially serendipitous result to spur innovation. In one embodiment, communities are identified in the present invention by (1) identifying nodes with directed edges pointing inward to a set of nodes more than outward to a larger network, as described in Flake, G., Lawrence, S. and C. Giles. (2000). Efficient identification of web communities. In KDD '00: Proceedings of the 6th ACM SIGKDD International Conference on Knowledge Discovery and Data Mining, pp. 150-160, which is incorporated herein by reference in its entirety, (2) articulating nodes with specific levels of betweenness centrality values in order to define community boundaries, as described in Girvan, M., and M. Newman. (2002). Community structure in social and biological networks. Proceedings of the National Academy of Sciences of the United States of America 99 (12): 7821-7826, which is incorporated herein by reference in its entirety, (3) determining flow within the network structure, as described in Flake, G., Tarjan, R. and K. Tsioutsiouliklis. (2003). Graph clustering and minimum cut trees. Internet Mathematics 1 (4): 385-408, which is incorporated herein by reference in its entirety, (4) assessing subtopics within a document network where shared subtopics between documents form a topic community, as described in Blei, D. M., Ng, A. Y. and M. I. Jordan. (2003). Latent Dirichlet Allocation. Journal of Machine Learning Research 3: 993-1022, which is incorporated herein by reference in its entirety, (5) using spectral algorithms that analyze a community depending upon both the conductance of a community and the relative weight of between-community edges, as described in Kannan, R., Vempala, S. and A Yetta. (2004). On clusterings: Good, bad and spectral. Journal of the ACM51(3): 497-515, which is incorporated herein by reference in its entirety, and/or (6) determining modularity of internal connectivity within a graph partition relative to a random baseline of connectivity, as described in Newman, M. and M. Girvan. (2004). Finding and evaluating community structure in networks. Physical Review E 69: 026113 and Blondel, V. D., Guillaume, J.-L., Lambiotte, R. and E. Lefebvre. (2008). Fast unfolding of communities in large networks. Journal of Statistical Mechanics: Theory and Experiment 10: P10008, each of which is incorporated herein by reference in its entirety.

Credibility and Swarm Intelligence

Most conventional search engines make use of keywords for user searches. There are however several challenges related to the use of a small number of keywords to initiate searches. First, the keywords themselves are typically selected by the authors of documents, and the lack of a systematic and harmonized framework for keyword selection between and amongst authors results in a keyword selection process that ranges from inconsistent to arbitrary. Carrying out searches based on such an inconsistent framework results in poor search quality and poor search results. Second, certain keywords are ambiguous in their meaning, and their selection from a small word set often lacks an inherent contextual framework that might otherwise disambiguate such search terms. Third, as word usage evolves and adapts to changing linguistic environments, the meaning of individual terms also changes, over time, over place, and for particular users. Fourth, the use of a small number of keywords often fails to capture the full meaning of a nuanced, subtle, or technical search topic, leading to less relevant or even irrelevant search results.

The use of a semantic signature overcomes the issues posed by keywords. First, the use of tens to hundreds of relatively rare words, thousands of relatively rare words, tens of thousands of relatively rare words, or more, overcomes the limitation of selecting a few (e.g., less than 10) inconsistent or arbitrary keywords in a user-initiated search query. Second, when detecting matches based on a large number of potentially relatively rare words, should one or a few words be ambiguous in meaning, the other set of many more words serves as an ample semantic signal to such disambiguation noise, and the signal-to-noise ratio is sufficient to disambiguate the meaning of the search document. Thirds, as individual words evolve new and different usage patterns, and fall into a class of semantic noise, a sufficient number of non-evolving words remain in the search query to minimize the effect of word evolution noise in the semantic search process. Fourth, the use of a large number of relatively rare words provides for enhanced detection of subtle, nuanced, or highly technical documents that cannot be adequately expressed through a small number of keywords. To perform document-based queries, users upload documents into the document search system, which treats an incoming document as an array of words and calculates the frequencies of word usage within a document relative to that document as well as to a corpus of related documents. For those words identified as rare, the search system identifies mathematical matches or near matches based on overlapping sets of rare words to find semantically related documents When reading any type of document, whether in a scientific journal, a news article, a white paper, a legal case, a financial report, a social media post, or any other form of content, it is difficult to know what information is authentic. In an era of fake news, potentially dubious scientific publications, and weaponized propaganda, rapid detection of consensus-accepted content serves as a critical element promoting productive business operations and constructive civil, rational, and scientific discourse. By semantically detecting related documents, and through analysis of their knowledge graphs, a score is calculated to measure probable trust. To do so, the content is ingested into the document processing system of the platform e by any of several means, including drag and drop of an individual document, clipping of text from a web page, API connectivity, or batch ingestion of a large set of documents.

Several calculations enable assessment of the likelihood of trustworthy content in documents. Calculation heuristics include (1) how many peer-reviewed academic papers are semantically close-by in a knowledge graph, with a relatively greater number of academic papers indicating a higher probability of factual content, (2) how many position papers from any of a range of think tanks are semantically close-by in a knowledge graph, with a relatively greater number of think tank-soured position papers revealing attempts to lobby or otherwise influence policymakers, (3) how many high quality news articles are closely semantically related to the document of interest, with a relatively higher number of high quality news articles indicating a topic of current interest, and likely controversial, especially if the news sources tend towards different ends of the political spectrum. Aggregation and analytics for a collection of these and other document types reveals the likelihood of probable trust of content in a document.

Self-Assembly of semantically related documents within a knowledge graph, and the delineation of highly validated content with such graphs, affords the opportunity to track the provenance of a semantic signature over time and place. Time-based analytics of the changing structure of a knowledge graph is monitored from tracking of the dates of publication of each form of content, or from the age and relative maturity of a web address from which publication is made, and/or a combination of these and related time-based metrics, including but not limited to velocity and/or acceleration of the spread of a semantic signature from one document to another ("temporal provenance"). Place-based analytics of the changing structure of a knowledge graph is monitored from tracking of the locations of document publication, either in the form of a physical mailing address, or a web site address, or both ("spatial provenance"). By these and related means, the provenance of a semantic signature is able to be tracked from origination. Trust-based analytics are carried out by tracking the migration patterns of a semantic signature or a set of semantic signatures, monitored from an originating publication outlet with a particular trust score and/or content author with a particular trust score to a current publication outlet and/or content author with a particular trust score. This affords the opportunity for trend tracking and other similar or related meta-analyses of trust patterns in time and/or place.

The graph density measured and centered around a particular node is an aggregation of the connective patterns with its' first- and second-order neighboring nodes (and optionally, including third-order nodes as well), that is, a node neighborhood comprised of a swarm of discretely formed yet connected document-nodes, each node comprised of content produced from independently vetted publication processes performed by independent content producers, preferably further vetted by an additional third party. This set of interconnected document nodes forms a swarm collectively comprised of documents.

Further, the "connective glue" that interconnects any pair of document-nodes within a swarm network, the semantic signature, is formed between a document node pair self-assembled from rare shared words, and measured in part by the co-occurrence frequencies of these rare shared words. Each semantic signature is comprised of rare shared words, and is another form of swarm collective, in this case a swarm of rare shared words. Thus, within a document-node swarm, every document pair is itself formed from a rare word swarm between any two documents. The knowledge network is a self-assembled swarm of document nodes, where very pair of document-nodes in a self-assembled swarm of rare words shared between the documents.

Historically, self-assembling animal and other swarms of living creatures have been successfully computer-modeled through mathematical frameworks comprised of a small set of rules, applied to individual animals or other creatures, and including but not limited to: (i) a "zone of repulsion" rule, in which very close to the animal, the focal animal or other focal creature will seek to distance itself from its neighbors to avoid collision; (ii) a "zone of alignment" rule, in which the focal animal will seek to align its direction of motion with its neighbors; (iii) a "zone of attraction" rule, which extends as far away from the focal animal or other focal creature as it is able to sense, the focal animal will seek to move towards a neighbor; (iv) a "refractory period" rule, a time during which the animal or other creature does not respond to other animals, and/or creatures, and/or topology, and/or landscapes, and/or maps, and/or other similar or related sensory percepts; (v) an "excitatory period" rule, a time during which the animal or other creature has a relatively heightened response to other animals, and/or creatures, and/or topology, and/or landscapes, and/or maps, and/or other similar or related sensory percepts; these and related and/or similar rules, singly or in an combination, often result in complex formation patterns, oftentimes highly complex. Such rules or combinations of rules are applied in any order and/or sequence, in series and/or in parallel, in a nested structure, a nest of nests, applied to spatial zones, including but not limited to outermost, middle, and innermost communities of spatial elements within an excitable media, and so forth. The shapes of such zones will be affected by the sensory processes driving the process. Both proximity-based and other behaviors and drive the self-assembly, and independently or in combination with behavior rules, topological rules also drive self-assembly processes.

As a result of the application of the behavioral and topological rules described above, complex patterns arise including but not limited to Emergence and Stigmergy. Emergence arises when and where the properties and functions found at a hierarchical level are not present and are irrelevant at relatively lower levels, and is often a basic principle behind self-organizing systems. Stigmergy arises when and where there is a mechanism of indirect coordination between agents or actions. The principle is that the trace left in the spatial, temporal, or other, higher dimensional environment by an action stimulates the performance of a next action, by the same and/or a different agent. As a result, subsequent actions often tend to reinforce and build on each other, leading to the spontaneous emergence of coherent, apparently systematic activity and/or spatial, temporal, and/or other higher dimensional patterns. Stigmergy is a form of self-organization. It produces complex, seemingly intelligent structures, without need for any planning, control, or even direct communication between the agents. As such it supports efficient collaboration between extremely simple agents, who lack any memory, intelligence or even awareness of one another.

Swarm intelligence is the collective behavior of partially and/or completely decentralized, self-organized systems, natural or artificial. This is often applied in work on artificial intelligence, in particular in the context of cellular robotic systems. Swarm intelligence systems are typically made up of a population of simple agents interacting locally with one another and with their environment. The agents follow very simple rules and although there is no centralized control structure dictating how individual agents should behave, local, and to a certain degree random, interactions between such agents lead to the emergence of intelligent global behavior, unknown to the individual agent.

In the context of this invention, the mathematical equivalent of an animal or other creature, also termed agents, could be documents of any sort, including but not limited to complete, and/or partial, and/or sectional content of books, scientific articles, clinical articles, legal documents and other legal case matter, patents, patent applications, office actions of patent applications, responses to office actions of patent applications, financial documents, financial filings, web site pages, web site content, profile of people, profiles of products, profiles of places, profiles of strategies, profiles of works of art and/or music, news articles, social media blogs, social media postings, other text-based content, other image-based content, other audio-based content, call transcriptions, and similar and/or related content, singly or in any combination.

In the context of this invention, simple rules that drive documents to self-assemble into swarms is based in part or in whole of semantic proximity (aka semantic neighbors) of document nodes in a semantic knowledge graph, visualization, listing, in singly or in combination. Rules for inclusion, exclusion, attraction, repulsion, refractory period, excitatory period, and the like are applied to any of a range of document self-assembly features, including but not limited to swarm collective behavior driven by selected ranges of semantic signature(s), as well as ranges of document meta-data (authors, author contact information and/or proximal author locations, types of organizations, organization contact information, and/or proximal organization locations, ranges of document publication dates, types of publication channel, types of thematic topics, emergent meta-data based categories, including but not limited to document trustworthiness score(s), and similar and related content features of a document and/or other form and/or format of file. Considered pair-wise and/or in other comparative formats, these document-nodes self-assemble into swarming collectives to which the tools and analytical frameworks of swarm behavior are applied.

Swarms of document-node pairs, each pair itself formed from nested swarms of rare words collectively shared between any two documents, enable and drive the self-assembling knowledge network, mathematically formed as a "Swarm", or "Swarm Collective". This "Swarm", or "Swarm Collective" self-assembles into an (often high quality) assemblage of semantically interconnected documents, termed the "Outerdoc" or the "Omniverse". Unlike the Internet, which is formed through author- or publisher-created explicit and/or discrete links between the pages of web sites, the Outerdoc is self-assembled from inherent semantic similarities between documents, regardless of whether or not documents contain any links, and/or citations, and/or promotional connections, and/or other references to one another. In contrast, he Outerdoc self-assembly process enables rapid scaling of Outerdoc content, and minimizes the gamesmanship prevalent with search engine optimization strategies common on the World Wide Web. The Outerdoc is comprised of substantially greater documents and/or inter-document connectivity than the Internet.

Unlike the Internet, which enables any author to self-publish their own often relatively poor-quality content, including spam, commercial entrapments, and vanity web sites, the Outerdoc is primarily comprised of third-party published, often high-quality document, which is often selected for publication by professional editors, and/or often peer-reviewed (and optionally, anonymously peer reviewed) by experts In a particular knowledge domain, and/or often fact checked by independent fact checkers. This combination of selective factors performed as part of the publication process produces relatively higher quality content within the Outerdoc than for content within the Internet; Quality is defined in part by external, and/or amplified, and/or sustained external (that is, external to the content author) validation, as optionally measured by semantic graph density as described above.

Unlike the Internet, which is susceptible to "content bombing" by hyperproduction of content, apparently from different web sites, over relatively short periods of time, mimicking the effects of popular and/or validated document content, the Outerdoc requires relatively slower, and/or more systematic, and/or relatively more editorially balanced, and/or relatively more independently produced document content, and so Outerdoc content is inherently relatively more resistant to gamesmanship, and/or robotic and/or automated and/or semiautomated influence, and/or malicious production behavior, and/or censorship than the Internet. Thus, the Outerdoc contains relatively more authentic content than the Internet.

Unlike the Internet, where document quality is not always trustworthy, the platform automatically scores measures of relative trust, enabling presentation and/or differential selection of relatively more highly trustworthy content for the documents within the Outerdoc. Indeed, a subset of the Outerdoc is self-assembled from only document-nodes above a user- and/or system-selected trust threshold. Selecting only relatively higher trustworthy document-nodes enables self-assembly of a relatively more trustworthy knowledge network within the Outerdoc, a trustworthy "Sub-Outerdoc".

Unlike the Internet, where only 1% of (e.g., web-based) documents that should be connected (due to close semantic proximity) are indeed connected. In contrast, the Outerdoc enables and supports, at massive document scale, all or substantially all of the documents for which semantic similarities reside: The Outerdoc captures the inter-connection of all and/or substantially all and/or substantially most of the potential pair-wise and/or other related comparisons between documents.

As a result of all these and similar and related factors, document content on the Outerdoc is relatively more accessible for robust information retrieval strategies, as operationalized in part by knowledge discovery systems. Complimentary to the Outerdoc, a similar formed yet more private and often confidential document network, optionally termed the "Interdoc," is formed from the internal documents within a company or any of a combination of departments, divisions, business units, and/or other similar and/or related organizational structures within a company, government, military, non-profit, educational, and/or other similar or related organizational entity.

A single document and/or multi-document query is able to be performed using the system described above, wherein a trustworthiness score is generated in real time or near real-time, based on the (optionally weighted) semantic graph density of the knowledge graph that self-assembles around the query document(s).

By way of non-limiting example, the results of a single and/or multi-document query are in the form of a numerical trust score, optionally normalized in relative scale. This form of document query input, trustworthiness score output is termed "Trust as a Service", or "TaaS". The high potential concurrency and relative rapidity of TaaS satisfies end-user requirements for rapid responsiveness.

By way of non-limiting example, TaaS is accessed through an Application Programming Interface (API) call, and/or displayed in real time and/or near real time in a stand-alone user interface, and/or displayed through a visual, sonic, or haptic perceptual cue as perceived by an end user of the system. Furthermore, by way of non-limiting examples, any of wide range of potential documents serve to query the system, including but not limited to news articles, scientific journal articles, medical journal articles, clinical trial documents, legal case filings, financial regulatory filings, text transcripts from audio and/or visual streams, transcriptions of conference, transcriptions of audio and/or video calls, books, book chapters, book pages, social media posts, blog posts, web sites, and similar and related content, as well collections of documents assembled from any combination of the above. Documents originate from any machine-readable human language, and/or any machine-readable computer language, and/or any numerical data, in any combination.

Central to reliable consumption by end users, determination of the veracity of particular content is frequently hampered by manual review of individual documents and human mediated fact-checking, a process that does not scale well to the volume and/or depth of content being produced on a daily basis. The TaaS framework as described above cannot efficiently operate on a human-intermediated, fact-checking, or other volume and/or content depth limited investigative and/or discovery process. Support of trustworthiness content requires an automated system to determine probable trustworthiness without requiring direct human inspection of particular content, and without manual fact-checking of such content. TaaS is used to automatically determine content credibility in a manner that scales to large document volume and/or substantial document content. TaaS automates determination of probable content veracity as described above, wherein such content optionally includes but not limited to any of the following document types: news articles, scientific journal articles, medical journal articles, clinical trial documents, legal case filings, financial regulatory filings, text transcripts from audio and/or visual streams, transcriptions of conference, transcriptions of audio and/or video calls, books, book chapters, book pages, social media posts, blog posts, web sites, and similar and related content, as well collections of documents assembled from any combination of the above. Documents originate from any machine-readable human language, and/or any machine-readable computer language, and/or any numerical data, in any combination.

TaaS-based content scoring is used to determine the probabilistic veracity of any of several document features, including but not limited to: (i) individual semantic signatures within document content, (ii) the authors of document content, (iii) the organizations producing document content, (iv) the publications publishing and/or distributing document content, (v) the national, regional, and/or municipal governments producing document content, (vi) the topics and/or categories describing particular content, and/or any combination of the above, singly or in combination. TaaS-based determination of content scoring at a level of analyses greater than that of a single document is performed by collecting and/or otherwise comparing similar and/or related sets of content, including but not limited to averaging TaaS scores over time, with or without weighting of particular features or combinations of features. TaaS scoring is performed in real time or near real time to satisfy the potential high concurrency and relatively rapid response times sufficient for substantial user satisfaction.

Automated real time or near real time scoring of probable trustworthiness of particular content, authors of such content, organizations employing such authors, publication outlets producing and/or distributing such content results in scoring for a particular point in time, place, topic, author, organization, journalistic source, journalistic beat, editor, funder, and/or similar and/or related metadata features. Furthermore, time varying data is collected, analyzed, and displayed for the end user in the form of time-based averages, moving averages with or without smoothing over system- or user-selected time-based smoothing windows, velocities, accelerations, and/or other time-based second and third-derivatives of time-based data. Trends in time-variant data are assessed automatically using Fast Fourier Transforms (FFT) and/or related assessment tools for time-variant data. Scores are determined on absolute or relative scales. If relative scales are used, scoring are normalized (e.g., from a score of 0 to 100, or a score from 200 to 800, or a score from 0 to 1) depending in part on user needs.

Further analyses are determined in series and/or in parallel with the TaaS framework described above, including but not limited to: (i) the relative percentage of either or both positively and/or negatively emotionally charged words, (ii) the relative speed over which a theme travels from one document to another (false content tends to "travel" with a semantic provenance substantially faster than relatively more accurate document content), (iii) an automated topic expertise score determined by comparing document TaaS scores to the semantic signatures of the content being scored, (iv) presence and/or absence of named vs. un-named sources, (v) past history of similar content (as measured by similar semantic signatures) for that author, organization, or publisher, (vi) history of redaction and/or other corrections or post-publication editing for that author, organization, or publisher, (vii) the business history for that that author, organization, or publisher, including but not limited to the age of a domain for a web site or set of web sites associated with the publication of that content, and/or similar and/or related content, singly or in any combination, weighted or non-weighted by any set of weighting factors.

TaaS-based scoring system outputs include but are not limited to: (i) individual article credibility, and/or (ii) credibility for a set of documents, posts, and/or other articles, and/or (iii) organization credibility, and/or (iv) publisher credibility, and/or (v) editor credibility, and/or (vi) organization funder credibility, and/or similar and/or related content features. Publishers' credibility scores are influenced and calculated as averages of one or more writer's credibility scores. Social media posts are assessed for veracity either singly or in combination aggregate together if aggregation is carried out for semantically related content.

Social media tools and platforms often have the ability to interconnect and/or otherwise share a large number of news items in a relatively short time window, during which time some users might not take the time to research and verify each post. These sites often rely on meta-data for such content, including but not limited to post shares, and/or post likes, and/or post dislikes, and/or user followers. These forms of meta-data labeling serve as means to support such content, and/or to spread misinformation and/or disinformation through a social network publishing posts with such content. Attributes of social media measurement, including but not limited to post likes, dislikes, and/or shares, serve as additional forms of metadata features to further assess content trustworthiness and/or the veracity of content within documents.

Figure 24:
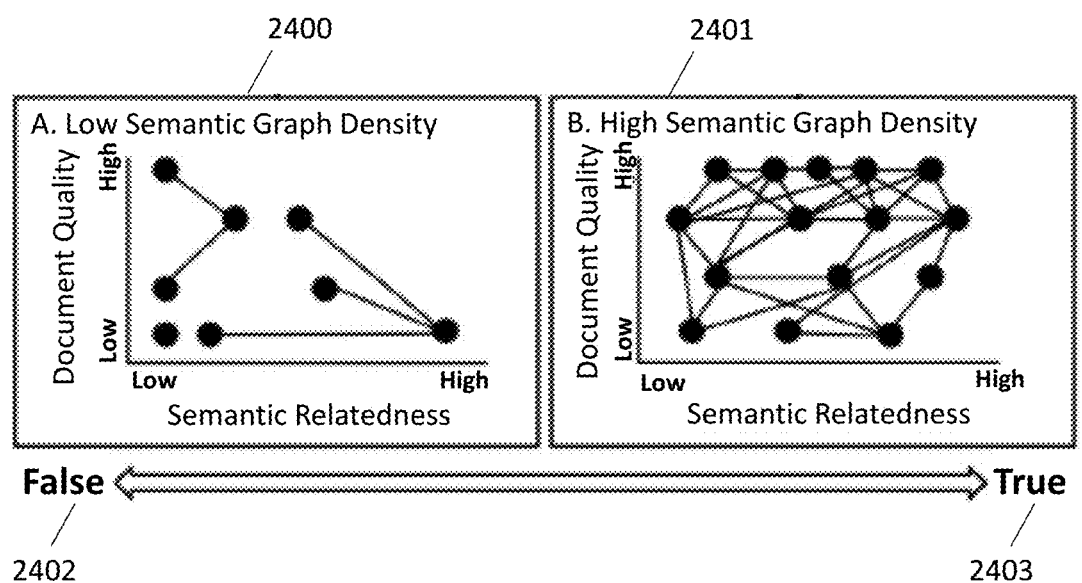
FIG. 24 illustrates a trustworthiness comparison of an exemplary graph having low semantic graph density versus an exemplary graph having high semantic graph density according to one embodiment of the present invention.

FIG. 24 illustrates a trustworthiness comparison of an exemplary graph having low semantic graph density versus an exemplary graph having high semantic graph density according to one embodiment of the present invention. The density of interconnected content within a self-assembled semantic graph (defined as the ratio of the number of edges in the graph relative to the maximum possible number of edges) provides a consensus score for the graph. Where node interconnection is greater for a large number of nodes, that indicates agreement between a number of disparate sources, indicating that sources within that network are more trustworthy. In one embodiment, the platform is able to receive a selection to include or not include one or more different types of sources (e.g., news sources, journal sources, patents, etc.) or specific sources (e.g., WIKIPEDIA, FACEBOOK posts, GOOGLE PATENTS, etc.). Editing which documents are able to be used is useful for tuning the credibility score to ensure that the resulting network is as credible as possible. In one embodiment, in order to determine the credibility score, different weighting is applied to different sources based on inherent source validity (e.g., based on rigor of editorial process, existence of inherent bias, etc.). In one embodiment, the platform receives a selection to change the credibility weighting of one or more sources by the user device.

The left panel 2400 of FIG. 24 depicts a network of nodes having low semantic graph density, indicating a relatively low trustworthiness, or credibility 2402. The right panel 2401 of FIG. 24 depicts a network of nodes having high semantic graph density, indicating a relatively high trustworthiness, or credibility 2403. In one embodiment, the semantic graph density is assigned on a per-node basis. This means that the semantic graph density changes from one document-node to another, even within the same knowledge graph. This difference in semantic graph density arises both (i) from potential differences in a document's semantic signature (2) and (ii) from differing boundary conditions, as graph density is calculated from a combination of first, and/or second, and/or third degree (and/or more) document-node neighbors within a graph, and different document-nodes within a knowledge graph typically have different first, second, and third degree neighbors. Further, the semantic signature(s) in document nodes often differ even if the nodes closely neighbor one another within the same semantic knowledge graph.

Once calculated for each node within a knowledge graph, the semantic graph density scores across such nodes reveal a network of trust within the graph. By articulating the pattern of interconnectedness of highly trust scoring nodes, a "trust network" is systematically defined. Both the semantic graph structure and the trust network within that graph structure vary as a function of any of several parameters, including, but not limited to, document publication date, document publication location (digital or physical address), document source type, language in which the document was originally published, author influence, institutional influence, and/or other parameters.

Figure 25:
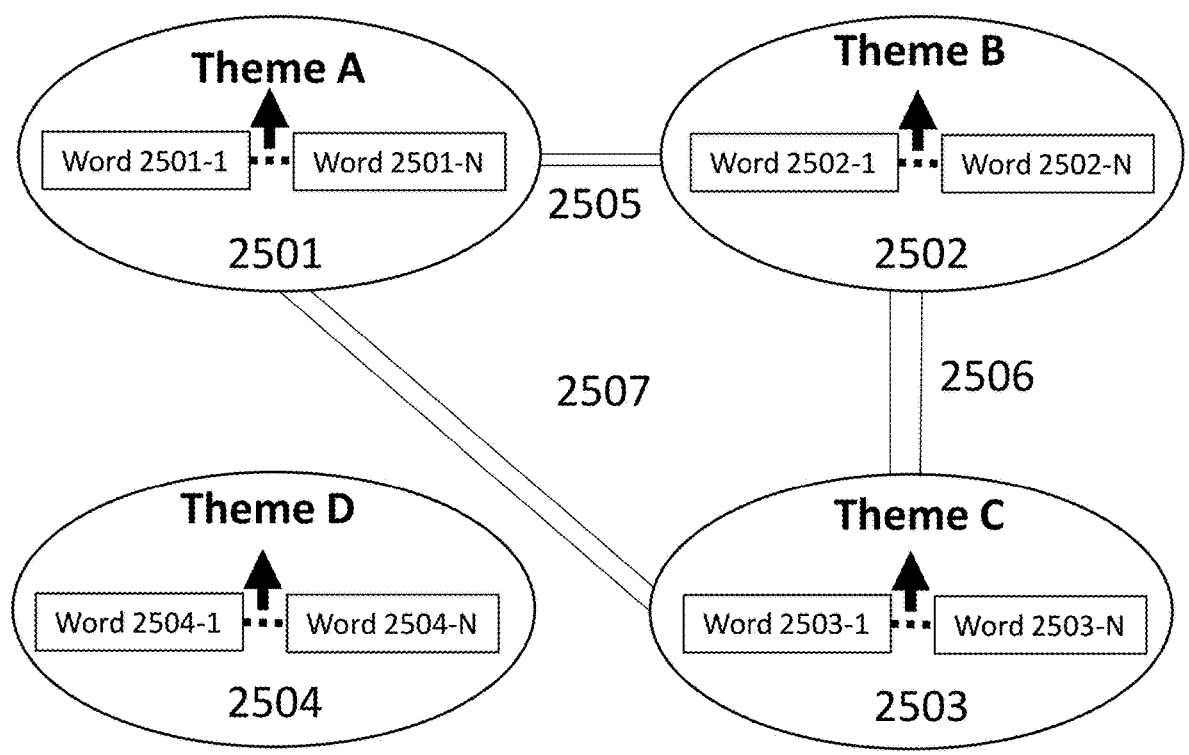
FIG. 25 is a schematic diagram of a self-assembled thematic swarm network according to one embodiment of the present invention.

FIG. 25 is a schematic diagram of a self-assembled thematic swarm network according to one embodiment of the present invention. Collections of co-occurring rare words in a document self-assemble into themes, and when two or more documents containing similar themes (also known as "semantic signatures") are independently published by relatively credible sources, those documents self-assemble into thematic swarm networks (depicted by double-lines). By way of nonlimiting example, a first document-node 2501 contains a set of relatively rare words comprised of relatively rare word 2501-1 through relatively rare word 2501-N, constituting Theme A. Similarly, a second document-node 2502 contains a set of relatively rare words comprised of relatively rare word 2502-1 through relatively rare word 2502-N, constituting Theme B, while a third document-node 2503 contains a set of relatively rare words comprised of relatively rare word 2503-1 through relatively rare word 2503-N, constituting Theme C. In this non-limiting example, the first document-node 2501, the second document-node 2502, and the third document-node 2503 are sufficiently semantically similar with overlapping semantic signatures that they cluster into a self-assembling community, also termed a "swarm." For example, a first overlapping semantic signature 2505 is identified between the first document node 2501 and the second document node 2502. A second overlapping semantic signature 2506 is identified between the second document node 2502 and the third document node 2503. A third overlapping semantic signature 2607 is identified between the first document node 2501 and the third document node 2503. In contrast, a fourth document-node 2504 contains a set of relatively rare words comprised of relatively rare word 2504-1 through relatively rare word 2504-N, constituting Theme D. In this non-limiting example, the fourth document node 2504 is not sufficiently similar to cluster into the self-assembling community comprised of the first document node 2501, the second document node 2502, and the third document node 2503. Semantic similarities are determined by any of several means, including but not limited to (i) a platform and/or user-assigned semantic threshold (analogous to a high pass and/or band pass filter); and/or (ii) a platform and/or user-assigned meta-data threshold (analogous to a high pass and/or band pass filter). Meta-data analyzed for determining similarity compared to the meta-data threshold includes author, organization, location, publication date, and similar and/or other related meta-data.

Figure 26:
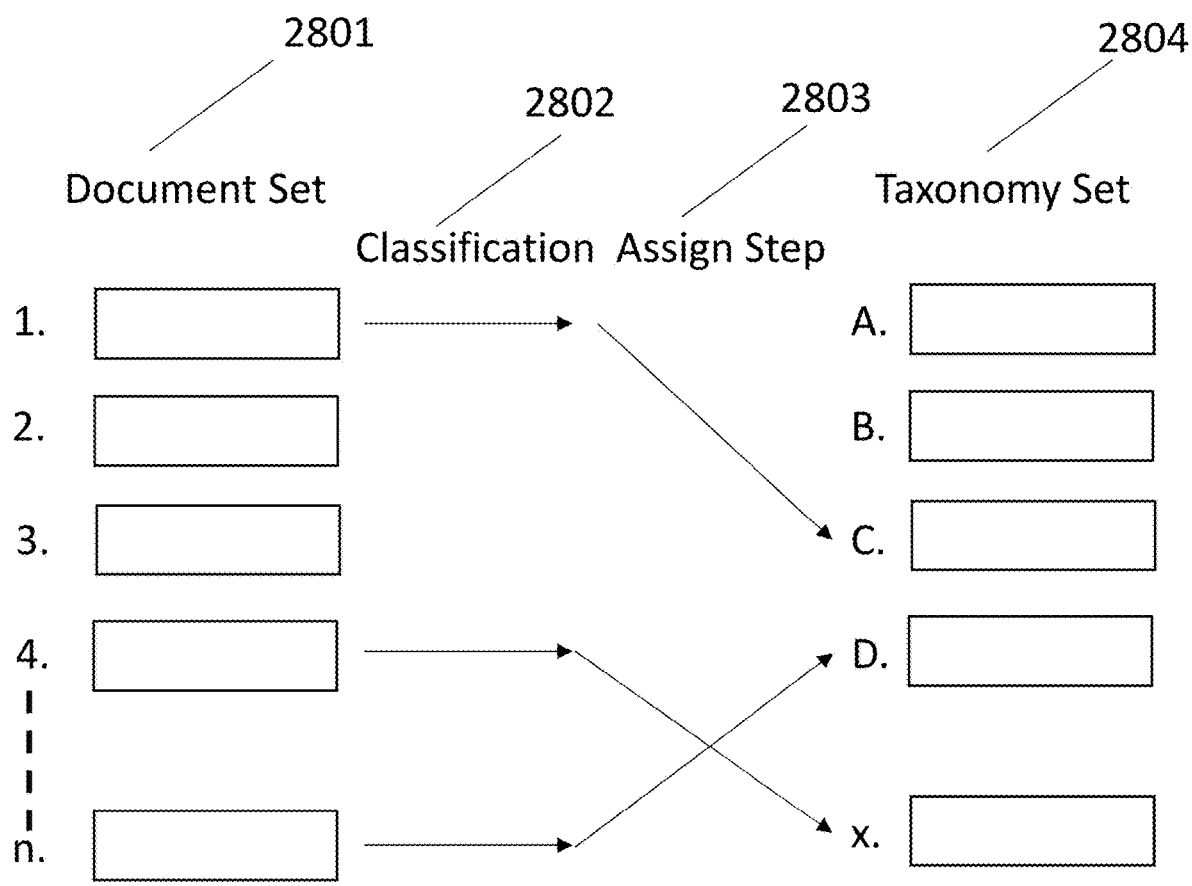
FIG. 26 illustrates a flow diagram of a search method according to one embodiment of the present invention.

FIG. 26 illustrates a flow diagram of a search method according to one embodiment of the present invention. In one embodiment, the platform receives and/or retrieves a document set 101. The document set 101 is automatically classified 102 and each document is assigned 103 to a taxonomy set 104. Classification 102 is able to proceed via a number of different processes. In one embodiment, one or more "anchor taxonomies" is used to provide context with which to automatically classify each document and provides one or more labels to be applied to each document. One non-limiting example of a taxonomic anchor is WIKIPEDIA, where each taxonomic level and category within WIKIPEDIA is assigned a semantic signature of the article(s) defining that level. Therefore, during classification 102, a semantic signature of one or more input documents in the document set 101 is matched to a closest entry in the taxonomic hierarchy of the taxonomic anchor. In one embodiment, the name of the matched taxonomy is then used to tag the one or more input documents. Using one or more taxonomic anchors as sources for classifying documents is a useful initial step, as it provides automatic tags and keywords for the document, while still allowing the document to be compared with other documents through semantic signature matching, not relying entirely on comparing keywords, but retaining the advantages of keywords.

Figure 27:
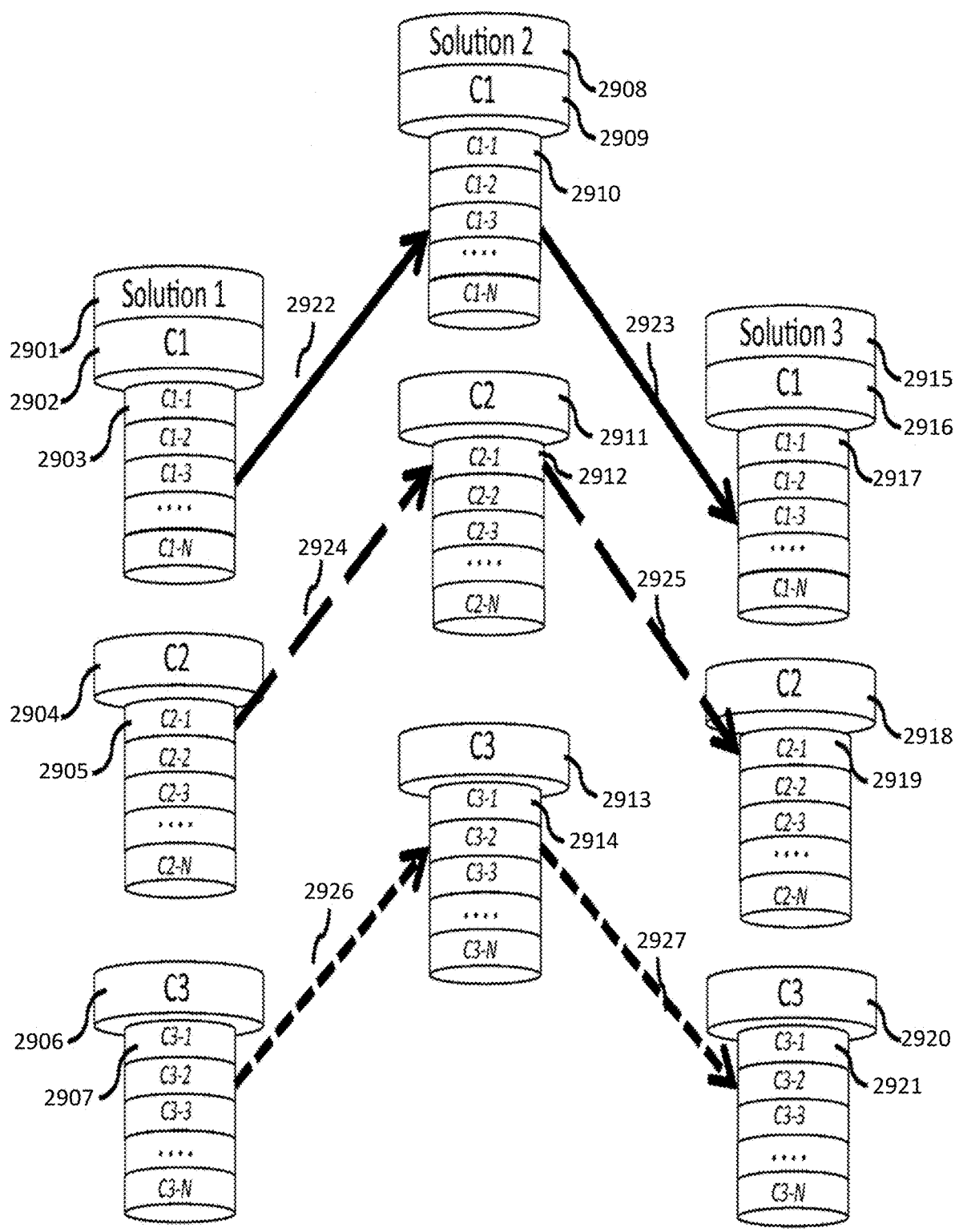
FIG. 27 illustrates a schematic diagram for a system for parsing the deep structure of a solution space according to one embodiment of the present invention.

FIG. 27 is a schematic diagram showing ontological dimensions constituting a solution-entity according to one embodiment of the present invention. FIG. 27 provides an alternative conceptualization of solution-entities relative to FIG. 1. Solution-entities (e.g., documents describing solutions and/or technologies) comprise ontological dimensions that are able to be separated from one another. Each Solution-entity 2901, 2908, 2915 has a capability (C1) dimension 2902, 2909, 2916, a characteristic (C2) dimension 2904, 2911, 2918, and a composition (C3) dimension 2906, 2913, 2920. In one embodiment, the C1 dimension describes the specific functional ability of a solution-entity 2901, 2908, 2915. In one embodiment, the C2 dimension describes the relative strengths or weaknesses of the solution, absolute data relating to aspects of the solution such as size, and/or specific characteristics relating to the performance of its function. In one embodiment, the C3 dimension describes the elemental matter, constituent elements, or processes that comprise a solution. One of ordinary skill in the art will understand that the C1, C2, and C3 dimensions described herein are only meant to be illustrative of ontological dimensions for solution-entities and are not intended to provide an exhaustive list or a maximum number of ontological dimensions that a solution-entity is able to have.

Each solution-entity 2901, 2908, 2915 is not limited to having a single descriptor under each ontological dimension. Instead, the platform assigns each solution entity 2901, 2908, 2915 one or more descriptors 2903, 2912, 2917 under the C1 dimension 2902, 2909, 2916, one or more descriptors 2905, 2914, 2919 under the C2 dimension 2904, 2911, 2918, and/or one or more descriptors 2907, 2914, 2921 under the C3 dimension 2906, 2913, 2920. One of ordinary skill in the art will understand that the number of descriptors under each dimension are not required to be the same, and that the number of descriptors under a specific dimension is not necessarily the same for each solution-entity. In one embodiment, the descriptors are selected from a finite, pre-established descriptor space based on a collection of rare words and/or a statistical distribution of rare words associated with the solution-entity. In one embodiment, each solution-entity is assigned one or more descriptor in each dimension. In another embodiment, each solution-entity is assigned a score for each descriptor in a finite, pre-established list of descriptors, wherein each score reflects how closely each descriptor matches the document.

FIG. 28 illustrates a solution matrix according to one embodiment of the present invention. The relative value of each descriptor for a solution-entity is able to be assessed using the matrix-based analytical framework shown in FIG. 28. The solution matrix shown in FIG. 28 is utilized after the platform receives a selection of an unmet need and is used in order to generate one or more solution entities corresponding to the unmet need. In one embodiment, Based on the unmet need, a set of partial solutions is mapped and assessed in terms of the value of each partial solution relative to one another and/or to values associated with the unmet need. In one embodiment, the solution matrix assigns a binary value (i.e., 0 or 1) to each descriptor that perfectly reflects each solution-entity, and/or each descriptor whose score matches a required score for an unmet need (or an input document). However, the likelihood that a descriptor will perfectly reflect a solution-entity or exactly match a required score for an unmet need is low. Therefore, in one embodiment, the solution matrix includes at least one tolerance value, wherein the tolerance value provides for a permitted difference (e.g., an absolute value difference, a percentage difference, etc.) between the descriptor score for the solution-entity and the required score for the unmet need (or an input document). One of ordinary skill in the art will understand the solution matrix assigns positive scores (i.e., binary values of 1) to solution-entities that have a matching descriptor to the unmet need, but also to solution-entities that do not have a descriptor where the unmet need similarly does not have the same descriptor.

In one embodiment, once all binary descriptor values have been assigned to each solution-entity, the binary descriptor values are summed to generate a simple total. In one embodiment, the platform automatically returns solution-entities having the greatest simple totals (e.g., the 10 highest simple total solution-entities). In another embodiment, the platform automatically returns only solution-entities having simple totals greater than a preset threshold value. In one embodiment, the platform is operable to assign separate subtotals for each dimension for each solution-entity. In one embodiment, the platform returns those documents having the greatest subtotal for a preselected dimension (e.g., the 10 highest C1 subtotals). In another embodiment, the platform returns only solution-entities having subtotals for a preselected dimension greater than a preset threshold value.

In another embodiment, the binary value assigned for each descriptor for each solution-entity is multiplied by a weighting factor. The weighting factor reflects the fact that not all facets of an invention are necessarily equally important, so being similar with regard to one or two descriptors is potentially not weighted as highly as being dissimilar with regard to one or two other, more important descriptors.

In one embodiment, the solutions matrix does not treat solution-entities individually, but as partial solutions. Therefore, in one embodiment, the solution matrix sums the value for each partial solution for each descriptor to produce a descriptor subtotal (e.g., Sum-C1-1, Sum-C1-2, etc.) and then sums each descriptor within a dimension to produce dimensional subtotal (e.g., Sum-C1). In one embodiment, the dimensional subtotal for each partial solution is generated (e.g., Sum-PS1, Sum-PS2, etc.). In one embodiment, the dimensional subtotal for each partial solution is summed to generate a partial solution subtotal for each partial solution (e.g., Sum-PS1, etc.). In each instance, weightings are able to be applied for each partial solution and/or for each descriptor.

In one embodiment, weightings for each descriptor and/or for each partial solution are received by the platform from at least one user device. In another embodiment, weightings for each descriptor and/or for each partial solution are automatically generated via at least one subject matter expert, crowd wisdom, and/or collective intelligence collected through social voting mechanisms and/or Monte Carlo simulations and/or other statistically-based processes.

In one embodiment, based on the platform receiving a selection of one or more search results, the weightings of the solution matrix are automatically updated, allowing the platform to determine which descriptors and which ontological dimensions provide the most predictive value for the individual user, if not in general. This allows the platform to more completely and meaningfully probe the deeper structure of the potential solution space and calibrate the solution profile. In one embodiment, based on user activity on a preset amount of time and/or through a preset number of searches, the platform automatically determines an innovation threshold. The innovation threshold sets the minimum weighted score for each solution-entity and/or each combination of solution-entity in order for the solution-entity to appear in a search.

Figure 29:
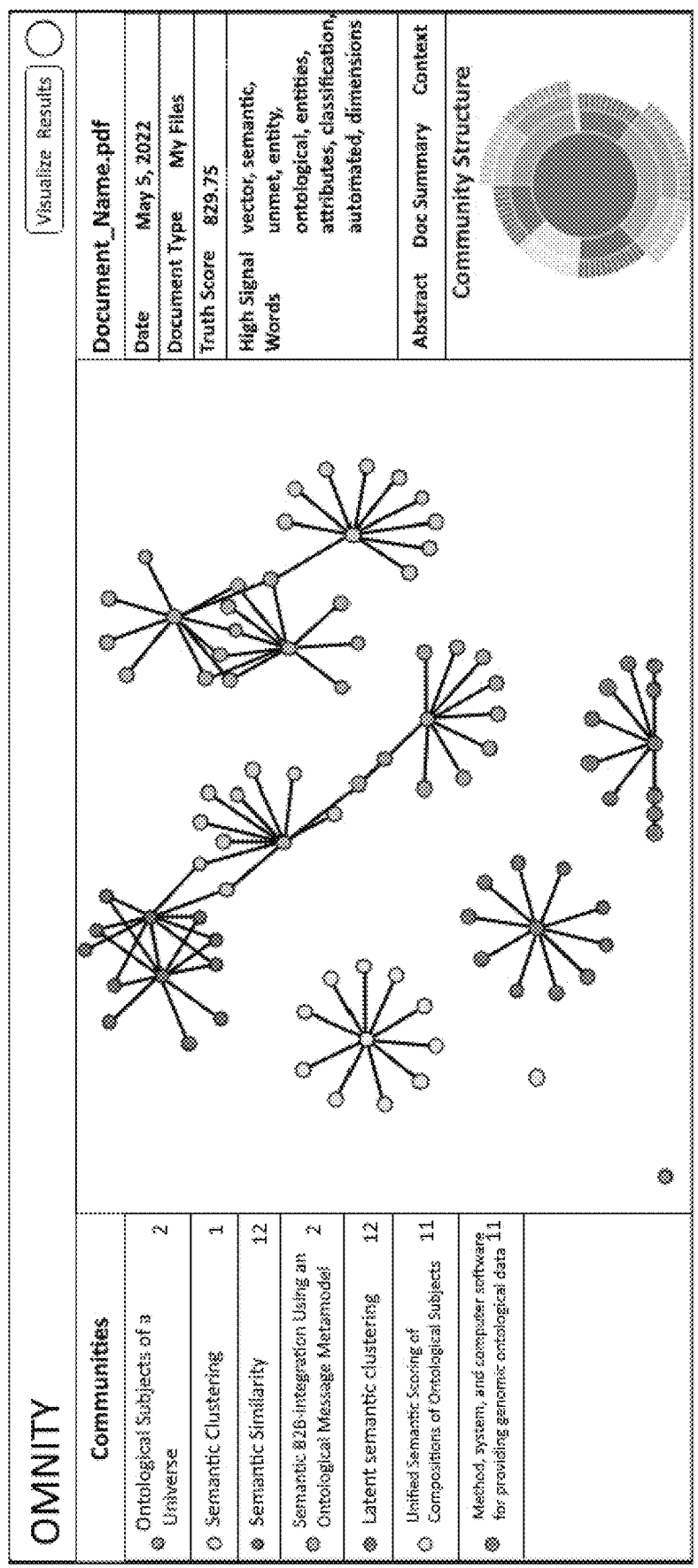
FIG. 29 illustrates a communities organization GUI according to one embodiment of the present invention.

FIG. 29 illustrates a communities organization GUI according to one embodiment of the present invention. In one embodiment, the platform generates and displays a canvas of nodes and edges, wherein the nodes are represented by shapes (e.g., circles) and the edges are represented by lines connecting the shapes. In one embodiment, the nodes are generated based on at least one seed document (received by the platform from a user device), which is analyzed relative to a database of documents on the platform and/or web crawler search results. FIG. 29 shows an organization of the nodes by community, wherein names of the communities are automatically identified based on names of documents within the community, rare words common to the community, and/or other factors. In one embodiment, names of the communities are listed in a menu on the communities organization GI along with a number of documents in each community. In one embodiment, nodes representing documents in the same community are colored the same, allowing for an easy visual representation for which nodes are part of the same community and which are not.

In one embodiment, the communities organization GUI includes a list of "high signal words," indicating rare words common to the documents represented in the graph. In one embodiment, when the platform receives click selection of one or more of the high-signal words, documents containing the selected high-signal words (or containing a statistical higher number of the selected high signal words) are indicated. In one embodiment, indication includes darkening the color of the indicated nodes and/or fading the non-indicated nodes. In another embodiment, indication includes displaying pulsating rings surrounding documents containing the selected high-signal words. In one embodiment, the GUI includes information automatically parsed by the platform including a document name, a date the document was written, published, and/or issued (in the case of a patent), a truth score for the semantic graph, and/or a chart showing an alternate organization of the network as, for example, a sunburst chart, capable of showing nested communities for the documents. In one embodiment, the platform automatically parses an abstract and/or a summary from the document. In one embodiment, the platform automatically generates a context for the document by cutting down the document to show only paragraphs and/or sections of the document with the highest concentration of rare words.

In one embodiment, the GUI includes at least one slider, wherein the slider represents a number of maximum pages for the contextual summary. In one embodiment, if the slider is adjusted, for example, to 20 pages, then the platform automatically identifies a cut-off threshold for density of rare words in order to allow the document to fit into approximately 20 pages. However, if the slider is adjusted to 10 pages, then the cut-off threshold will necessarily increase. In one embodiment, the contextual summary is not only generated by density of rare words, but also on identifying which passages (e.g., paragraphs) of the text have the highest credibility score when taken alone or in combination. In one embodiment, identified rare words and/or rare phrases in the contextual summary are automatically highlighted.

Figure 30:
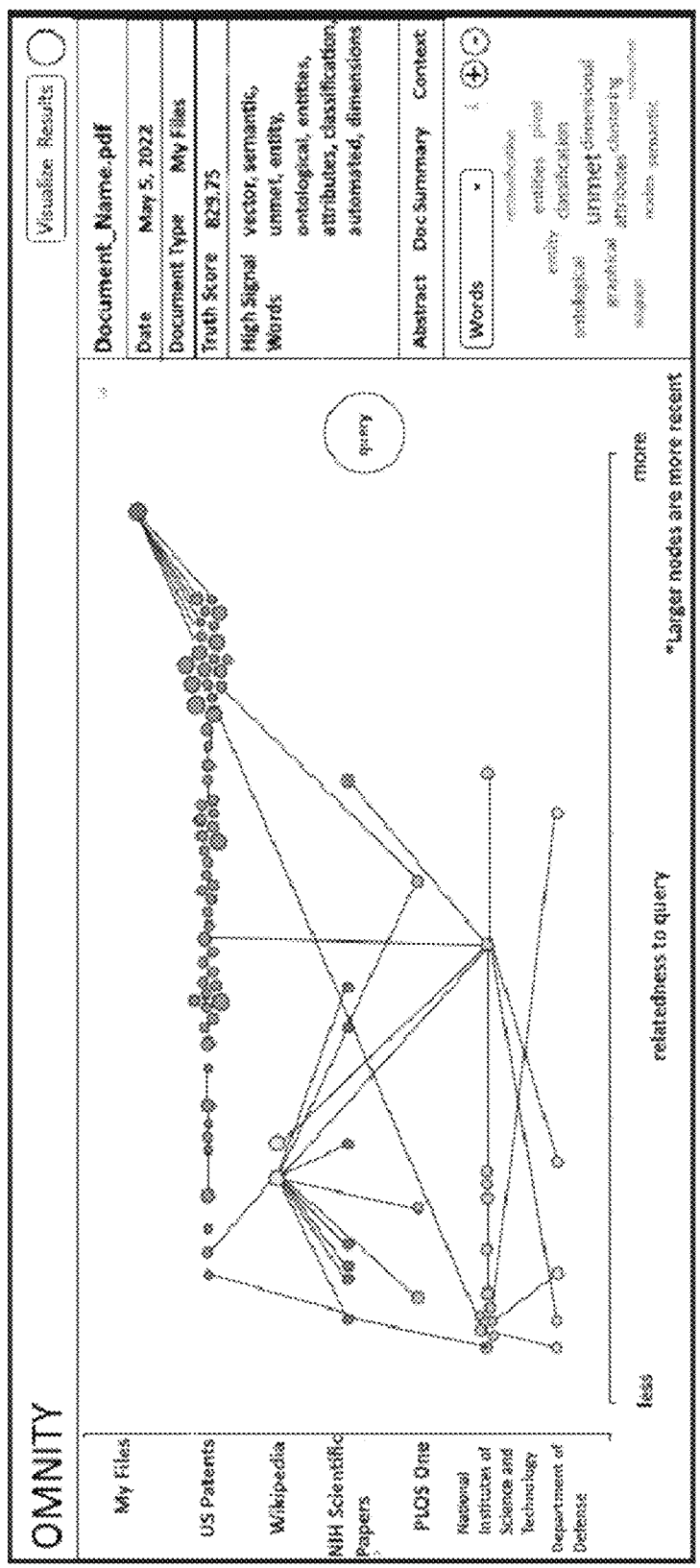
FIG. 30 illustrates a document type visualization GUI according to one embodiment of the present invention.

FIG. 30 illustrates a document type visualization GUI according to one embodiment of the present invention. In one embodiment, the platform receives a selection to display the network of nodes and edges organized by document type. In one embodiment, the organization by document type does not change the nodes themselves or how the nodes are connected according to semantic meaning, but instead changes the topology of the graph, such that nodes are placed at discrete levels corresponding to different document types (e.g., US patents, US patent applications, WIKIPEDIA articles, National Institutes of Health (NIH) scientific papers, PLOS One articles, National Institutes of Science and Technology articles, Department of Defense documents, etc.). This separate visualization helps a user to determine the range of different types of documents that appear to be related to the subject and whether it is worth specifically looking at one type of document or filtering out one type of document.

In one embodiment, the GUI displays a word cloud of rare words associated with the document represented by the nodes in the network. In one embodiment, words that are rarer (relative to a larger corpus, i.e., less used in the English language) and/or words that appear more frequently in the documents on the network appear larger. In one embodiment, the platform receives click selection of one or more words in the word cloud. In one embodiment, when the platform receives click selection of one or more of the words in the word-cloud, documents containing the selected words (or containing a statistical higher number of the selected high signal words) are indicated. In one embodiment, indication includes darkening the color of the indicated nodes and/or fading the non-indicated nodes. In another embodiment, indication includes displaying pulsating rings surrounding documents containing the selected words from the word cloud.

Figure 31:
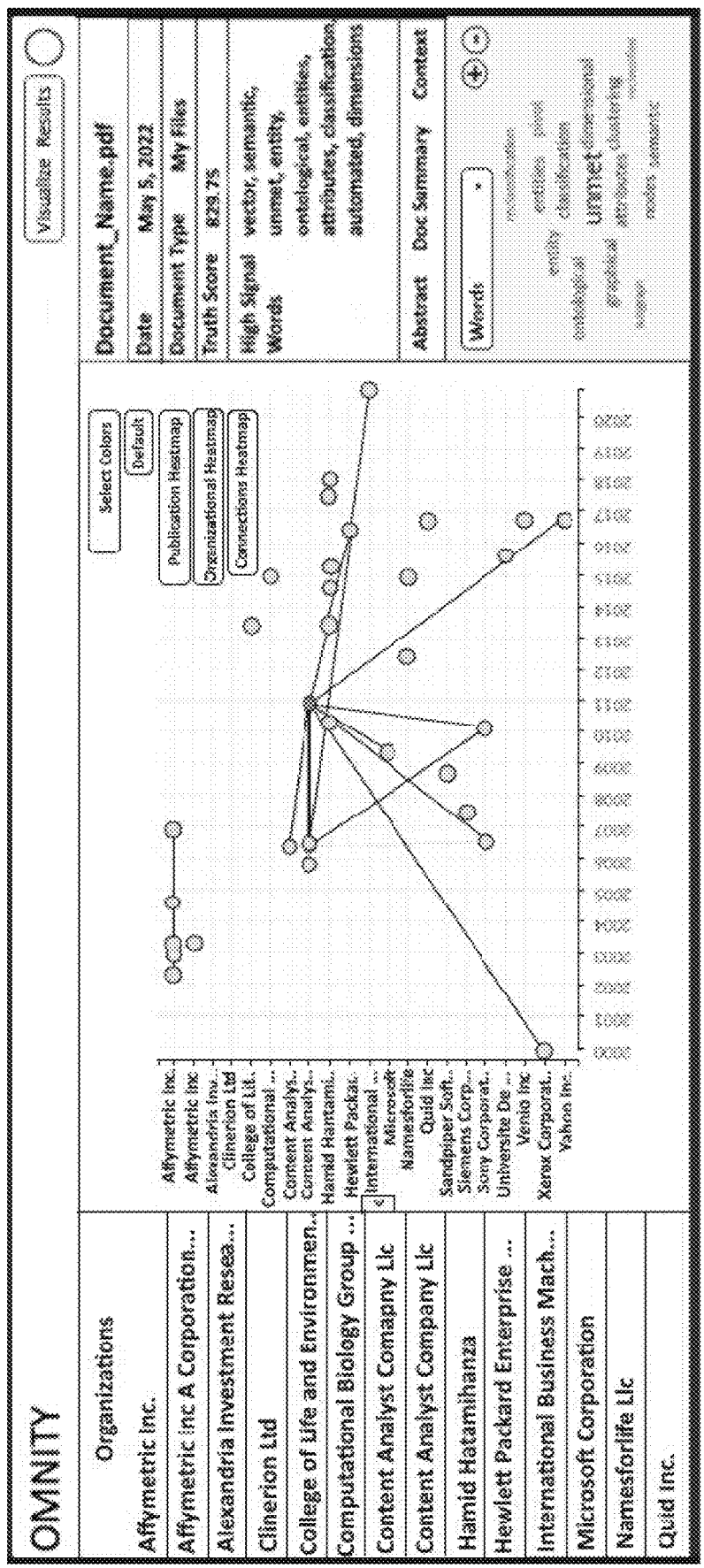
FIG. 31 illustrates an organizations visualization GUI according to one embodiment of the present invention.

FIG. 31 illustrates an organizations visualization GUI according to one embodiment of the present invention. In one embodiment, the platform automatically determines at least one individual and/or at least one company associated with each document (e.g., the company associated with a press release, a company/university sponsoring research, an assignee of a patent or patent application, etc.). The platform receives a selection to display the network of documents by company. In one embodiment, the platform automatically displays nodes at discrete levels on a vertical axis, where each vertical level corresponds to a company and/or an individual. In one embodiment, the platform automatically displays nodes at discrete levels on a horizontal axis, where each horizontal level corresponds to a discrete time period (e.g., a month, a year, a decade, etc.).

In one embodiment, double click selection (or any other method of selection) of at least one node in the semantic graph causes a new semantic graph to automatically be generated, focusing on the at least one selected node as the seed document(s).

In one embodiment, rather than changing the entire structure of the graphical network to identify particular authors, companies, or other features of each node, the platform includes a drop down list of authors, organizations, publication dates, categories of documents, and/or types of documents. When the platform receives click selection of a particular author, organization, date, category, and/or type, the platform automatically indicates those nodes corresponding to the selected criteria on the semantic graph already being displayed. In one embodiment, indication includes darkening the color of the indicated nodes and/or fading the non-indicated nodes. In another embodiment, indication includes displaying pulsating rings surrounding documents corresponding to the selected criteria.

Document assignment is based in part on the statistical distribution of relatively rare words in each document. By way of non-limiting example, a vector space model or term vector model can be used to represent individual documents, in which an algebraic model is employed to form text documents as vectors of identifiers, including but not limited to words (Barkan, 2015, whose contents are fully incorporated by reference into this application for all purposes; Barkan and Koenigstein, 2016, whose contents are fully incorporated by reference into this application for all purposes; Mikolov et al, 2013, whose contents are fully incorporated by reference into this application for all purposes).

Figure 32:
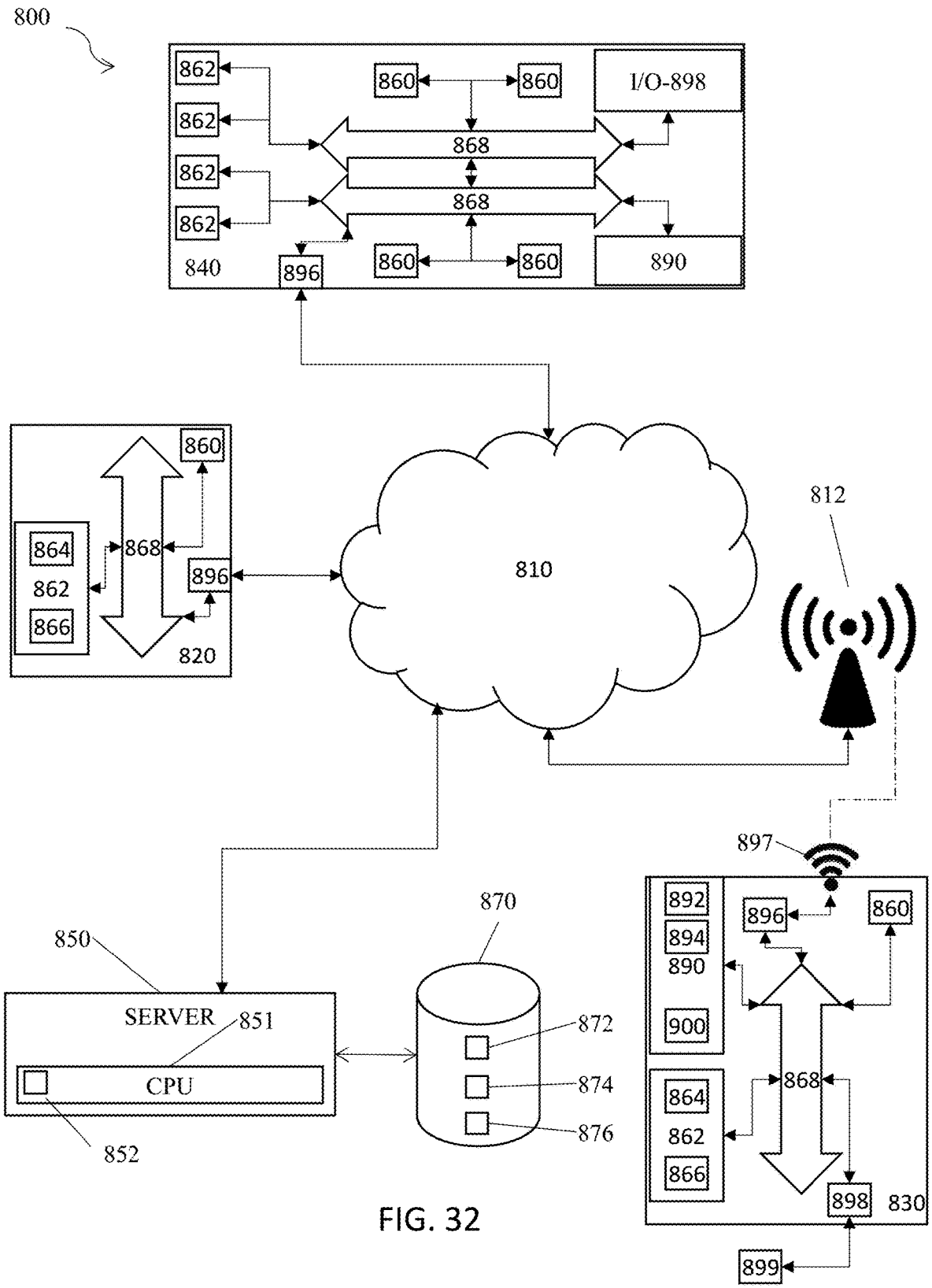
FIG. 32 is a schematic diagram of a system of the present invention.

FIG. 32 is a schematic diagram of an embodiment of the invention illustrating a computer system, generally described as 800, having a network 810, a plurality of computing devices 820, 830, 840, a server 850, and a database 870.

The server 850 is constructed, configured, and coupled to enable communication over a network 810 with a plurality of computing devices 820, 830, 840. The server 850 includes a processing unit 851 with an operating system 852. The operating system 852 enables the server 850 to communicate through network 810 with the remote, distributed user devices. Database 870 is operable to house an operating system 872, memory 874, and programs 876.

In one embodiment of the invention, the system 800 includes a network 810 for distributed communication via a wireless communication antenna 812 and processing by at least one mobile communication computing device 830. Alternatively, wireless and wired communication and connectivity between devices and components described herein include wireless network communication such as WI-FI, WORLDWIDE INTEROPERABILITY FOR MICROWAVE ACCESS (WIMAX), Radio Frequency (RF) communication including RF identification (RFID), NEAR FIELD COMMUNICATION (NFC), BLUETOOTH including BLUETOOTH LOW ENERGY (BLE), ZIGBEE, Infrared (IR) communication, cellular communication, satellite communication, Universal Serial Bus (USB), Ethernet communications, communication via fiber-optic cables, coaxial cables, twisted pair cables, and/or any other type of wireless or wired communication. In another embodiment of the invention, the system 800 is a virtualized computing system capable of executing any or all aspects of software and/or application components presented herein on the computing devices 820, 830, 840. In certain aspects, the computer system 800 is operable to be implemented using hardware or a combination of software and hardware, either in a dedicated computing device, or integrated into another entity, or distributed across multiple entities or computing devices.

By way of example, and not limitation, the computing devices 820, 830, 840 are intended to represent various forms of electronic devices including at least a processor and a memory, such as a server, blade server, mainframe, mobile phone, personal digital assistant (PDA), smartphone, desktop computer, netbook computer, tablet computer, workstation, laptop, and other similar computing devices. The components shown here, their connections and relationships, and their functions, are meant to be exemplary only, and are not meant to limit implementations of the invention described and/or claimed in the present application.

In one embodiment, the computing device 820 includes components such as a processor 860, a system memory 862 having a random access memory (RAM) 864 and a read-only memory (ROM) 866, and a system bus 868 that couples the memory 862 to the processor 860. In another embodiment, the computing device 830 is operable to additionally include components such as a storage device 890 for storing the operating system 892 and one or more application programs 894, a network interface unit 896, and/or an input/output controller 898. Each of the components is operable to be coupled to each other through at least one bus 868. The input/output controller 898 is operable to receive and process input from, or provide output to, a number of other devices 899, including, but not limited to, alphanumeric input devices, mice, electronic styluses, display units, touch screens, signal generation devices (e.g., speakers), or printers.

By way of example, and not limitation, the processor 860 is operable to be a general-purpose microprocessor (e.g., a central processing unit (CPU)), a graphics processing unit (GPU), a microcontroller, a Digital Signal Processor (DSP), an Application Specific Integrated Circuit (ASIC), a Field Programmable Gate Array (FPGA), a Programmable Logic Device (PLD), a controller, a state machine, gated or transistor logic, discrete hardware components, or any other suitable entity or combinations thereof that perform calculations, process instructions for execution, and/or other manipulations of information.

In another implementation, shown as 840 in FIG. 32, multiple processors 860 and/or multiple buses 868 are operable to be used, as appropriate, along with multiple memories 862 of multiple types (e.g., a combination of a DSP and a microprocessor, a plurality of microprocessors, one or more microprocessors in conjunction with a DSP core).

Also, multiple computing devices are operable to be connected, with each device providing portions of the necessary operations (e.g., a server bank, a group of blade servers, or a multi-processor system). Alternatively, some steps or methods are operable to be performed by circuitry that is specific to a given function.

According to various embodiments, the computer system 800 is operable to operate in a networked environment using logical connections to local and/or remote computing devices 820, 830, 840 through a network 810. A computing device 830 is operable to connect to a network 810 through a network interface unit 896 connected to a bus 868. Computing devices are operable to communicate communication media through wired networks, direct-wired connections or wirelessly, such as acoustic, RF, or infrared, through an antenna 897 in communication with the network antenna 812 and the network interface unit 896, which are operable to include digital signal processing circuitry when necessary. The network interface unit 896 is operable to provide for communications under various modes or protocols.

In one or more exemplary aspects, the instructions are operable to be implemented in hardware, software, firmware, or any combinations thereof. A computer readable medium is operable to provide volatile or non-volatile storage for one or more sets of instructions, such as operating systems, data structures, program modules, applications, or other data embodying any one or more of the methodologies or functions described herein. The computer readable medium is operable to include the memory 862, the processor 860, and/or the storage media 890 and is operable be a single medium or multiple media (e.g., a centralized or distributed computer system) that store the one or more sets of instructions 900. Non-transitory computer readable media includes all computer readable media, with the sole exception being a transitory, propagating signal per se. The instructions 900 are further operable to be transmitted or received over the network 810 via the network interface unit 896 as communication media, which is operable to include a modulated data signal such as a carrier wave or other transport mechanism and includes any delivery media. The term "modulated data signal" means a signal that has one or more of its characteristics changed or set in a manner as to encode information in the signal.

Storage devices 890 and memory 862 include, but are not limited to, volatile and non-volatile media such as cache, RAM, ROM, EPROM, EEPROM, FLASH memory, or other solid state memory technology; discs (e.g., digital versatile discs (DVD), HD-DVD, BLU-RAY, compact disc (CD), or CD-ROM) or other optical storage; magnetic cassettes, magnetic tape, magnetic disk storage, floppy disks, or other magnetic storage devices; or any other medium that is used to store the computer readable instructions and which is able to be accessed by the computer system 800.

In one embodiment, the computer system 800 is within a cloud-based network. In one embodiment, the server 850 is a designated physical server for distributed computing devices 820, 830, and 840. In one embodiment, the server 850 is a cloud-based server platform. In one embodiment, the cloud-based server platform hosts serverless functions for distributed computing devices 820, 830, and 840.

In another embodiment, the computer system 800 is within an edge computing network. The server 850 is an edge server, and the database 870 is an edge database. The edge server 850 and the edge database 870 are part of an edge computing platform. In one embodiment, the edge server 850 and the edge database 870 are designated to distributed computing devices 820, 830, and 840. In one embodiment, the edge server 850 and the edge database 870 are not designated for distributed computing devices 820, 830, and 840. The distributed computing devices 820, 830, and 840 connect to an edge server in the edge computing network based on proximity, availability, latency, bandwidth, and/or other factors.

It is also contemplated that the computer system 800 is operable to not include all of the components shown in FIG. 32 is operable to include other components that are not explicitly shown in FIG. 32, or is operable to utilize an architecture completely different than that shown in FIG. 32. The various illustrative logical blocks, modules, elements, circuits, and algorithms described in connection with the embodiments disclosed herein are operable to be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans are able to implement the described functionality in varying ways for each particular application (e.g., arranged in a different order or partitioned in a different way), but such implementation decisions should not be interpreted as causing a departure from the scope of the present invention.

Certain modifications and improvements will occur to those skilled in the art upon a reading of the foregoing description. The above-mentioned examples are provided to serve the purpose of clarifying the aspects of the invention and it will be apparent to one skilled in the art that they do not serve to limit the scope of the invention. All modifications and improvements have been deleted herein for the sake of conciseness and readability but are properly within the scope of the present invention.

The invention claimed is:

1. A platform for identifying relevant documents, comprising:
a server platform, including a processor and a memory, operable to communicate with at least one user device;
wherein the server platform receives at least one input document from the at least one user device to initiate a search;
wherein the server platform automatically determines a semantic signature for the at least one input document;
wherein the server platform automatically parses a plurality of documents to identify semantic signatures for each of the plurality of documents, and returns a list of documents having semantic signatures substantially similar to the semantic signature of the at least one input document;
wherein the server platform graphically displays the list of documents on the at least one user device;
wherein the server platform applies at least one meta-tag to each of the at least one input documents and/or each of the plurality of documents;
wherein the at least one meta-tag is based on comparison of the semantic signature of the tagged document with at least one contextual signature identified for at least one technical field, wherein the at least one contextual signature for the at least one technical field is generated by the server platform based on a probabilistic distribution of rare words within at least one corpus associated with the at least one technical field; and
wherein based on the list of documents, the server platform automatically generates a temporal provenance of the semantic signature, and wherein the temporal provenance of the semantic signature is a statistical time distribution of when documents substantially similar to the at least one input document were published and/or written.

2. The system of claim 1, wherein the server platform retrieves at least one of the plurality of documents using a web crawler.

3. The system of claim 1, wherein the server platform generates a trustworthiness score for the plurality of documents based on a semantic graph density for the plurality of documents and/or intrinsic trustworthiness ratings for a source or a type of source of each of the plurality of documents.

4. The system of claim 3, wherein the server platform automatically transmits a warning to the at least one user device if the trustworthiness score is beneath a minimal trustworthiness threshold.

5. The system of claim 1, where the semantic signature is determined based on a probabilistic distribution of words in the at least one input document.

6. The system of claim 1, wherein based on the list of documents, the server platform automatically generates a spatial provenance of the semantic signature, and wherein the spatial provenance of the semantic signature includes one or more sites on which substantially similar documents have been published.

7. The system of claim 1, wherein the at least one input document includes a plurality of input documents and wherein the server platform is operable to generate an aggregate semantic signature for the plurality of input documents.

8. The system of claim 1, wherein the server platform automatically indicates at least one serendipitous result, wherein the at least one serendipitous result includes at least one document not within one or more communities associated with the at least one input document.

9. The system of claim 1, wherein the server platform graphically displays the list of documents on the at least one user device in the form of a graph, wherein each document is represented by a node and edges are constructed based on similarity of the semantic signatures of connected documents being greater than a preset threshold of similarity.

10. The system of claim 1, wherein the server platform receives a selection to exclude one or more types of documents from the plurality of documents.

11. A method for identifying relevant documents, comprising:
a server platform including a processor and a memory receiving at least one input document from at least one user device to initiate a search;
the server platform automatically determining a semantic signature for the at least one input document;
the server platform automatically parsing a plurality of documents to identify semantic signatures for each of the plurality of documents, and returning a list of documents having semantic signatures substantially similar to the semantic signature of the at least one input document;

the server platform graphically displaying the list of documents on the at least one user device;

the server platform applying at least one meta-tag to each of the at least one input document and/or each of the plurality of documents;

the at least one meta-tag being based on comparison of the semantic signature of the tagged document with at least one contextual signature identified for at least one technical field, wherein the at least one contextual signature for the at least one technical field is generated by the server platform based on a probabilistic distribution of rare words within at least one corpus associated with the at least one technical field; and wherein based on the list of documents, the server platform automatically generates a temporal provenance of the semantic signature, and wherein the temporal provenance of the semantic signature is a statistical time distribution of when documents substantially similar to the at least one input document were published and/or written.

12. The method of claim 11, further comprising the server platform retrieving at least one of the plurality of documents using a web crawler.

13. The method of claim 11, further comprising the server platform generating a trustworthiness score for the plurality of documents based on a semantic graph density for the plurality of documents and/or intrinsic trustworthiness ratings for a source or a type of source of each of the plurality of documents.

14. The method of claim 13, further comprising the server platform automatically transmitting a warning to the at least one user device if the trustworthiness score is beneath a minimal trustworthiness threshold.

15. The method of claim 11, where the semantic signature is determined based on a probabilistic distribution of words in the at least one input document.

16. The method of claim 11, wherein the server platform graphically displaying the list of documents on the at least one user device includes displaying the list of documents in the form of a graph, wherein each document is represented by a node and edges are constructed based on similarity of the semantic signatures of connected documents being greater than a preset threshold of similarity.

17. A platform for identifying relevant documents, comprising:

a server platform, including a processor and a memory, in network communication with at least one user device;

wherein the server platform receives at least one input document from the at least one user device to initiate a search;

wherein the server platform automatically determines a semantic signature for the at least one input document;

wherein the server platform automatically parses a plurality of documents to identify semantic signatures for each of the plurality of documents, and returns a list of documents having semantic signatures substantially similar to the semantic signature of the at least one input document;

wherein the server platform graphically displays the list of documents on the at least one user device;

wherein the server platform generates a trustworthiness score for the plurality of documents based on a semantic graph density for the plurality of documents and/or intrinsic trustworthiness ratings for a source or a type of source of each of the plurality of documents;

wherein the server platform automatically transmits a warning to the at least one user device if the trustworthiness score is beneath a minimal trustworthiness threshold; and wherein based on the list of documents, the server platform automatically generates a temporal provenance of the semantic signature, and wherein the temporal provenance of the semantic signature is a statistical time distribution of when documents substantially similar to the at least one input document were published and/or written.

18. The platform of claim 17, where the semantic signature is determined based on a probabilistic distribution of words in the at least one input document.

* * * * *